US012442168B2

(12) United States Patent
Demczewski et al.

(10) Patent No.: US 12,442,168 B2
(45) Date of Patent: Oct. 14, 2025

(54) FLUSHOMETER SYSTEM

(71) Applicant: Sloan Valve Company, Franklin Park, IL (US)

(72) Inventors: Jon Demczewski, Batavia, IL (US); Corey Dahlberg, Orland Park, IL (US); John Wilson, Naperville, IL (US); Richard Schultz, Niles, IL (US)

(73) Assignee: Sloan Valve Company, Franklin Park, IL (US)

( * ) Notice: Subject to any disclaimer, the term of this patent is extended or adjusted under 35 U.S.C. 154(b) by 78 days.

(21) Appl. No.: 17/300,504

(22) Filed: Jul. 26, 2021

(65) Prior Publication Data

US 2022/0025627 A1 Jan. 27, 2022

Related U.S. Application Data

(60) Provisional application No. 63/056,151, filed on Jul. 24, 2020.

(51) Int. Cl.
*E03D 1/32* (2006.01)
*E03D 1/30* (2006.01)
(Continued)

(52) U.S. Cl.
CPC .............. *E03D 1/302* (2013.01); *E03D 1/32* (2013.01); *E03D 1/34* (2013.01); *E03D 1/36* (2013.01); *E03D 3/06* (2013.01)

(58) Field of Classification Search
CPC ........ F16K 31/62; F16K 7/045; F16K 31/404; F16K 31/408; F16K 47/02; F16K 47/023;
(Continued)

(56) References Cited

U.S. PATENT DOCUMENTS 977,562 A * 12/1910 Sloan ........................ E03D 3/06
222/394
1,471,504 A * 10/1923 Meyer ........................ E03D 3/06
251/36
(Continued)

FOREIGN PATENT DOCUMENTS

DE 299215 C 6/1917
DE 1609268 B1 7/1970
(Continued)

OTHER PUBLICATIONS

"Sloan Royal 152 ESS TMO SBX"; Sloan; retrieved May 22, 2025; product available prior to Mar. 31, 2022; URL: <https://www.sloan.com/commercial-bathroom-products/flushometers/royal/royal-152-ess-tmo-sbx>.*

(Continued)

*Primary Examiner* — Craig J Price
(74) *Attorney, Agent, or Firm* — Banner & Witcoff, Ltd.

(57) ABSTRACT

A flushometer system includes a pressure vessel with a flow path defined between a valve inlet chamber and an outlet and a valve assembly disposed within the pressure vessel and configured to selectively open and close the flow path. A primary diaphragm assembly is disposed within the pressure vessel and includes a primary disc configured to be moveable to actuate the valve assembly to selectively open and close the flow path between the valve inlet chamber and the outlet, and a primary diaphragm connected to the primary disc. A secondary diaphragm assembly is disposed within the pressure vessel and includes a secondary diaphragm and a secondary disc, the secondary diaphragm assembly configured to actuate the primary diaphragm assembly by venting fluid pressure on one side of the primary diaphragm. An activation assembly is configured to actuate the second- (Continued)

ary diaphragm assembly by venting fluid pressure on one side of the secondary diaphragm.

30 Claims, 35 Drawing Sheets

(51) Int. Cl.
*E03D 1/34* (2006.01)
*E03D 1/36* (2006.01)
*E03D 3/06* (2006.01)

(58) Field of Classification Search
CPC .. F16K 47/01; F16K 47/0111; F16K 47/0112; F16K 47/012; E03D 1/32; E03D 1/302; E03D 1/34; E03D 1/36; E03D 3/06; F16L 55/045; F16L 55/055; Y10T 137/7853; Y10T 137/2577
USPC .......... 251/30.01, 31, 26, 45, 51; 137/514.7, 137/115.02; 417/540; 138/31, 46
See application file for complete search history.

(56) References Cited

U.S. PATENT DOCUMENTS

| | | | |
|---|---|---|---|
| 1,501,331 A * | 7/1924 | Gulick | E03D 3/06 251/36 |
| 1,841,433 A | 1/1932 | Finnegan | |
| 1,846,483 A * | 2/1932 | Gilbert | F16L 55/055 137/514.7 |
| 1,901,119 A | 3/1933 | Putnam | |
| 2,145,772 A * | 1/1939 | Metzger | E03D 3/04 251/38 |
| 2,309,848 A * | 2/1943 | King | G05D 16/163 137/489.5 |
| 2,506,152 A * | 5/1950 | Rutherford | G05D 7/0113 137/445 |
| 2,691,504 A | 10/1954 | Jones | |
| 2,731,029 A * | 1/1956 | Rittenhouse | B67D 7/362 141/217 |
| 2,760,204 A * | 8/1956 | Joanis | E03D 5/024 4/367 |
| 3,008,682 A | 11/1961 | Filliung et al. | |
| 3,279,742 A | 10/1966 | Billeter | |
| 3,554,219 A * | 1/1971 | Hudson | E03D 1/32 137/414 |
| 3,811,135 A * | 5/1974 | Drouhard, Jr. | E03D 5/012 4/435 |
| 4,034,423 A * | 7/1977 | Milnes | E03D 5/024 4/375 |
| 4,309,021 A * | 1/1982 | Hafele | F16K 31/1221 251/36 |
| 4,409,638 A * | 10/1983 | Sturman | H01F 7/1872 251/30.02 |
| 4,817,913 A | 4/1989 | Whiteside | |
| 4,832,310 A * | 5/1989 | Nestich | F16K 21/16 251/47 |
| 4,883,254 A | 11/1989 | Whiteside | |
| 4,968,067 A | 11/1990 | Whiteside | |
| 5,013,007 A | 5/1991 | Whiteside | |
| 5,020,771 A * | 6/1991 | Nakatsukasa | F23N 1/007 251/129.08 |
| 5,062,453 A | 11/1991 | Saadi et al. | |
| 5,150,877 A | 9/1992 | Whiteside et al. | |
| 5,169,118 A | 12/1992 | Whiteside | |
| 5,195,720 A | 3/1993 | Nortier et al. | |
| 5,213,305 A | 5/1993 | Whiteside et al. | |
| 5,244,179 A | 9/1993 | Wilson | |
| 5,295,655 A | 3/1994 | Wilson et al. | |
| 5,332,192 A | 7/1994 | Whiteside | |
| 5,335,694 A | 8/1994 | Whiteside | |
| 5,415,374 A | 5/1995 | Carroll et al. | |
| 5,476,244 A | 12/1995 | Carroll et al. | |
| 5,490,659 A | 2/1996 | Whiteside | |
| 5,649,686 A | 7/1997 | Wilson | |
| 5,730,415 A | 3/1998 | Gronwick | |
| 5,755,253 A | 5/1998 | Gronwick | |
| 5,802,628 A | 9/1998 | Spoeth et al. | |
| 5,865,420 A | 2/1999 | Wilson | |
| 5,881,993 A | 3/1999 | Wilson et al. | |
| 5,887,848 A | 3/1999 | Wilson | |
| 5,967,182 A | 10/1999 | Wilson | |
| 6,000,674 A * | 12/1999 | Cheng | F16K 31/402 251/30.02 |
| 6,056,261 A | 5/2000 | Aparicio et al. | |
| 6,058,955 A * | 5/2000 | Griswold | G05D 7/0652 251/30.01 |
| 6,092,783 A * | 7/2000 | Scharnowski | G05D 16/2022 137/630.22 |
| 6,105,926 A | 8/2000 | Oliver et al. | |
| 6,182,689 B1 | 2/2001 | Lauer et al. | |
| 6,216,730 B1 | 4/2001 | Hall | |
| 6,260,576 B1 | 7/2001 | Allen | |
| 6,349,921 B1 | 2/2002 | Jahrling | |
| 6,382,586 B1 | 5/2002 | Wilson et al. | |
| 6,408,873 B1 | 6/2002 | Hall et al. | |
| 6,460,825 B1 | 10/2002 | Nortier et al. | |
| 6,499,716 B2 | 12/2002 | Nortier | |
| 6,550,076 B1 | 4/2003 | Fish | |
| 6,550,744 B2 | 4/2003 | Nortier | |
| 6,616,118 B2 | 9/2003 | Nortier | |
| 6,616,119 B2 | 9/2003 | Wilson | |
| 6,675,827 B2 | 1/2004 | Wilson et al. | |
| 6,913,239 B2 | 7/2005 | Nortier | |
| 6,926,247 B2 | 8/2005 | Nortier | |
| 6,974,114 B2 * | 12/2005 | Hwang | F16K 31/404 251/30.01 |
| 7,007,915 B2 * | 3/2006 | Vincent | F16K 31/42 251/30.01 |
| 7,028,975 B2 * | 4/2006 | Lee | F16K 31/3835 251/30.02 |
| 7,124,997 B2 | 10/2006 | Wilson et al. | |
| 7,192,002 B2 | 3/2007 | Nortier | |
| 7,234,483 B2 * | 6/2007 | Kainuma | G05D 16/2095 251/30.01 |
| D569,947 S | 5/2008 | Johnson | |
| 7,380,568 B2 * | 6/2008 | Tiwet | G05D 7/005 251/30.01 |
| 7,481,413 B2 | 1/2009 | Funari | |
| 7,487,950 B2 | 2/2009 | Johnson | |
| 7,556,237 B2 | 7/2009 | Johnson | |
| 7,565,914 B2 | 7/2009 | Johnson | |
| 7,607,635 B2 | 10/2009 | Wilson | |
| 7,690,622 B2 * | 4/2010 | Ito | F16K 7/14 251/30.02 |
| 7,975,324 B2 | 7/2011 | Ge et al. | |
| 7,980,528 B2 | 7/2011 | Wilson | |
| 8,028,719 B2 | 10/2011 | Johnson | |
| 8,033,522 B2 | 10/2011 | Wilson | |
| 8,042,787 B2 | 10/2011 | Wilson | |
| 8,113,225 B2 | 2/2012 | Funari | |
| 8,205,276 B2 | 6/2012 | Ge et al. | |
| 8,234,724 B2 | 8/2012 | Wilson et al. | |
| 8,286,934 B2 | 10/2012 | Wilson | |
| 8,485,496 B2 * | 7/2013 | Johnson | F16K 31/3855 251/30.02 |
| 8,529,223 B2 * | 9/2013 | Cohoon | E03D 5/01 417/393 |
| 8,561,225 B2 | 10/2013 | Wilson et al. | |
| 8,585,008 B2 | 11/2013 | Wilson | |
| 8,632,048 B2 | 1/2014 | Wilson | |
| 8,800,955 B2 | 8/2014 | Wilson | |
| 8,833,727 B2 | 9/2014 | Wilson | |
| 9,027,584 B2 | 5/2015 | Wilson | |
| 9,347,209 B2 | 5/2016 | Wilson et al. | |
| 9,353,511 B2 | 5/2016 | Wilson et al. | |
| 9,499,965 B2 | 11/2016 | Wilson et al. | |
| 9,605,419 B2 | 3/2017 | Wilson | |
| 9,644,759 B2 | 5/2017 | Wilson et al. | |
| 10,088,849 B2 * | 10/2018 | Hurst | G05D 7/0641 |
| 10,215,288 B2 | 2/2019 | Wilson et al. | |

(56) References Cited

U.S. PATENT DOCUMENTS

| | | | |
|---|---|---|---|
| 10,948,086 B2 | 3/2021 | Wilson et al. | |
| 11,828,449 B2 * | 11/2023 | Mo | E03D 5/105 |
| 2022/0025627 A1 | 1/2022 | Demczewski et al. | |

FOREIGN PATENT DOCUMENTS

| | | |
|---|---|---|
| JP | H03183832 A | 8/1991 |
| WO | 2012119849 A2 | 9/2012 |
| WO | 2018194636 A1 | 10/2018 |

OTHER PUBLICATIONS

"Sloan G2 Exposed Sensor Water Closet Flushometer"; Sloan; retrieved Sep. 30, 2021; product available prior to Feb. 10, 2019; URL: <https://www.sloan.com/commercial-bathroom-products/flushometers/g2/g2-8111>.

"Sloan ECOS Exposed Sensor Water Closet Flushometer"; Sloan; retrieved Sep. 30, 2021; published product available prior to Feb. 10, 2019; URL: <https://www.sloan.com/commercial-bathroom-products/flushometers/ecos/ecos-8111>.

"Sloan SOLIS Exposed Sensor Water Closet Flushometer"; Sloan; retrieved Sep. 30, 2021; product available prior to Feb. 10, 2019; URL: <https://www.sloan.com/commercial-bathroom-products/flushometers/solis/solis-8111>.

"American Standard Ultima Selectronic Exposed Toilet Flush Valve"; American Standard; retrieved Sep. 30, 2021; published Dec. 31, 2019; URL :<https://www.americanstandard.ca/-/media/sites/asus/files/product-specs/bulk/specsheet6066161.pdf?la=en>.

"Kohler Faucets Wave"; Kohler ; retrieved Sep. 30, 2021; published May 29, 2021, product available prior to Feb. 10, 2020; URL: <https://www.us.kohler.com/webassets/kpna/catalog/pdf/en/K-10673-SV_spec_US-CA_Kohler_en.pdf>.

"Kohler Faucets Tripoint"; Kohler ; retrieved Sep. 30, 2021; published dated May 29, 2021, product available prior to Feb. 10, 2020; URL: <https://www.us.kohler.com/webassets/kpna/catalog/pdf/en/K-7546_spec_US-CA_Kohler_en.pdf>.

"Zurn Aquasense"; Zurn ; retrieved Sep. 30, 2021; published Apr. 11, 2018; URL: <https://www.zurn.com/media-library/web_documents/pdfs/specsheets/310139-pdf>.

Jan. 18, 2022—(WO) ISR and Written Opinion—App PCT/US2021/010027.

"Sloan CX Concealed Manual Water Closet Flushometer"; Sloan; retrieved Oct. 18, 2024; product available prior to Mar. 31, 2022; URL: <https://www.sloan.com/commercial-bathroom-products/flushometers/cx/cx-158>.

"Sloan CX Concealed Manual Urinal Flushometer"; Sloan; retrieved Oct. 18, 2024; product available prior to Mar. 31, 2022; URL: <https://www.sloan.com/commercial-bathroom-products/flushometers/cx/cx-198>.

"Sloan CX Concealed Sensor Wall-mounted Water Closet Flushometer"; Sloan; retrieved Oct. 18, 2024; product available prior to Mar. 31, 2022; URL: <https://www.sloan.com/commercial-bathroom-products/flushometers/cx/cx-8158>.

"Sloan CX Concealed Sensor Urinal Flushometer"; Sloan; retrieved Oct. 18, 2024; product available prior to Mar. 31, 2022; URL: <https://www.sloan.com/commercial-bathroom-products/flushometers/cx/cx-8198>.

"Sloan SOLIS Concealed Sensor Water Closet Flushometer"; Sloan; retrieved Oct. 18, 2024; product available prior to Mar. 31, 2022; URL: <https://www.sloan.com/commercial-bathroom-products/flushometers/solis/solis-8153>.

"Sloan SOLIS Concealed Sensor Urinal Flushometer"; Sloan; retrieved Oct. 18, 2024; product available prior to Mar. 31, 2022; URL: <https://www.sloan.com/commercial-bathroom-products/flushometers/solis/solis-8195>.

"Sloan Royal Exposed Sensor Hardwired Water Closet Flushometer"; Sloan; retrieved Oct. 18, 2024; product available prior to Mar. 31, 2022; URL: <https://www.sloan.com/commercial-bathroom-products/flushometers/royal/royal-110-ess>.

"Sloan Royal Concealed Sensor Hardwired Urinal Hydraulic Flushometer"; Sloan; retrieved Oct. 18, 2024; product available prior to Mar. 31, 2022; URL: <https://www.sloan.com/commercial-bathroom-products/flushometers/royal/royal-195-ess-tmo-sbx>.

"Sloan Royal Concealed Sensor Hardwired Water Closet Flushometer"; Sloan; retrieved Oct. 18, 2024; product available prior to Mar. 31, 2022; URL: <https://www.sloan.com/commercial-bathroom-products/flushometers/royal/royal-154-es-sm>.

"Sloan Royal Exposed Sensor Hardwired Urinal Flushometer"; Sloan; retrieved Oct. 18, 2024; product available prior to Mar. 31, 2022; URL: <https://www.sloan.com/commercial-bathroom-products/flushometers/royal/royal-180-ess>.

"Sloan Royal Exposed Sensor Hardwired Urinal Flushometer"; Sloan; retrieved Oct. 18, 2024; product available prior to Mar. 31, 2022; URL: <https://www.sloan.com/commercial-bathroom-products/flushometers/royal/royal-186-ess>.

"Sloan Royal Exposed Sensor Specialty Hardwired Water Closet Bedpan Washer Flushometer"; Sloan; retrieved Oct. 18, 2024; product available prior to Mar. 31, 2022; URL: <https://www.sloan.com/commercial-bathroom-products/flushometers/royal/royal-bpw-1150-ess>.

"Sloan Exposed Sensor Hardwired Water Closet Flushometer"; Sloan; retrieved Oct. 18, 2024; product available prior to Mar. 31, 2022; URL: <https://www.sloan.com/commercial-bathroom-products/flushometers/sloan/sloan-111-ess>.

"Sloan Concealed Sensor Hardwired Water Closet Flushometer"; Sloan; retrieved Oct. 18, 2024; product available prior to Mar. 31, 2022; URL: <https://www.sloan.com/commercial-bathroom-products/flushometers/sloan/sloan-152-ess>.

"Sloan Concealed Sensor Hardwired Urinal Flushometer"; Sloan; retrieved Oct. 18, 2024; product available prior to Mar. 31, 2022; URL: <https://www.sloan.com/commercial-bathroom-products/flushometers/sloan/sloan-190-ess>.

"Sloan Concealed Sensor Hardwired Water Closet Flushometer"; Sloan; retrieved Oct. 18, 2024; product available prior to Mar. 31, 2022; URL: <https://www.sloan.com/commercial-bathroom-products/flushometers/sloan/sloan-611-ess>.

"Sloan Concealed Sensor Water Closet Flushometer"; Sloan; retrieved Oct. 18, 2024; product available prior to Mar. 31, 2022; URL: <https://www.sloan.com/commercial-bathroom-products/flushometers/sloan/sloan-611-128-ess-tmo-swb>.

"Sloan Regal Exposed Sensor Hardwired Water Closet Flushometer"; Sloan; retrieved Oct. 18, 2024; product available prior to Mar. 31, 2022; URL: <https://www.sloan.com/commercial-bathroom-products/flushometers/regal/regal-111-ess>.

"Sloan Regal Concealed Sensor Hardwired Urinal Flushometer"; Sloan; retrieved Oct. 18, 2024; product available prior to Mar. 31, 2022; URL: <https://www.sloan.com/commercial-bathroom-products/flushometers/regal/regal-195-ess>.

"Sloan Crown Concealed Sensor Hardwired Urinal Flushometer"; Sloan; retrieved Oct. 18, 2024; product available prior to Mar. 31, 2022; URL: <https://www.sloan.com/commercial-bathroom-products/flushometers/crown/crown-195-ess>.

"Sloan Crown Exposed Sensor Hardwired Water Closet Flushometer"; Sloan; retrieved Oct. 18, 2024; product available prior to Mar. 31, 2022; URL: <https://www.sloan.com/commercial-bathroom-products/flushometers/crown/crown-ii-111-ess>.

"Sloan TRF 196"; Sloan; retrieved Oct. 18, 2024; product available prior to Mar. 31, 2022; URL: <https://www.sloan.com/commercial-bathroom-products/flushometers/truflush/trf-196>.

"Sloan TRF 156"; Sloan; retrieved Oct. 18, 2024; product available prior to Mar. 31, 2022; URL: <https://www.sloan.com/commercial-bathroom-products/flushometers/truflush/trf-156>.

"Sloan TRF 8156"; Sloan; retrieved Oct. 18, 2024; product available prior to Mar. 31, 2022; URL: <https://www.sloan.com/commercial-bathroom-products/flushometers/truflush/trf-8156>.

"Sloan TRF 8196"; Sloan; retrieved Oct. 18, 2024; product available prior to Mar. 31, 2022; URL: <https://www.sloan.com/commercial-bathroom-products/flushometers/truflush/trf-8196>.

(56) References Cited

OTHER PUBLICATIONS

"Sloan Royal 194 ESS"; Sloan; retrieved Oct. 18, 2024; product available prior to Mar. 31, 2022; URL: <https://www.sloan.com/commercial-bathroom-products/flushometers/royal/royal-194-ess>.

* cited by examiner

FLUSHOMETER SYSTEM

CROSS-REFERENCE TO RELATED APPLICATION

This application is a non-provisional of, and claims priority to, U.S. Provisional Application No. 63/056,151, filed Jul. 24, 2020, which prior application is incorporated by reference herein in its entirety.

FIELD OF THE INVENTION

The present disclosure relates generally to systems for flushometers, more specifically to flushometers for use across a wide variety of plumbing systems with different fluid pressures.

BACKGROUND

Flushometers are a ubiquitous presence in most commercial restrooms, as well as in some homes or other locations. Flushometers typically utilize a valve body having an inlet, an outlet, a handle opening, and a removable cap for accessing the valve. Most such flushometers utilize a control stop associated with the valve body and positioned immediately upstream of the water supply, allowing the valve to be isolated from the water supply line by closing the control stop.

Flushometers in the art typically were designed for an environment where water conservation was not a consideration. Thus, a typical flushometer is not concerned with performance in a low flush volume environment, resulting in poor or undesirable performance of typical flush valves when put into service in a low flush volume environment. Typical flushometers include a fixed-flow control that is set based on hardware components of the device. This requires on-site change-outs to adjust and provides less flexibility during the flush cycle. With the ever-decreasing volume of water used for each flush cycle, the ability to specifically control the profile of each flush (i.e., the volume of water flowing over time at each moment) becomes more crucial. The use of fixed-flow control systems designed for a higher volume flush negatively impact a flushometer's performance in a low flush volume scenario, such as by generating hammer to the system at open or close events. Additionally, certain flushometers may not perform as well in plumbing systems that have low pressure or widely variable pressure in the plumbing system.

Thus, there is a need for flushometers that provide improved overall flow control, particularly accounting for variable flush volumes, especially low flush volumes, and plumbing systems with weak or variable pressure. The present disclosure is provided to address this need and other needs in existing flushometers. A full discussion of the features and advantages of the present invention is deferred to the following detailed description, which proceeds with reference to the accompanying drawings.

BRIEF SUMMARY

Aspects of the disclosure relate to a flushometer system that includes a pressure vessel having a valve inlet chamber configured to receive fluid from a plumbing system and an outlet configured to discharge the fluid to a plumbing fixture, with a flow path defined between the valve inlet chamber and the outlet and a valve assembly disposed within the pressure vessel and configured to selectively open and close the flow path between the valve inlet chamber and the outlet. A primary diaphragm assembly is disposed within the pressure vessel and includes a primary disc configured to be moveable to actuate the valve assembly to selectively open and close the flow path between the valve inlet chamber and the outlet, and a primary diaphragm connected to the primary disc. A secondary diaphragm assembly is disposed within the pressure vessel and includes a secondary diaphragm and a secondary disc, the secondary diaphragm assembly configured to actuate the primary diaphragm assembly by venting fluid pressure on one side of the primary diaphragm. An activation assembly is configured to actuate the secondary diaphragm assembly by venting fluid pressure on one side of the secondary diaphragm.

According to one aspect, the activation assembly includes a manual activation mechanism including a manually-actuatable plunger configured for venting the fluid pressure on the one side of the secondary diaphragm and/or an automatic activation mechanism including a solenoid assembly configured for automatically venting the fluid pressure on the one side of the secondary diaphragm.

According to another aspect, the flushometer system further includes an inlet tail connected to the pressure vessel and in communication with the valve inlet chamber, and a variable flow regulator is disposed in the inlet tail.

According to a further aspect, the valve assembly further includes a valve body configured to be moveable to selectively open and close the flow path between the valve inlet chamber and the outlet, where the valve body defines a central passage, and a variable flow regulator is disposed within the central passage of the valve body.

According to yet another aspect, the primary diaphragm is a rolling diaphragm fixedly engaged at an outer edge thereof, with a rolled portion located radially inward from the outer edge to permit the primary diaphragm to be moveable with the primary disc. In one aspect, the primary disc includes a lip extending radially outward around a periphery of the primary disc and extending over the rolled portion of the primary diaphragm. In another aspect, the secondary diaphragm is also a rolling diaphragm fixedly engaged at an outer edge thereof, with a rolled portion located radially inward from the outer edge to permit the secondary diaphragm to be moveable with the secondary disc.

Additional aspects of the disclosure relate to a flushometer system that includes a pressure vessel having a valve inlet chamber configured to receive fluid from a plumbing system and an outlet configured to discharge the fluid to a plumbing fixture, with a flow path defined between the valve inlet chamber and the outlet, and a valve assembly disposed within the pressure vessel and including a valve body configured to be moveable to selectively open and close the flow path between the valve inlet chamber and the outlet. A primary diaphragm assembly is disposed within the pressure vessel and includes a primary chamber in fluid communication with the valve inlet chamber, a primary disc moveable within the primary chamber and operably connected to the valve body such that the valve body is moveable with the primary disc, and a primary diaphragm connected to the primary disc and having a portion moveable with the primary disc. The primary disc and the primary diaphragm are moveable between a lowered position, where the valve body is configured to close the flow path between the valve inlet chamber and the outlet, and a raised position, where the valve body is configured to open the flow path between the valve inlet chamber and the outlet. A secondary diaphragm assembly is disposed within the pressure vessel and includes a secondary chamber in fluid communication with the primary chamber, a secondary disc moveable within the secondary chamber, and a secondary diaphragm connected to the secondary disc and having a portion moveable with the secondary disc. The secondary disc and the secondary diaphragm are moveable between a first position, where the secondary diaphragm is configured to seal against fluid flow from the primary chamber into the secondary chamber, and a second position, where fluid can flow from the primary chamber into the secondary chamber to vent the primary chamber. The system also includes an activation assembly having at least one of a plunger and a solenoid assembly configured to be activated to selectively vent the secondary chamber to move the secondary disc and the secondary diaphragm from the first position to the second position. Movement of the secondary disc and the secondary diaphragm to the second position is configured to vent the primary chamber to move the primary disc and the primary diaphragm from the lowered position to the raised position.

According to one aspect, the activation assembly includes a manual activation mechanism including a manual actuator configured for operably engaging the plunger to move the plunger to vent the secondary chamber and/or an automatic activation mechanism including an electronic switch configured for activating the solenoid assembly to vent the secondary chamber.

According to another aspect, the primary diaphragm is a rolling diaphragm fixedly engaged at an outer edge thereof, with a rolled portion located radially inward from the outer edge to permit the portion of the primary diaphragm to be moveable with the primary disc. In one aspect, the primary disc has a lip extending radially outward around a periphery of the primary disc and extending over the rolled portion of the primary diaphragm. In another aspect, the secondary diaphragm is a rolling diaphragm fixedly engaged at an outer edge thereof, with a rolled portion located radially inward from the outer edge to permit the portion of the secondary diaphragm to be moveable with the secondary disc.

According to a further aspect, the primary diaphragm assembly further includes a primary diaphragm cover configured to define the primary chamber, and the secondary diaphragm assembly further includes a secondary diaphragm cover configured to define the secondary chamber, where the secondary diaphragm cover is connected to a top of the primary diaphragm cover, and the primary diaphragm cover has an opening in the top placing the secondary chamber in communication with the primary chamber.

According to yet another aspect, the system also includes a valve sleeve connected to the pressure vessel proximate the outlet and mounted within the flow path. The valve sleeve defines a passage receiving the valve body such that the valve body is moveable within the passage, and the valve assembly is configured for engaging the valve sleeve to close the flow path. In one aspect, the valve assembly further includes a valve seat seal connected to the valve body, and the valve sleeve has a valve seat, and the valve seat seal is configured to engage the valve seat to close the flow path and to disengage from the valve seat to open the flow path.

According to a still further aspect, the primary diaphragm assembly includes a stem extending downward from the primary disc, and the stem is fixedly connected to the valve body such that the valve body is moveable with the primary disc.

According to an additional aspect, the primary disc has a first bypass configured to allow controlled passage of the fluid through the primary disc and the primary diaphragm to refill the primary chamber after venting, and the secondary disc has a second bypass configured to allow controlled passage of the fluid through the secondary disc and the secondary diaphragm to refill the secondary chamber after venting.

According to an additional aspect, the primary diaphragm assembly further includes a stroke adjuster connected to the primary disc and having a height that is adjustable relative to the primary disc, such that adjustment of the height of the stroke adjuster relative to the primary disc is configured to define a total vertical movement range of the primary disc.

Further aspects of the disclosure relate to an activation assembly for a flushometer system, which activation assembly includes a plunger configured to be moveable along an axial direction between a closed position and an open position, where the plunger is configured for venting a component of the flushometer system in the open position and is configured to seal against venting of the component in the closed position, an actuator assembly configured to be manipulated by a user, and a thruster assembly. The thruster assembly includes a first member configured to be moveable by translation along the axial direction by engagement with the actuator assembly and a second member configured to be engaged by the first member during translation of the first member along the axial direction to move the second member by translation along the axial direction from a first position to a second position where the second member engages the plunger to move the plunger to the open position. The second member is further moveable, by a combination of rotation and translation along the axial direction away from the plunger, from the second position to a third position where the second member is configured to permit the plunger to return to the closed position.

According to one aspect, the thruster assembly further includes a guide sleeve positioned such that the first and second members are moveable by translation along the axial direction within the guide sleeve, where the guide sleeve is configured to engage the second member to resist rotation of the second member during movement from the first position to the second position. The guide sleeve is configured to permit rotation of the second member during movement from the second position to the third position. In one aspect, the guide sleeve is further configured to engage the first member to resist rotation of the first member. In another aspect, the guide sleeve includes an abutment surface extending in the axial direction, the abutment surface configured to engage the second member to resist rotation of the second member during movement of the second member from the first position to the second position, and the second member is configured to move to the third position after the second member has achieved sufficient axial translation to clear the abutment surface.

According to another aspect, the first member is configured to exert a combination of translational and rotational forces on the second member during movement of the first member along the axial direction. In one aspect, the first member and the second member have engaging surfaces that are angled with respect to the axial direction, and engagement of the engaging surfaces of the first member and the second member is configured to exert the combination of translational and rotational forces.

According to a further aspect, the second member is further moveable, by a combination of rotation and translation along the axial direction away from the plunger, from the third position to a fourth position where the second member is positioned in a same axial position as the first position and a different rotational position from the first position.

Still further aspects of the disclosure relate to an activation assembly for a flushometer system, which activation assembly includes a plunger configured to be moveable along an axial direction for venting a component of the flushometer system, an actuator assembly configured to be manipulated by a user, and a thruster assembly. The thruster assembly includes a first member configured to be moveable by translation along the axial direction by engagement with the actuator assembly and a second member configured to be engaged by the first member to move the second member by translation along the axial direction. The second member is configured to engage the plunger during movement along the axial direction to move the plunger along the axial direction for venting the component of the flushometer system, and the second member is further configured for rotational movement during travel along the axial direction.

Other aspects of the disclosure relate to a stroke adjuster for a diaphragm assembly for a flushometer system including a disc moveable within a chamber having a cover, which stroke adjuster includes an engaging body configured to be received in a recess in the disc and configured to engage the cover to define a total vertical movement range of the disc. The stroke adjuster also includes a threaded portion configured to threadably engage the disc to enable height adjustment of the engaging body relative to the disc by threaded advancement or retreat and one or more flexible engaging arms extending from the engaging body and configured to engage a surface of the recess to resist rotation of the engaging body in a rotation direction configured to create movement of the engaging body toward the disc.

Other aspects of the disclosure relate to a diaphragm assembly for a flushometer system having an inlet and an outlet, including a primary diaphragm assembly and a secondary diaphragm assembly. The primary diaphragm assembly includes a primary disc configured for connection with a valve assembly of the flushometer system and configured to be moveable to actuate the valve assembly to selectively open and close a fluid flow path from the inlet to the outlet of the flushometer system, and a primary diaphragm connected to the primary disc and having a portion configured to be moveable with the primary disc. The secondary diaphragm assembly includes a secondary diaphragm and a secondary disc that are moveable by venting fluid pressure on one side of the secondary diaphragm, and wherein movement of the secondary diaphragm and the secondary disc is configured to actuate the primary diaphragm assembly by venting fluid pressure on one side of the primary diaphragm.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
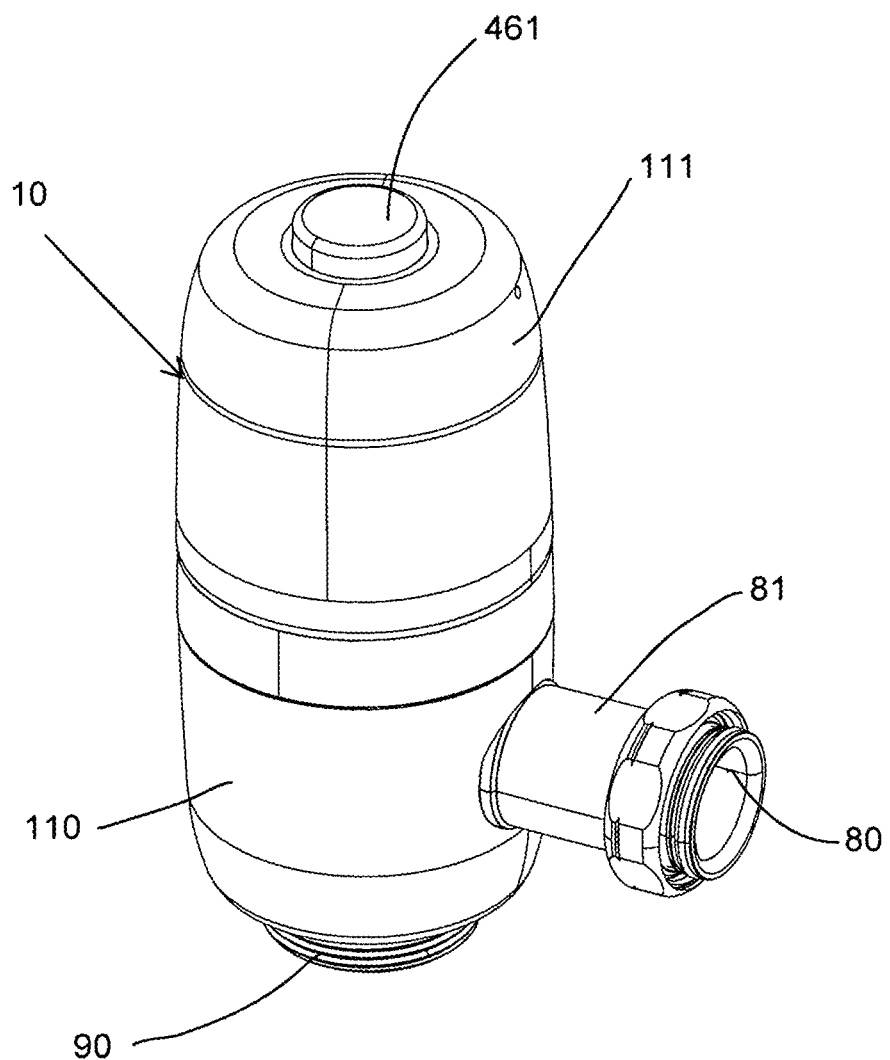
FIG. 1 is a perspective view of one embodiment of a flushometer system according to aspects of the present disclosure.
Figure 2:
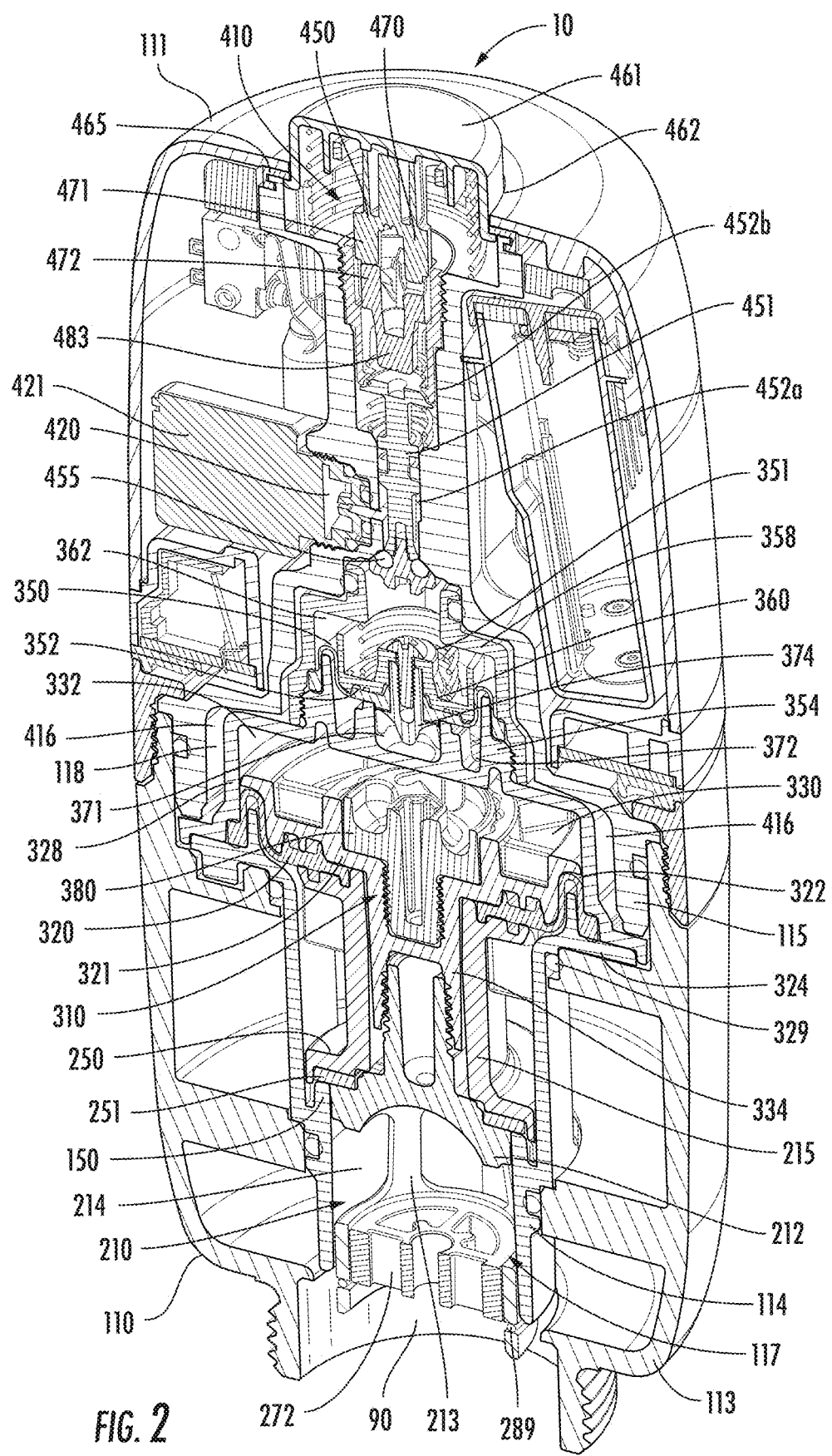
FIG. 2 is a perspective cross-section view of the flushometer system of FIG. 1.
Figure 3:
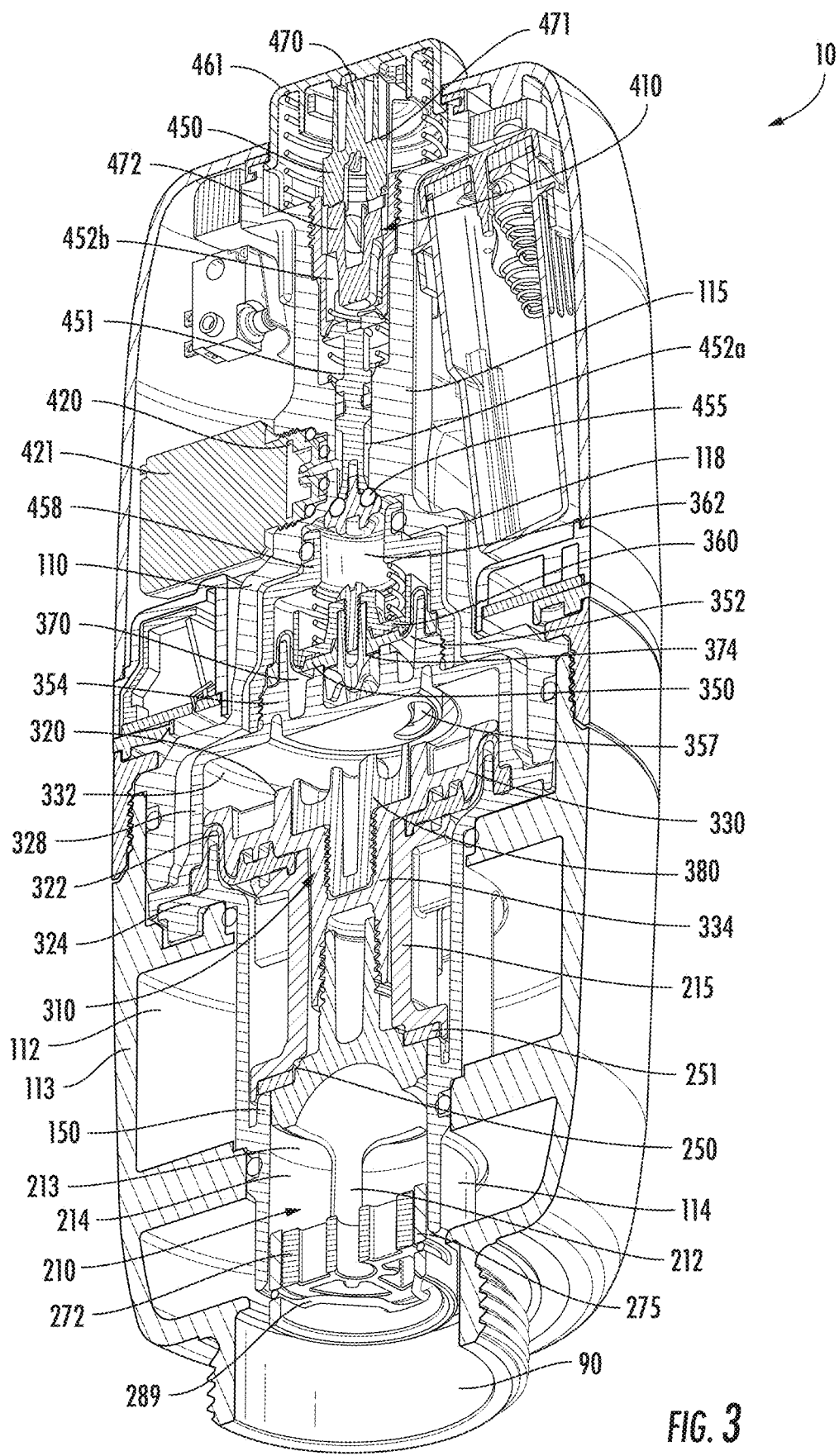
FIG. 3 is a bottom perspective cross-section view of the flushometer system of FIG. 1.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Embodiments described herein relate generally to a flushometer system and methods for same. One embodiment, a flushometer system 10 is shown in FIGS. 1-24. The flushometer system 10 in FIGS. 1-24 generally includes a pressure vessel or main body 110 connected to an inlet tail 81 of a plumbing system for supplying water to the flushometer system 10 to define an inlet 80, and an outlet 90 in communication with a toilet (not shown) or potentially another fixture for allowing flow of water to the toilet or other fixture. The inlet 80 in FIGS. 1-24 is positioned at one side of the pressure vessel 110 and the outlet 90 positioned at the bottom perpendicular to the inlet 80. It should be appreciated that for some embodiments, the relative positioning of the inlet 80 and outlet 90 can be changed. The pressure vessel or main body 110 in FIGS. 1-24 includes at least a bottom piece 113 and a top piece 115 that are connected together to define the pressure vessel 110, with the bottom piece 113 including the inlet 80 and the outlet 90, and the top piece 115 defining a diaphragm cavity 118 enclosing the diaphragm assembly 310. The pressure vessel 110 also encloses a valve inlet chamber 112, and the flushometer system 10 further includes a valve assembly 210 is disposed in the valve inlet chamber 112. The valve inlet chamber 112 includes an inlet section 82 connected to the inlet tail 81. The valve inlet chamber 112 may be defined by the pressure vessel 110, a separate component (e.g., one or more inserts within the pressure vessel 110), or a combination thereof. The bottom piece 113 defines the valve inlet chamber 112 in the embodiment of FIGS. 1-24. The valve inlet chamber 112 is generally in fluid communication with the inlet 80 and the outlet 90 and allows fluid to flow between the inlet 80 and the outlet 90, which flow is controlled by the valve assembly 210. The valve inlet chamber 112 is also in fluid communication with other components of the valve assembly 210 that are selectively evacuated of fluid to control flushing, as described herein. The flushometer system 10 further includes a main valve seat assembly 150 disposed between the valve assembly 210 and the outlet 90 and configured for engaging the valve assembly 210 to selectively and controllably seal the outlet 90. The flushometer 10 in FIGS. 1-24 also includes an outside cover 111 that connects to the bottom piece 113 and the top piece 115 of the pressure vessel 110 and encloses a portion of the pressure vessel 110 as well as additional components of the flushometer system 10.

The main valve seat assembly 150 in FIGS. 1-24 includes a valve sleeve 114 connected to the pressure vessel 110 and configured to define a passage 117 (see FIGS. 4-5) therethrough. In one embodiment, shown in FIGS. 2-10, the valve sleeve 114 is a separate component engaged with the bottom piece 113 of the pressure vessel 110, e.g., by snap fit, interference fit, threading, or other engagement structure. The valve sleeve 114 is a substantially cylindrical, single-piece structure in the embodiment of FIGS. 1-24, and defines a passage 117 that is open at both ends. In other embodiments, the valve sleeve 114 may be formed of multiple pieces or may be integral with the pressure vessel 110. The main valve seat assembly 150 further includes a main valve seat 152 positioned at or near the top portion of the valve sleeve 114 and configured to engage the valve assembly 210 to seal the valve sleeve 114 and the outlet 90. The valve sleeve 114 may also include one or more flanges 151 or other structures for engaging the pressure vessel 110 to retain the valve sleeve 114 in position, and in particular, to resist downward movement of the valve sleeve 114 when the main valve seat 152 is acted upon by downward force from the valve assembly 210. A sealing ring 153 is also positioned between the valve sleeve 114 and the pressure vessel 110.

Figure 4A:
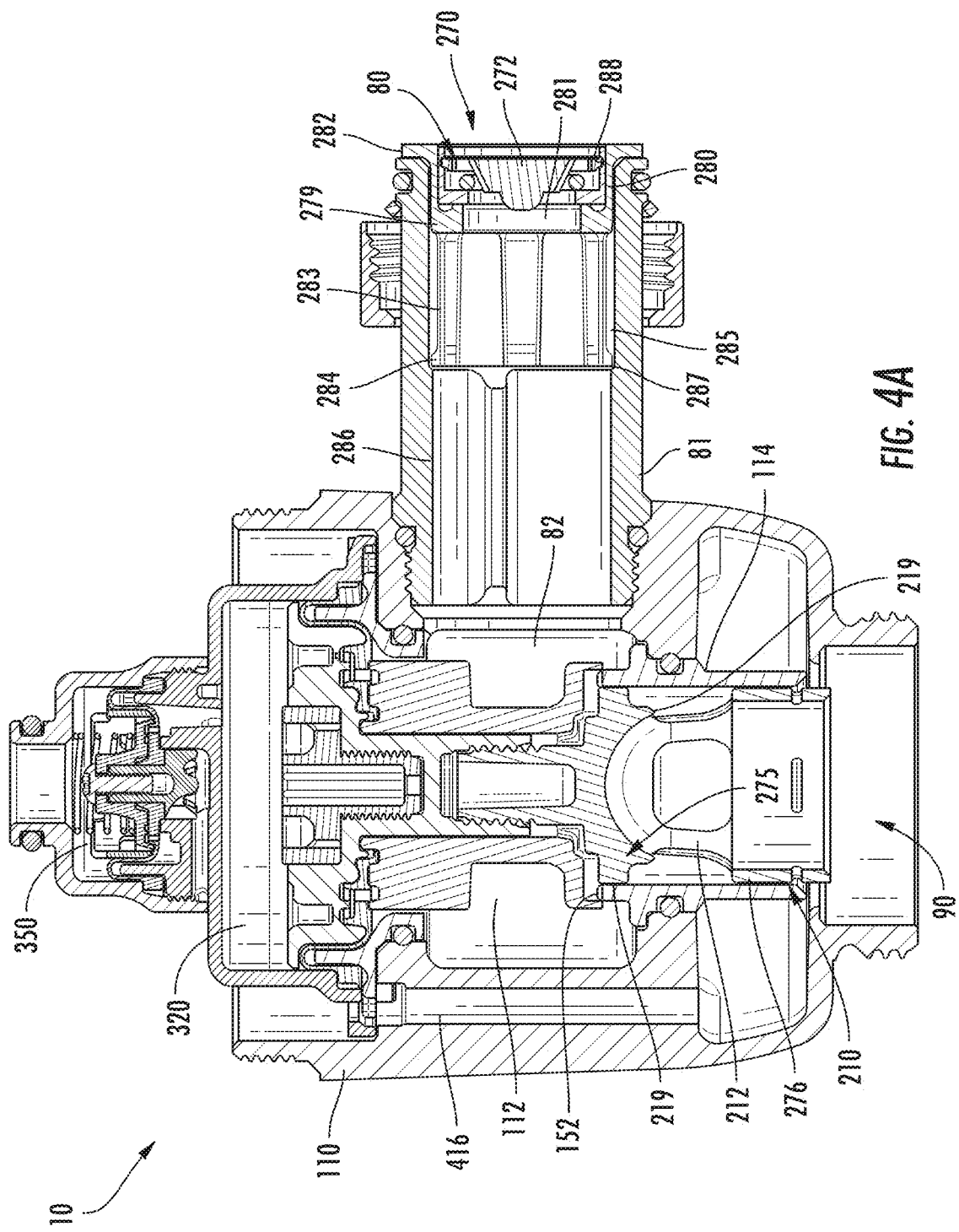
FIG. 4A is a cross-section view of a portion of the flushometer system of FIG. 1, with a valve assembly in a closed position, a primary diaphragm assembly in a lowered position, and a secondary diaphragm assembly in a lowered position, with a first embodiment of a flow control arrangement according to aspects of the disclosure.

The valve assembly 210 is generally moveable between an open position, where fluid can flow through the valve assembly 210 and the passage 117 to the outlet 90 (see FIG. 5), and a closed position, where the valve assembly 210 engages the main valve seat 152 to seal the passage 117 and stop the flow of fluid to the outlet 90 (see FIG. 4A). In the open position, a fluid flow path is defined from the inlet 80 through the inlet tail 81, the pressure vessel 110, the main valve body 212, and the valve sleeve 114 to the outlet 90. The valve assembly 210 in FIGS. 1-24 is moveable vertically within the passage 117 of the valve sleeve 114 to achieve this function. In the embodiment of FIGS. 1-24, the valve assembly 210 includes a main valve body 212 having a generally cylindrical outer wall 276 defining a central passage 213 that is in communication with the valve sleeve 114 and the outlet 90, and one or more openings 214 that permit the passage of fluid into the central passage 213 and through the main valve body 212.

The valve assembly 210 in FIGS. 1-24 also includes a valve seat portion 250 with a valve seat seal 251 for engaging and sealing the valve assembly 210 against the main valve seat assembly 150. The valve seat portion 250 in FIGS. 2-12 is in the form of a circular flange that extends outwardly from the valve assembly, and the valve seat seal 251 is positioned on the underside of the valve seat portion 250, with a downwardly extending lip 252 encircling the outer edge of the valve seat seal 251. The lip 252 protects the valve seat seal 251 from damage or detachment by fluid flow. The lip 252 also protects the valve seat seal 251 against significant radial distortion when closed and thereby helps retain the height or thickness of the valve seat seal 251, which, in turn, helps retain a consistent stroke height for the valve assembly 210. The valve seat portion 250 is wider than the main valve body 212, wider than the inner diameter at the upper end of the valve sleeve 114, and wider than the passage 117, such that the valve seat portion 250 extends over the top of the valve sleeve 114 and the valve seat seal 251 seats upon the main valve seat 152 when the valve assembly 210 is closed. The engagement between the valve seat seal 251 and the main valve seat 152 closes the passage 117 and resists passage of fluid through the main valve body 212 and the passage of the valve sleeve 114. The valve assembly 210 in FIGS. 2-10 has a valve seat body 215 that includes the valve seat portion 250 and is a separate piece connected to the main valve body 212; however, the valve seat body 215 and the main valve body 212 may be a single, integral piece in another embodiment.

The main valve body 212 in FIGS. 2-10 also has one or more outer diameter changes 216 (or other width changes) near the top 218 of the main valve body 212. These outer diameter changes 216 in this embodiment is formed by stepped surfaces 219 that increase the width of the main valve body 212 toward the top 218 of the main valve body 212. These diameter changes 216 reduce the total area of the opening defined between the outer diameter of the main valve body 212 and the inner diameter of the valve sleeve 114 when the main valve body 212 is nearly completely received in the valve sleeve 114, i.e., nearly in the closed position. This, in turn, reduces the flow rate through the passage 117 in a more gradual manner as the main valve body 212 approaches the closed position. This gradual reduction in flow rate helps avoid shock to the system (e.g., water hammer) that may result if flow rate is reduced too quickly. The configurations of the outer diameter changes 216 also assist in achieving a more consistent bowl refill volume for the fixture. In another embodiment, this function may be accomplished by an inner diameter change on the valve sleeve 114, or a combination of diameter changes on the valve sleeve 114 and the main valve body 212. Thus, in one embodiment, the valve sleeve 114 and the main valve body 212 together include diameter changes near the top ends thereof that decrease the size of the opening between the valve sleeve 114 and the main valve body 212 in a more gradual manner as the main valve body 212 approaches the closed position and the valve seat seal 251 approaches the main valve seat 152.

The flushometer system 10 in FIGS. 1-24 includes a flow control assembly 270 that defines a variable flow path and a fixed flow path from the inlet 80 to the outlet 90, to assist in controlling flow rate and maintaining a consistent flow rate of fluid through the pressure vessel 110 and the outlet 90. The flow control assembly 270 includes at least a variable flow regulator 272 and a fixed flow regulator 275 that may be positioned in various positions in different embodiments, based on the configuration of various components. In general, the variable flow regulator 272 may be in the form of a component mounted within the flow path between the inlet 80 and the outlet 90 that is designed to provide variable flow performance. The variable flow regulator 272 may mechanically restrict flow to the outlet 90 under certain conditions, e.g., imposing a high degree of flow restriction when the flow rate through the passage 213 is higher and imposing less flow restriction when the flow rate through the passage 213 is lower. One example of a variable flow regulator 272 is commercially available under the Neoperl brand. The fixed flow regulator 275 may be a designed flow restrictor in one embodiment, or may be formed by another portion of the flushometer system 10 in another embodiment, e.g., the portion of the valve assembly 210 that forms the smallest fixed restriction on flow. FIGS. 4A-4E illustrate the flushometer system 10 of FIGS. 1-24 with various different configurations of variable flow regulators 272 and fixed flow regulators 275.

Figure 4B:
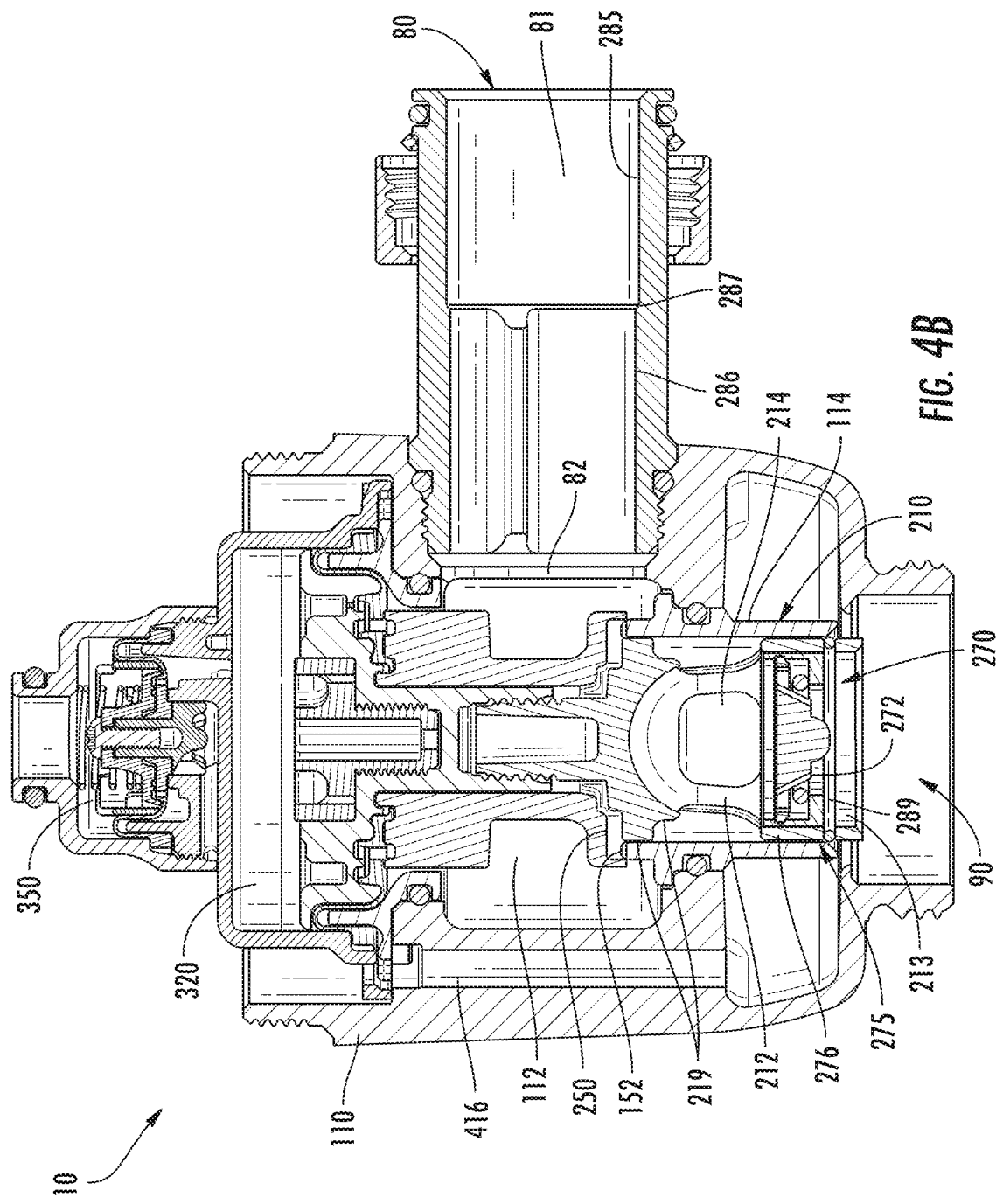
FIG. 4B is a cross-section view of the portion of the flushometer system of FIG. 4A with a second embodiment of a flow control arrangement according to aspects of the disclosure.
Figure 4C:
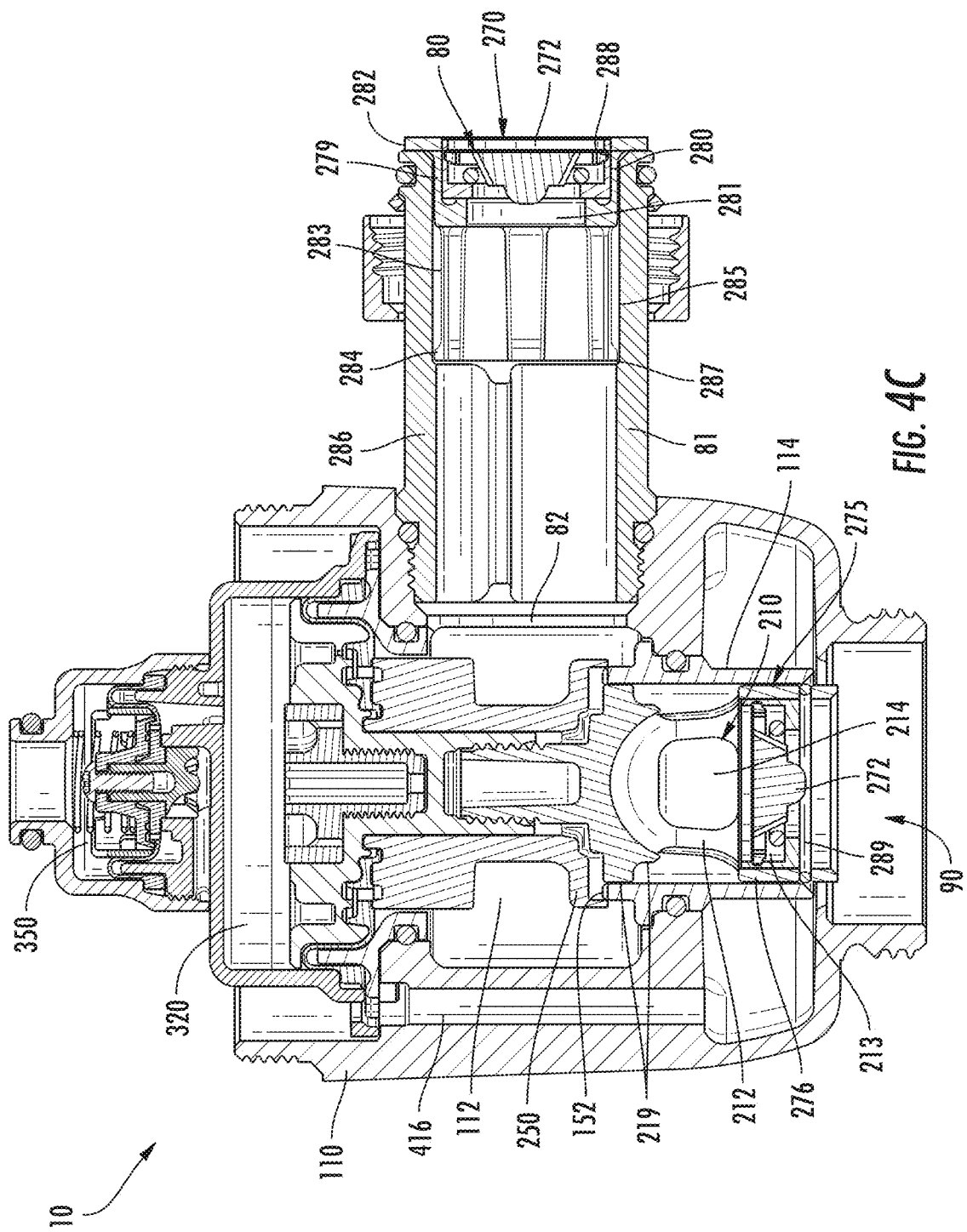
FIG. 4C is a cross-section view of the portion of the flushometer system of FIG. 4A with a third embodiment of a flow control arrangement according to aspects of the disclosure.
Figure 4D:
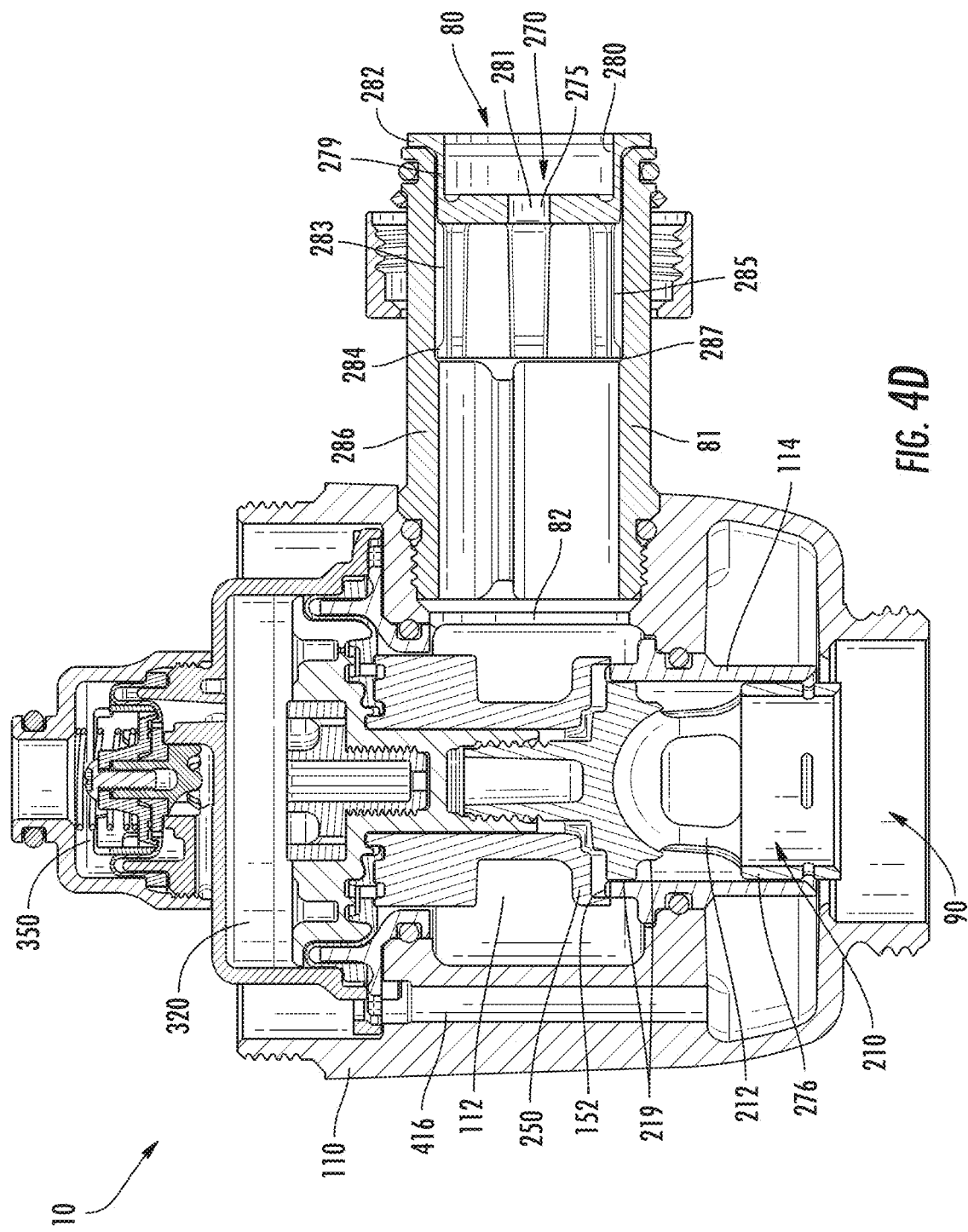
FIG. 4D is a cross-section view of the portion of the flushometer system of FIG. 4A with a fourth embodiment of a flow control arrangement according to aspects of the disclosure.
Figure 4E:
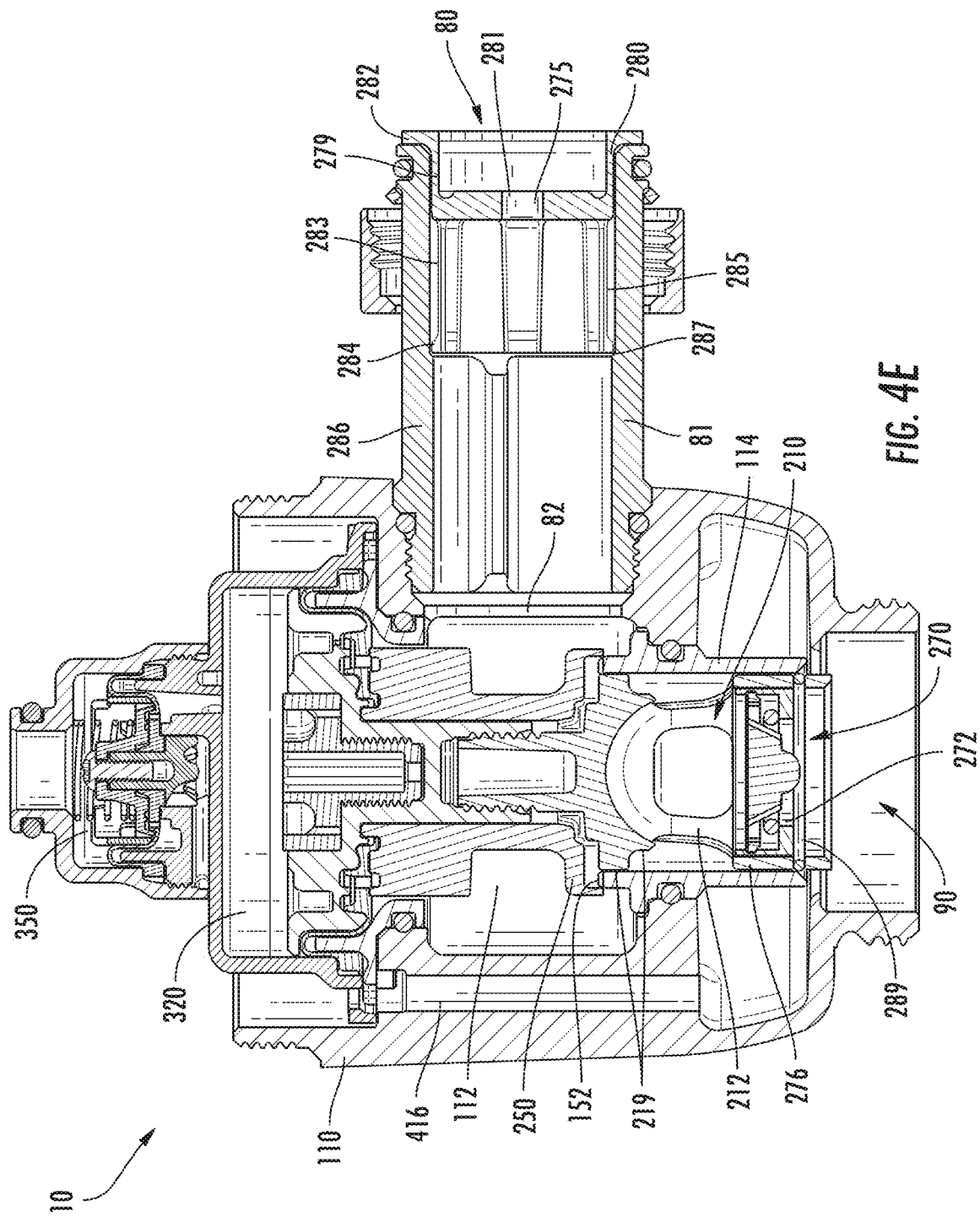
FIG. 4E is a cross-section view of the portion of the flushometer system of FIG. 4A with a fifth embodiment of a flow control arrangement according to aspects of the disclosure.

Each of the embodiments of FIGS. 4A-4E includes an inlet tail 81 that is configured to receive an insert 279 that may be configured for mounting the variable flow regulator 272 and/or for functioning as a fixed flow regulator 275. FIGS. 4A-4B illustrate one embodiment of such an insert 279 and FIGS. 4D-4E illustrate another embodiment of such an insert 279. The insert 279 in these embodiments includes a base 280 positioned within the inlet tail 81, that defines a passage 281 for fluid flow, and that may also include a cup-shaped receiver 288 configured to receive a variable flow regulator 272. The insert 279 in FIGS. 4A-4B and 4D-4E also has a flange 282 extending outward at one end of the base 280 and an engaging structure for engaging structures of the inlet tail 81 to retain the insert 279 within the inlet tail 81. In these embodiments, this engaging structure includes a plurality of legs 283 extending axially on the opposite end of the base 280 from the flange 282, with each leg having a raised tab 284 at or proximate the distal end thereof. The tabs 284 are configured to engage the inner surface of the inlet tail 81 and to be flexed inwardly by such engagement, and the resultant flexing tension force created in each leg 283 exerts an outward force on the inner surface of the inlet tail 81 to retain the insert 279 in place. The base 280 may additionally or alternately be dimensioned to form a friction fit with the inner surface of the tail 81 for retaining the insert 279 in place within the inlet tail 81. The inlet tail 81 in this embodiment includes a first portion 285 at the distal end or opening of the inlet tail 81 (farthest from the valve assembly 210) that is configured to receive the insert 279 and a second portion 286 closer to the valve assembly 210 with a slightly smaller diameter. The change in diameter between the first and second portions 285, 286 creates a stop 287 to engage the ends of the legs 283 to resist further insertion of the insert 279. Alternately, the stop 287 may be formed by a partially or completely circumferential ridge or similar structure. The base 280 may be configured such that the passage 281 is sized to create a fixed flow regulator 275 as described herein. In general, the flushometer system 10 may include a variable flow regulator 272 in the inlet tail 81 and/or within the valve sleeve 114 in the embodiments discussed herein, but in other embodiments, a variable flow regulator 272 may be positioned elsewhere within the flow path between the inlet 80 and the outlet 90, or even within other plumbing components upstream of the inlet 80. It is understood that the flushometer system 10 may include multiple variable flow regulators 272 in various positions in some embodiments. It is also understood that, at sufficiently low flow rates, it is possible that no portion of the flushometer system 10 acts as a fixed flow regulator 275 in operation.

FIG. 4A illustrates one configuration of a flow control assembly 270 in a flushometer system 10 as shown in FIGS. 1-24. In this configuration, an insert 279 is received within the first portion 285 of the inlet tail 81, with a variable flow regulator 272 mounted within a receiver 288 in the base 280 of the insert 279. The passage 281 of the insert 279 in this embodiment is sized sufficiently large to not operate as a fixed flow regulator 275. The portions of the main valve body 212 that define the flow rate into the valve sleeve 114 (e.g., the stepped surfaces 219) act as the fixed flow regulator 275 in this embodiment. This configuration may be used for any application or use of the flushometer system 10, including both urinal and water closet applications.

FIG. 4B illustrates another configuration of a flow control assembly 270 in a flushometer system 10 as shown in FIGS. 1-24. In this configuration, the variable flow regulator 272 is positioned at a bottom end of the main valve body 212 and the fixed flow regulator 275 positioned on the outer surface of the main valve body 212. A similar configuration is also shown in FIGS. 2-3 and 6-9. The variable flow regulator 272 in this configuration is fixedly disposed within the passage 213 of the main valve body 212 downstream from the openings 214. In this configuration, the flow through the passage 213 and through the variable flow regulator 272 to the outlet 90 is defined as the variable flow path. The fixed flow regulator 275 is formed by the cylindrical outer wall 276 of the main valve body 212 having increased diameter/width relative to the portions of the main valve body 212 in which the openings 214 are defined. The diameter of the cylindrical outer wall 276 is less than the inner diameter of the valve sleeve 114, such that the fixed flow path passes between the cylindrical outer wall 276 and the valve sleeve 114. The fixed flow regulator 275 remains within the valve sleeve 114 even in the fully open position of the valve, such that fluid flows through the fixed flow path throughout the flush cycle. A retaining clip 289 is engaged with the main valve body 212 in this embodiment to retain the variable flow regulator 272 within the passage 213 of the main valve body 212 and to avoid having the variable flow regulator 272 dislocated and/or removed by fluid flow through the passage 213. This configuration may be used for any application or use of the flushometer system 10, including both urinal and water closet applications.

FIG. 4C illustrates another configuration of a flow control assembly 270 in a flushometer system 10 as shown in FIGS. 1-24. In this configuration, an insert 279 is received within the first portion 285 of the inlet tail 81, with a variable flow regulator 272 mounted within a receiver 288 in the base 280 of the insert 279, similar to the configuration of FIG. 4A. The passage 281 of the insert 279 in this embodiment is sized sufficiently large to not operate as a fixed flow regulator 275. A second variable flow regulator 272 is positioned at the bottom end of the main valve body 212 in this embodiment, similar to FIG. 4B. A retaining clip 289 is used to hold the second variable flow regulator 272 in place in this embodiment. The portions of the main valve body 212 that define flow into the valve sleeve 114 (e.g., the stepped surfaces 219) or the outer surfaces of the cylindrical outer wall 276 of the main valve body 212 may act as the fixed flow regulator 275 in this embodiment, depending on the flow rate and the position of the main valve body 212. This configuration may be used for any application or use of the flushometer system 10, including both urinal and water closet applications.

FIG. 4D illustrates another configuration of a flow control assembly 270 in a flushometer system 10 as shown in FIGS. 1-24. In this configuration, an insert 279 is received within the first portion 285 of the inlet tail 81 as described herein, but the flushometer system 10 does not include a variable flow regulator 272 in this embodiment. The base 280 of the insert 279 in this embodiment is dimensioned so that the passage 281 is sufficiently small to function as a fixed flow regulator 275. This configuration may be used for any application or use of the flushometer system 10, but may be particularly advantageous when used in low gallon per flush (gpf) applications, such as urinals with flush sizes of 0.25 gpf or 0.125 gpf or lower.

FIG. 4E illustrates another configuration of a flow control assembly 270 in a flushometer system 10 as shown in FIGS. 1-24. In this configuration, an insert 279 is received within the first portion 285 of the inlet tail 81. The base 280 of the insert 279 in this embodiment is dimensioned so that the passage 281 is sufficiently small to function as a fixed flow regulator 275. A variable flow regulator 272 is positioned at the bottom end of the main valve body 212 in this embodiment, similar to FIG. 4B. A retaining clip 289 is used to hold the second variable flow regulator 272 in place in this embodiment. In another embodiment, the base 280 of the insert 279 in FIG. 4E may be dimensioned and configured to receive a variable flow regulator 272, instead of or in addition to the variable flow regulator 272 within the main valve body 212. This configuration may be used for any application or use of the flushometer system 10, but may be particularly advantageous when used in low gallon per flush (gpf) applications, such as urinals with flush sizes of 0.25 gpf or 0.125 gpf or lower.

Figure 25:
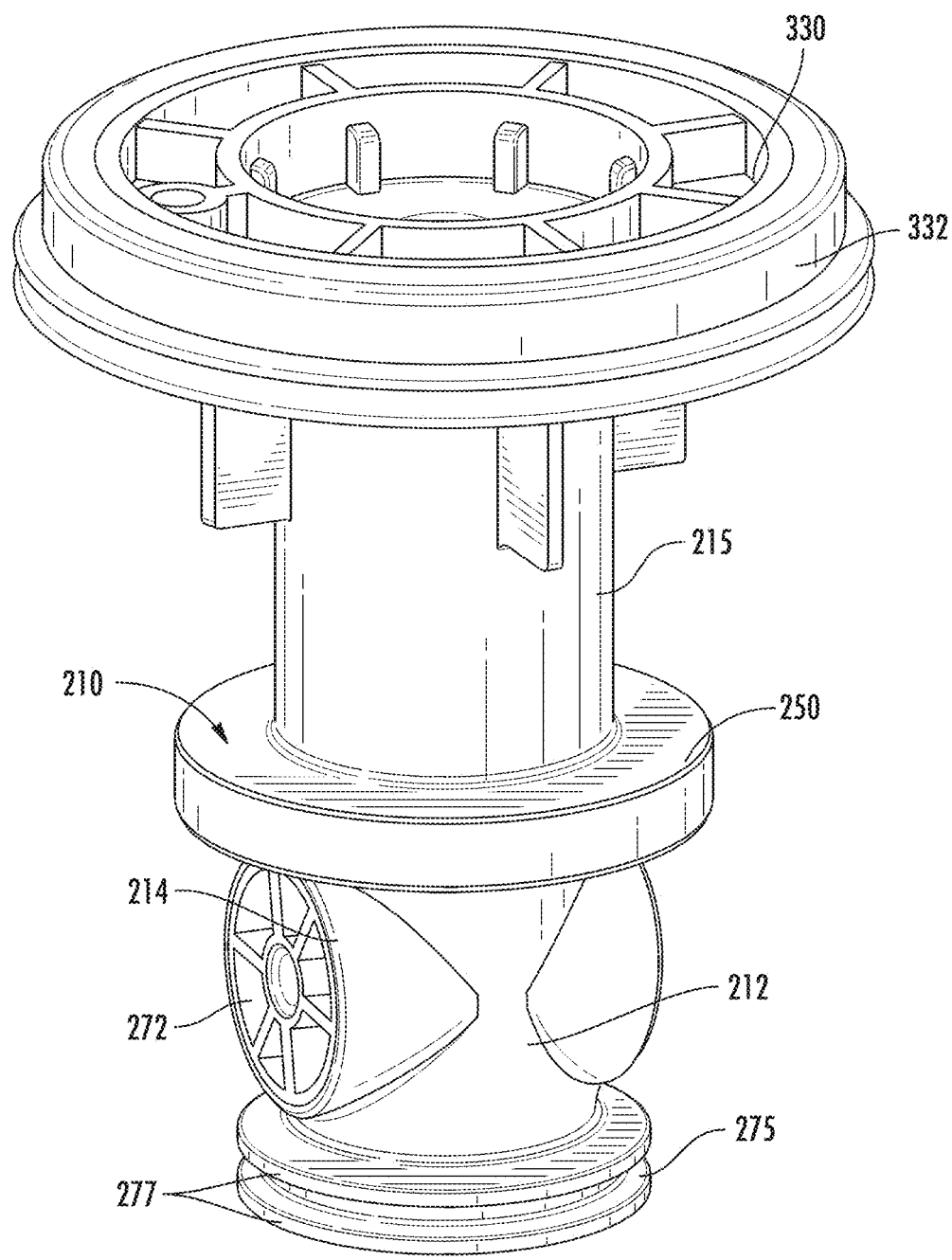
FIG. 25 is a perspective view of a portion of a valve assembly and a portion of a diaphragm assembly according to another embodiment of a flushometer system according to aspects of the present disclosure.
Figure 26:
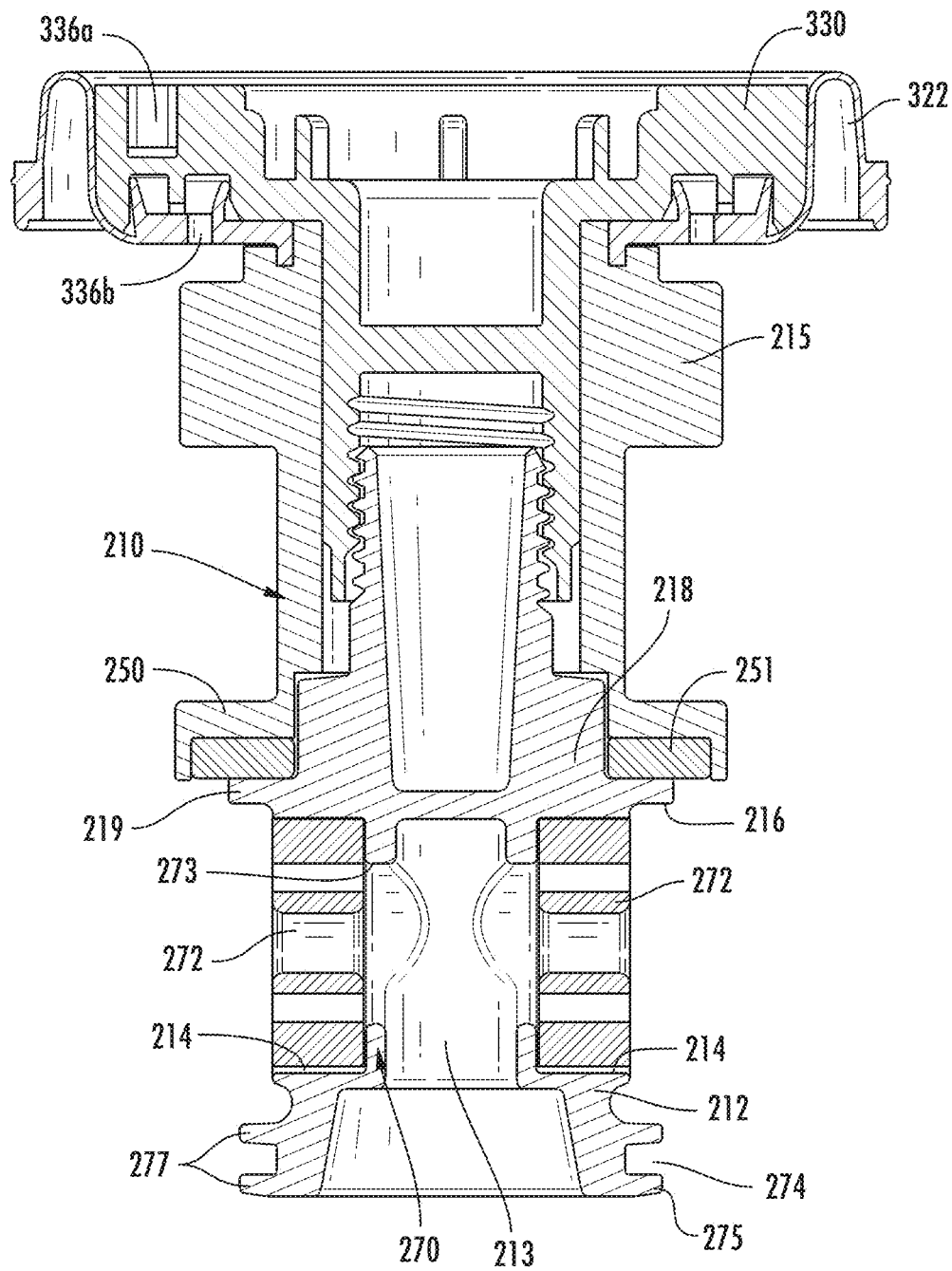
FIG. 26 is a cross-section view of the portion of the flushometer system shown in FIG. 25.

The flow control assembly 270 permits the valve assembly 210 to control and define the flush profile by interaction of fluid with the flow control assembly 270, by the fluid passing through both the variable flow path and the fixed flow path simultaneously. At higher fluid pressures, the combination of the variable flow regulator(s) 272 and the fixed flow regulator(s) 275 restrict the flow rate through the valve assembly 210, and at lower pressures, the variable flow regulator(s) 272 offer little to no restriction on flow rate, thereby achieving a more consistent flow rate over a wide variety of fluid pressures (e.g., 20-125 psi). In other embodiments, the flow control assembly 270 may have one or more variable flow regulators 272 for controlling flow through the outlet 90, which may be positioned and configured differently. FIGS. 25-26, described elsewhere herein, illustrate one such embodiment. The flow control assemblies 270 of FIGS. 2-9 and 25-26 both have variable flow regulators 272 and fixed flow regulators 275 positioned on the moveable main valve body 212, with different configurations. In further embodiments, at least a portion of the flow control assembly 270 may be in the valve inlet chamber 112, separate from the main valve seat assembly 150 or the main valve body 212.

Figure 11:
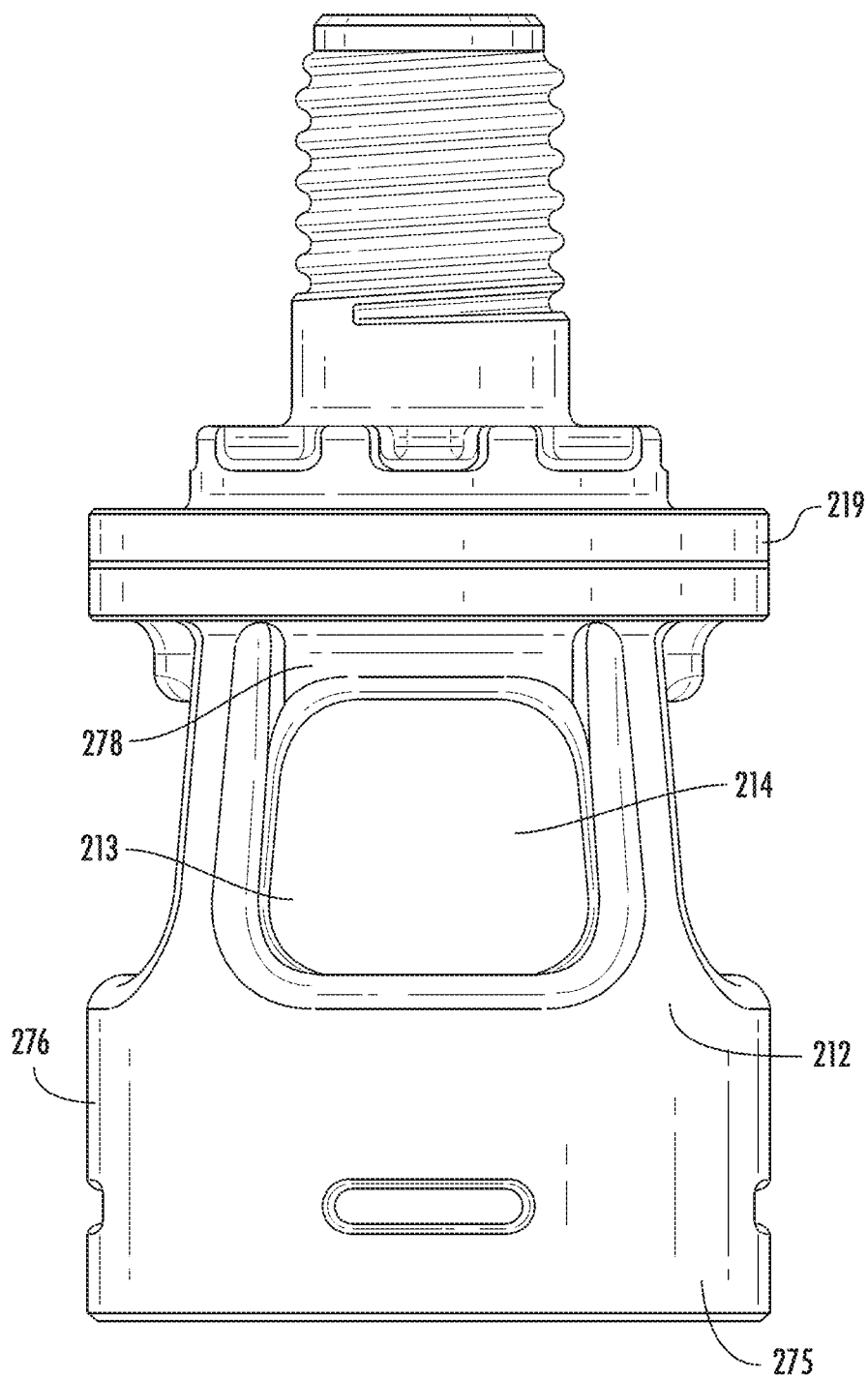
FIG. 11 is a side view of a portion of a valve assembly that is usable in connection with the flushometer system of FIG. 1.
Figure 12:
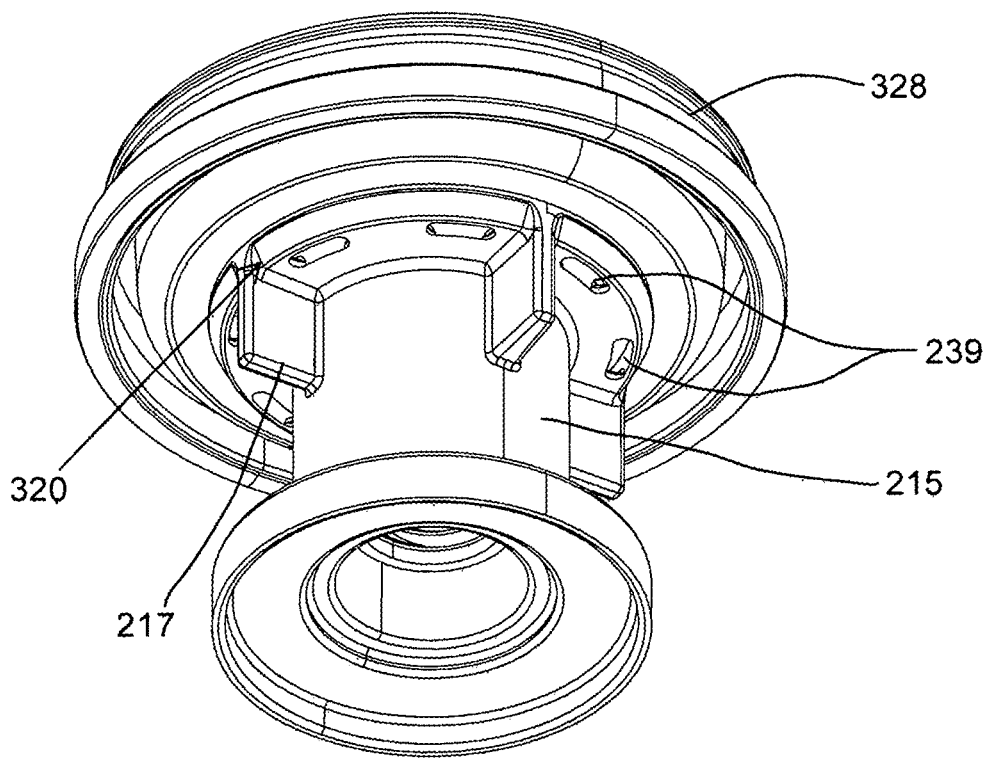
FIG. 12 is a bottom perspective view of a portion of a valve assembly and a portion of the primary diaphragm assembly of the flushometer system of FIG. 1.
Figure 13:
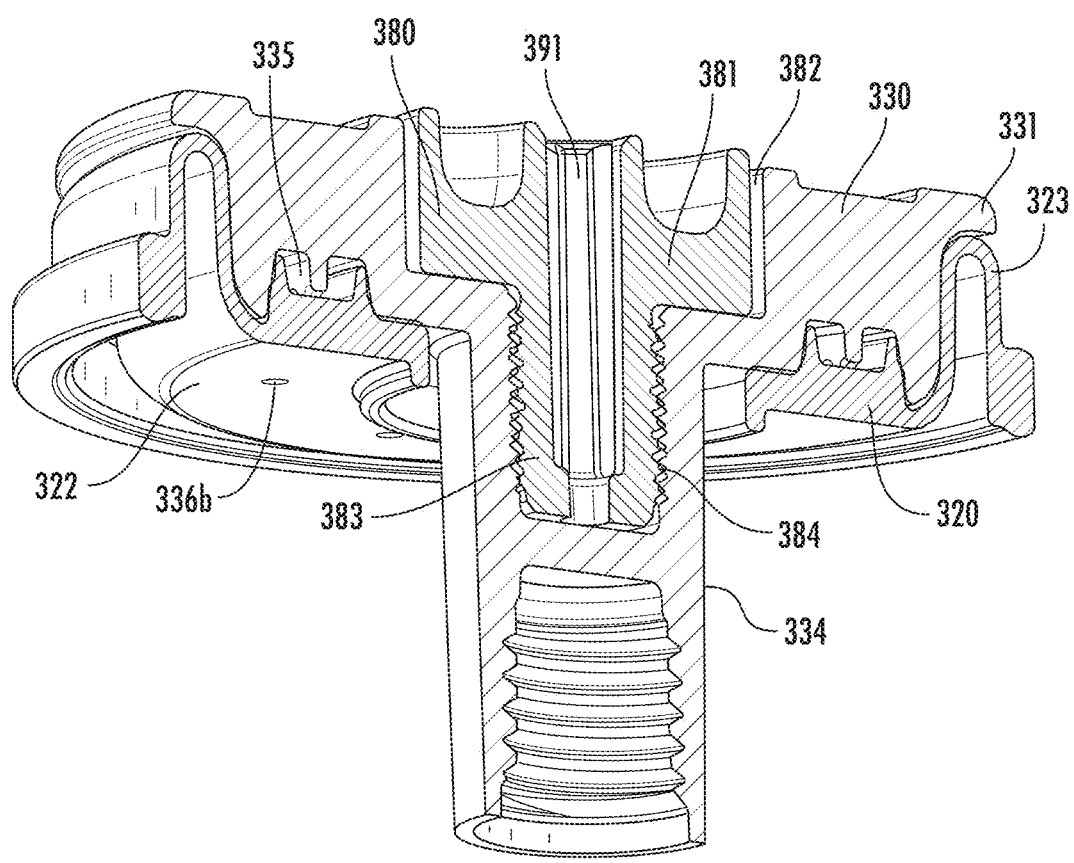
FIG. 13 is a bottom perspective view of a portion of the primary diaphragm assembly of the flushometer system of FIG. 1.
Figure 14:
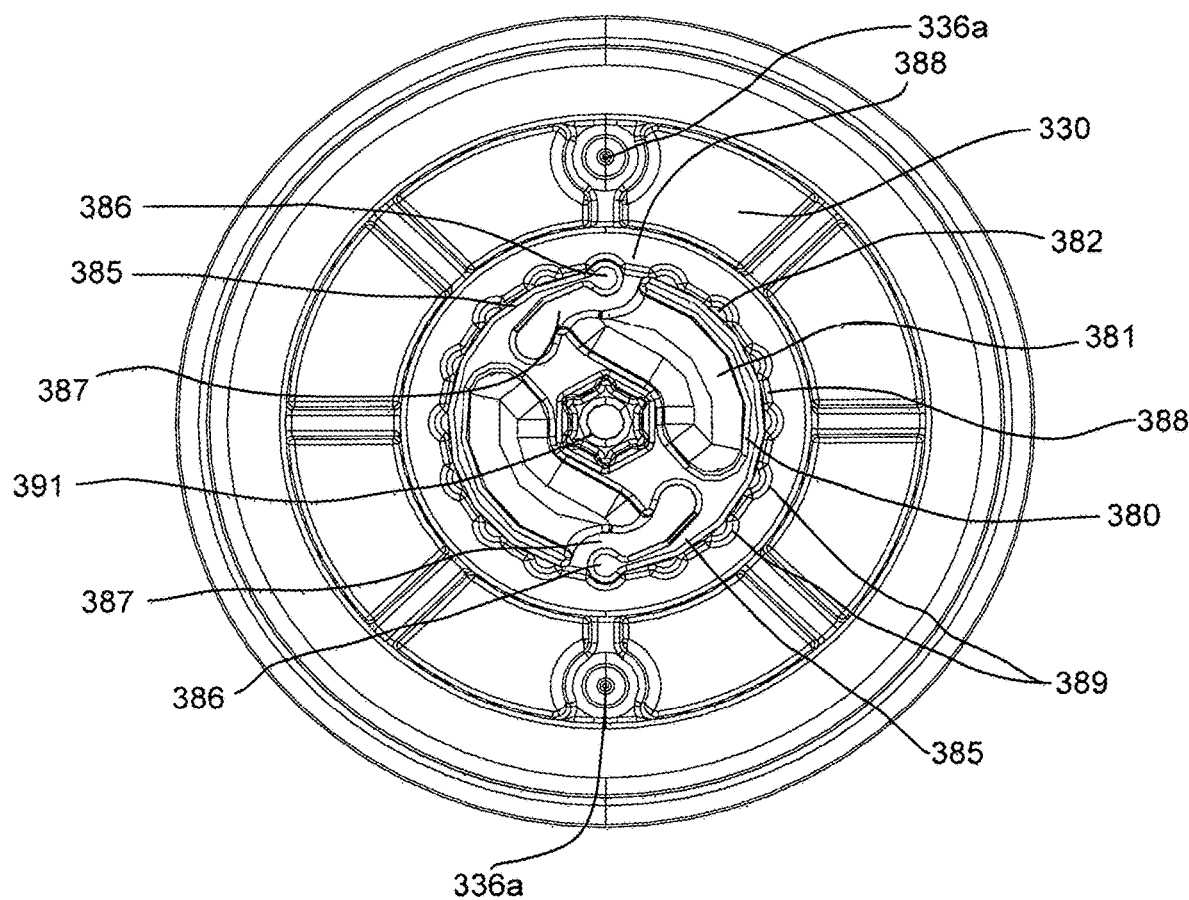
FIG. 14 is a top view of a portion of the primary diaphragm assembly of the flushometer system of FIG. 1.

FIG. 11 illustrates another embodiment of a main valve body 212 that is configured similarly to the main valve body 212 in FIGS. 2-10. The main valve body 212 in FIG. 11 has one or more skirts 278 extending downward to partially cover the openings 214. The skirt(s) 278 in this embodiment minimize the effect of turbulence as fluid is flowing from the inlet 80 and ensures a more even distribution of fluid flow around the periphery of the main valve body 212.

The flushometer system 10 in FIGS. 1-24 also includes a diaphragm assembly 310 configured to move the valve assembly 210 between the open and closed positions and an activation assembly 410 configured to actuate the diaphragm assembly 310. The diaphragm assembly 310 in FIGS. 2-9, 12-17, and 23-24 includes a main or primary diaphragm assembly 320 that is configured to actuate the valve assembly 210, and a secondary diaphragm assembly 350 that is configured to actuate the primary diaphragm assembly 320 and configured to be actuated by the activation assembly 410. In one embodiment, both the primary and secondary diaphragm assemblies 320, 350 use a rolling diaphragm configuration.

The primary diaphragm assembly 320 in FIGS. 2-9 and 12-13 includes a primary disc assembly 321 and a primary diaphragm 322 connected to the primary disc assembly 321. The primary diaphragm 322 in FIGS. 2-9 and 12-13 is configured as a rolling diaphragm and is seated on a primary diaphragm seat 324 and fixedly engaged at the outer edge 326 thereof between the primary diaphragm seat 324 and a primary diaphragm cover 328. The primary diaphragm seat 324 includes a raised ring 325 configured to sit within a rolled portion 323 of the primary diaphragm 322 to ensure that the shape is retained. The primary diaphragm seat 324 is connected to the bottom piece of the pressure vessel 110 and has a collar 327 that extends downward and receives a portion of the valve assembly 210 therethrough. A seal 329 (FIG. 2) may be positioned between the primary diaphragm seat 324 and the pressure vessel 110. The primary disc assembly 321 includes a disc 330 (also referred to as a primary disc) connected to the primary diaphragm 322 at a location positioned radially inwardly from the rolled portion 323 of the diaphragm 322. As shown in FIGS. 2-5 and 8-9, the inner portion of the primary diaphragm 322 is received between the underside of the disc 330 and the top of the valve seat body 215 of the valve assembly 210. The disc 330 in this embodiment further includes a lip 331 that extends outward to at least partially cover the rolled portion 323 of the primary diaphragm 322. As shown, e.g., in FIG. 13, the lip 331 is an annular flange extending radially outward around the entire periphery of the disc 330 and has a curved contour on the underside to match the form of the rolled portion 323 of the primary diaphragm 322. This lip 331 helps protect the rolled portion 323 of the primary diaphragm 322 from shock from events such as water hammer. In another embodiment, this lip 331 may not be included. The primary diaphragm seat 324 in FIGS. 1-24 is part of a single piece with the valve sleeve 114, as shown in FIGS. 2-9 and 12-14; however, these structures may be separate in another embodiment. The disc 330 assists in shaping, protecting, structurally reinforcing, and securing the primary diaphragm 322 during operation of the diaphragm assembly 310.

The primary diaphragm cover 328 and the primary diaphragm seat 324 define a primary chamber 332 in which the disc 330 and the primary diaphragm 322 are disposed. The disc 330 and the primary diaphragm 322 are configured such that the disc 330 is moveable vertically within the primary chamber 332. In the embodiment of FIGS. 2-9 and 12-14, the primary disc assembly 321, including the disc 330, is moveable vertically and linearly between a first or lowered position (see FIGS. 2-9), where the disc 330 and the primary diaphragm 322 are spaced from the underside of the primary diaphragm cover 328 and are proximate to the primary diaphragm seat 324, and a second or raised position (see FIG. 5), where the disc 330 and the primary diaphragm 322 are raised above the seat 324 and a portion of the primary disc assembly 321 may contact the underside of the cover 328.

The disc 330 is connected to the valve assembly 210 such that at least a portion of the valve assembly 210 including the main valve body 212 moves vertically and linearly in unison with the disc 330. The primary disc assembly 321 in FIGS. 2-9 and 12-14 includes a stem 334 extending downward from the disc 330 to connect the disc 330 to the valve assembly 210, such as by threaded connection. The disc 330 and the stem 334 may be a single, integral piece in one embodiment. As shown in FIGS. 2-9 and 13, the stem 334 is threadably connected to the main valve body 212, and the valve seat body 215 is compressed between the underside of the disc 330 and the main valve body 212. Other connection techniques may be used in other embodiments. In this configuration, the movement of the primary disc assembly 321 between the first and second positions is configured to move the valve assembly 210 between the open and closed positions, such that when the primary disc assembly 321 is in the first or lowered position, the valve assembly 210 is in the closed position (see FIG. 4A), and when the primary disc assembly 321 is in the second or raised position, the valve assembly 210 is in the open position (see FIG. 5). The valve seat body 215 moves with the primary disc assembly 321 and has ribs 217 (see FIGS. 8 and 12) or other guiding structures to keep movement of the interconnected components as linear as possible, aiding in uniform contact of the valve seat seal 251 with the main valve seat 152. The ribs 217 may engage the collar 327 to guide this movement.

Movement of the primary disc assembly 321 between the first and second positions may be accomplished by controlling the pressure in the primary chamber 332, such that venting the space 333 between the primary diaphragm assembly 320 and the underside of the cover 328 results in the disc 330 and primary diaphragm 322 being forced upward by greater fluid pressure in the valve inlet chamber 112, e.g., passing through openings 239 in the valve seat body 215 of the valve assembly 210 and acting on the underside of the primary diaphragm 322. More specifically, the pressure in the primary chamber 332 is controlled by controlling the available volume for the fluid in the primary chamber 332. When either the automatic activation assembly 420 or the manual activation assembly 450 is activated, the available volume for the fluid within the primary chamber 332 is increased (via mechanisms described herein), thereby decreasing the fluid pressure and force on the top of the primary diaphragm assembly 320. After at least partial evacuation of the space 333, the primary chamber 332 begins to refill with fluid at a controlled rate by controlled passage of the fluid through the primary diaphragm 322 and the disc 330.

The disc 330 includes one or more bypasses 336a that allow fluid to pass from the valve inlet chamber 112 through the bypass(es) 336a and into the primary chamber 332. The primary diaphragm 322 also includes one or more bypasses 336b in communication with the bypass(es) 336a of the disc 330 such that water can flow through the disc 330 and the primary diaphragm 322. Each bypass 336a of the disc 330 in the embodiment of FIGS. 2-9 and 12-14 has a controlled size to control the flow rate and may include a filter as well. The bypass(es) 336b of the primary diaphragm 322 in this embodiment allow a higher flow rate than the bypass(es) 336a of the disc 330, such that the bypass(es) 336a of the disc 330 control overall flow rate through the primary diaphragm assembly 320. In another embodiment, the bypass(es) 336b through the primary diaphragm 322 may be configured to limit overall flow rate. In the embodiment of FIGS. 2-9 and 12-14, the disc 330 has a filter 335 in the form of a serrated ring that extends between the bypass(es) 336b through the primary diaphragm 322 and the bypass(es) 336a through the disc 330. The filter 335 prevents particles larger than the gaps in the serrated ring from flowing into and clogging the bypass(es) 336a. This controlled flow rate through the disc 330 permits the primary chamber 332 to be filled slowly, which returns the disc 330 to the first position, and thereby returns the valve assembly 210 to the closed position, at a controlled rate. Once the primary chamber 332 is no longer vented and the disc 330 returns to the first position (FIG. 4A), the primary diaphragm assembly 320 is in stable state, due to equalized force on both the top and bottom sides of the disc 330. It is understood that the disc 330 may also experience equalized pressure on both the top and bottom sides thereof after returning to the first position, but that the disc 330 may return to the first position before complete equalization of pressure, due to differences in area on the top and bottom sides of the disc 330 creating force equalization before pressure equalization.

The primary disc assembly 321 in FIGS. 2-9 and 12-14 also includes a stroke adjuster 380 connected to the disc 330 and having a height that is adjustable with respect to the disc 330. The stroke adjuster 380 in this configuration extends above an uppermost surface of the disc 330, such that the stroke adjuster 380 may contact the underside of the primary diaphragm cover 328 when the disc 330 is moved to the second position. Adjustment of the height of the stroke adjuster 380 relative to the disc 330 therefore adjusts the total vertical movement range of the disc 330 and the minimum amount of volume reduction in the primary chamber 332 during activation. The stroke adjuster 380 in FIGS. 2-9 and 12-14 has an engaging body 381 received in a recess 382 on the top surface of the disc 330 and a threaded stem 383 extending downward from the engaging body 381 and threadably engaging a threaded hole 384 within the recess 382 that extends downward through the disc 330 and into the stem 334 of the primary disc assembly 321. In this configuration, rotation of the stroke adjuster 380 with respect to the disc 330 adjusts the height of the stroke adjuster 380 with respect to the disc 330 by advancing or retreating via the threaded connection with the threaded stem 383. The engaging body 381 in FIGS. 2-9 and 12-14 has one or more flexible engaging arms 385 that are configured to engage the disc 330 to resist rotation of the stroke adjuster 380, particularly in the direction of threading advancement of the stem 383 into the threaded hole 384. In other words, the arms 385 resist rotation in the rotation direction that creates movement of the adjuster 380 toward the disc 330, which is downward movement in FIGS. 2-9 and 12-14. The arms 385 in FIGS. 2-9 and 12-14 extend generally circumferentially along the outer periphery of the engaging body 381 and are fixed at one end, such that the free ends of the arms 385 can be flexed inwardly by application of inward force with respect to the engaging body 381, and in particular, application of force that is radially directed with respect to the engaging body 381. The arms 385 have rounded ends 386 at the free ends thereof, and the ends 386 have greater radial thickness than the adjacent portions of the respective arm 385. The adjuster 380 in FIGS. 2-9 and 12-14 has two arms 385 that are located approximately opposite each other with respect to the rotational axis of the adjuster 380, and the engaging body 381 further has cavities 387 located inwardly of the arms 385 that provide room for the arms 385 to flex inwardly into the cavities 387. In another embodiment, the adjuster 380 may be configured with one arm 385 or more than two arms 385, i.e., the adjuster 380 may include at least one arm 385. A symmetrical configuration and distribution of the arm(s) 385 may assist with achieving more even rotation and avoid tilting of the adjuster 380 due to differential forces.

The periphery of the recess 382 is provided with a plurality of rounded engaging teeth 388 that extend inwardly around the entire periphery of the recess 382. The engaging teeth 388 are configured to engage the arms 385 as the adjuster 380 is rotated within the recess 382. Notches 389 are defined between the teeth 388, and the notches 389 in FIGS. 2-9 and 12-14 are rounded and dimensioned to receive the rounded ends 386 of the arms 385 to create a plurality of releasable locking positions for the adjuster 380 at various different rotational positions. When a counter-clockwise rotational force is exerted on the stroke adjuster 380, the teeth 388 around the recess 382 engage the arms 385 to exert a force that is primarily radial in direction, which easily flexes the arms 385 inward. In contrast, when a clockwise rotational force is exerted on the stroke adjuster 380, the ends 386 of the arms 385 engage the teeth 388 around the recess 382 in a direction that has a large circumferential or tangential component and a relatively smaller radial component, requiring greater rotational force to generate the radial force required to flex the arms 385 inward to clear the teeth 388. The increased rotational force necessary for clockwise rotation in this embodiment resists threading advancement of the stroke adjuster 380 within the threaded hole 384, which thereby resists the stroke adjuster 380 from being forced downward by contact with the primary diaphragm cover 328 when the disc 330 is moved to the second position. The consistent positioning of the stroke adjuster 380 created by this arrangement assists in maintaining a consistent stroke length of the disc 330. It is understood that the stroke length of the disc 330 can be adjusted by rotating the stroke adjuster 380 to adjust the height of the stroke adjuster 380 with respect to the disc 330. This adjustment can be done during assembly and/or in the field, due to the configuration of the stroke adjuster 380. The stroke adjuster 380 may include a specialized mating cavity 391 for receiving a tool (e.g., a hex wrench) for adjustment. The releasable locking configuration of the stroke adjuster 380 permits use in connection with either fine or coarse grained threads for raising and lowering the position of the stroke adjuster 380. In particular, the large diameter of the engaging body 381 compared to the stem 383 permits fine adjustments in height to be easily achieved and retained.

The secondary diaphragm assembly 350 in one embodiment is configured for venting the primary chamber 332 to actuate the primary diaphragm assembly 320. The secondary diaphragm assembly 350 in FIGS. 2-9 and 15-17 includes a secondary disc assembly 351 and a secondary diaphragm 352 connected to the secondary disc assembly 351. The secondary diaphragm 352 in FIGS. 2-9 and 15-17 is also configured as a rolling diaphragm and is seated on a secondary diaphragm seat 354 and fixedly engaged at the outer edge 356 thereof between the secondary diaphragm seat 354 and a secondary diaphragm cover 358. The secondary diaphragm seat 354 includes a raised ring 355 configured to sit within a rolled portion 353 of the secondary diaphragm 352 to ensure that the shape is retained. The secondary diaphragm seat 354 in FIGS. 2-9 and 15-17 is connected to the primary diaphragm cover 328 and has one or more openings 357 extending from the primary chamber 332 and in communication with the primary chamber 332 to permit fluid flow from the primary chamber 332 to the secondary chamber 362. The secondary diaphragm seat 354 in FIGS. 2-9 and 15-17 is part of a single, integral piece with the primary diaphragm cover 328; however, in another embodiment, the secondary diaphragm seat 354 may be a separate piece connected to the top of the primary diaphragm cover 328. The secondary diaphragm seat 354 defines a lower chamber 370 having an inner chamber portion 371 and an outer chamber portion 372 separated from the inner chamber portion 371 by an annular chamber wall 373 extending upward from the secondary diaphragm seat 354. The opening(s) 357 in communication with the primary chamber 332 extend into the outer chamber portion 372, but not the inner chamber portion 371 in the embodiment of FIGS. 2-9 and 15-17. The inner chamber portion 371 has a drain in the form of a tunnel 390 that extends through the secondary diaphragm seat 354 and opens into a spillway 416 within the pressure vessel 110 that permits vented fluid to flow to the outlet 90.

Figure 15:
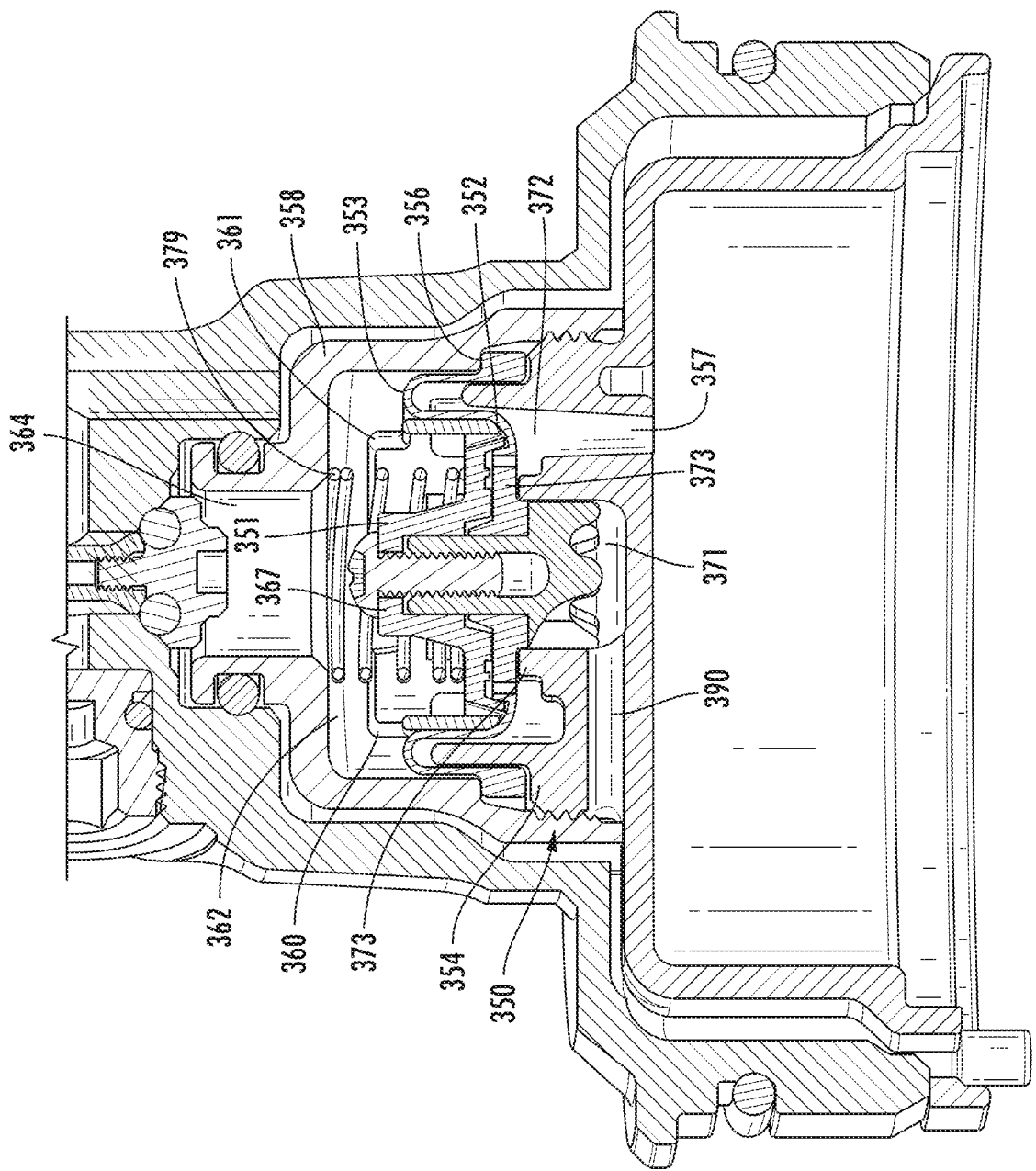
FIG. 15 is a perspective view of a portion of a diaphragm assembly of the flushometer system of FIG. 1.
Figure 16:
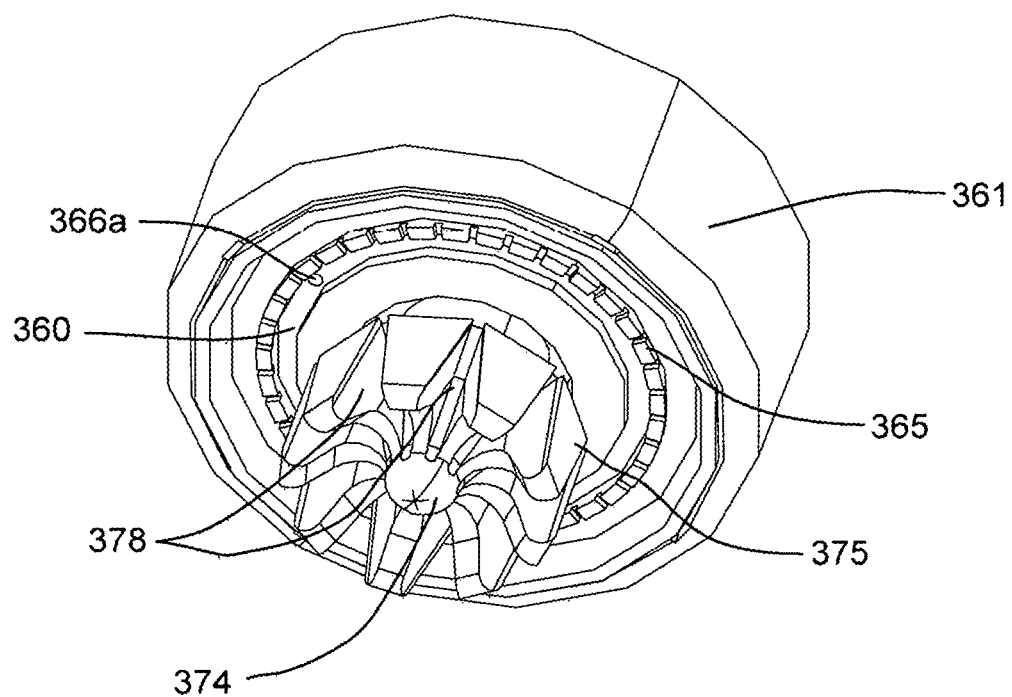
FIG. 16 is a bottom perspective view of a portion of the secondary diaphragm assembly of the flushometer system of FIG. 1.
Figure 17:
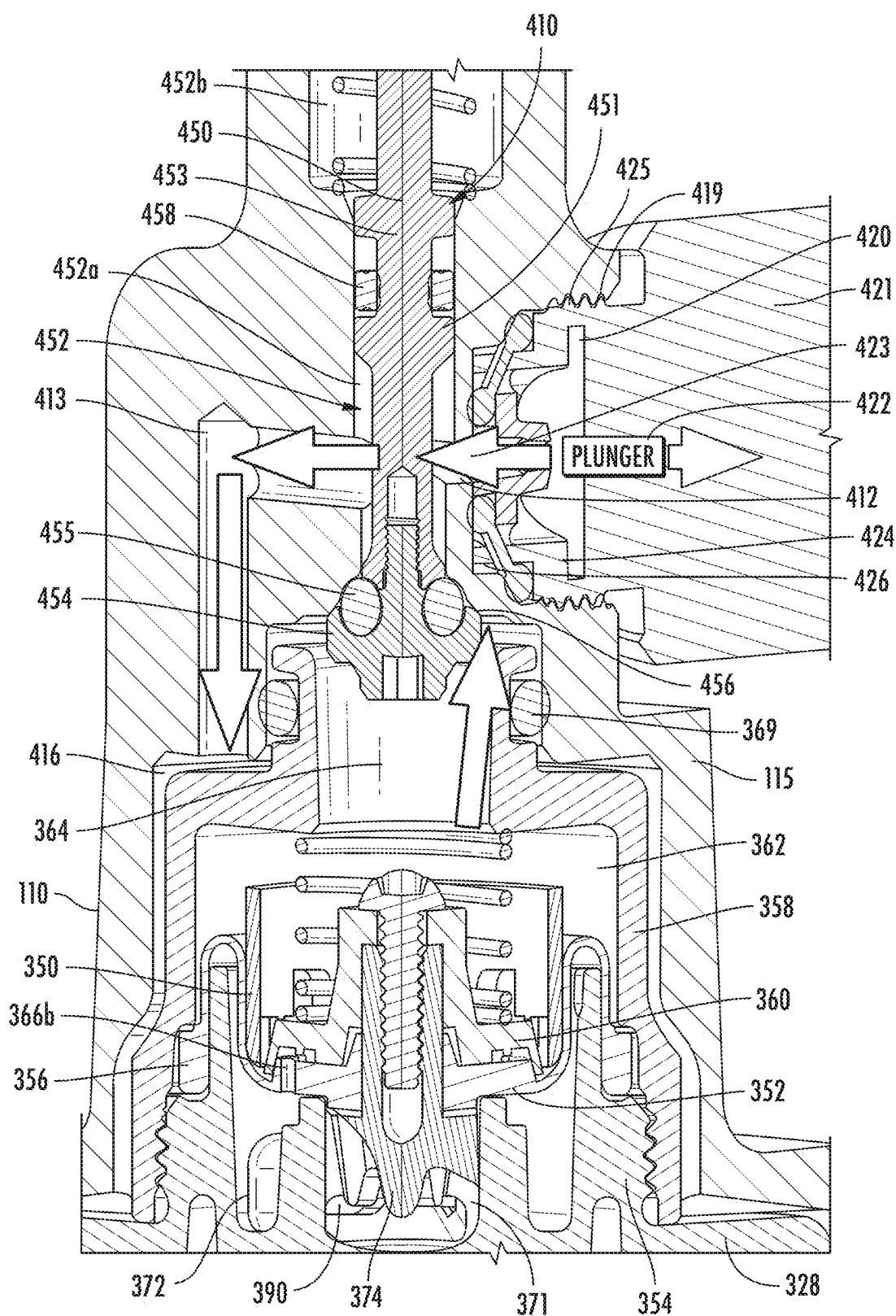
FIG. 17 is a cross-section view of a portion of an automatic activation assembly and a portion of the diaphragm assembly of the flushometer system of FIG. 1, with arrows showing movement of the automatic activation assembly and a first venting flow path of fluid from the diaphragm assembly.
Figure 18:
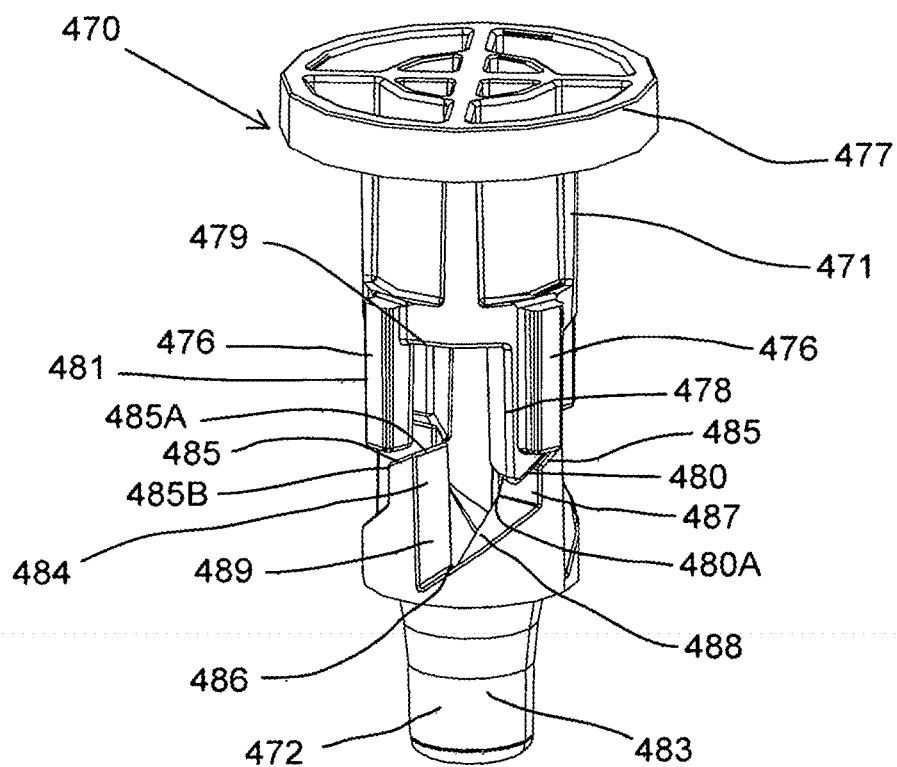
FIG. 18 is a perspective view of a thruster assembly of a manual activation assembly of the flushometer system of FIG. 1.
Figure 27:
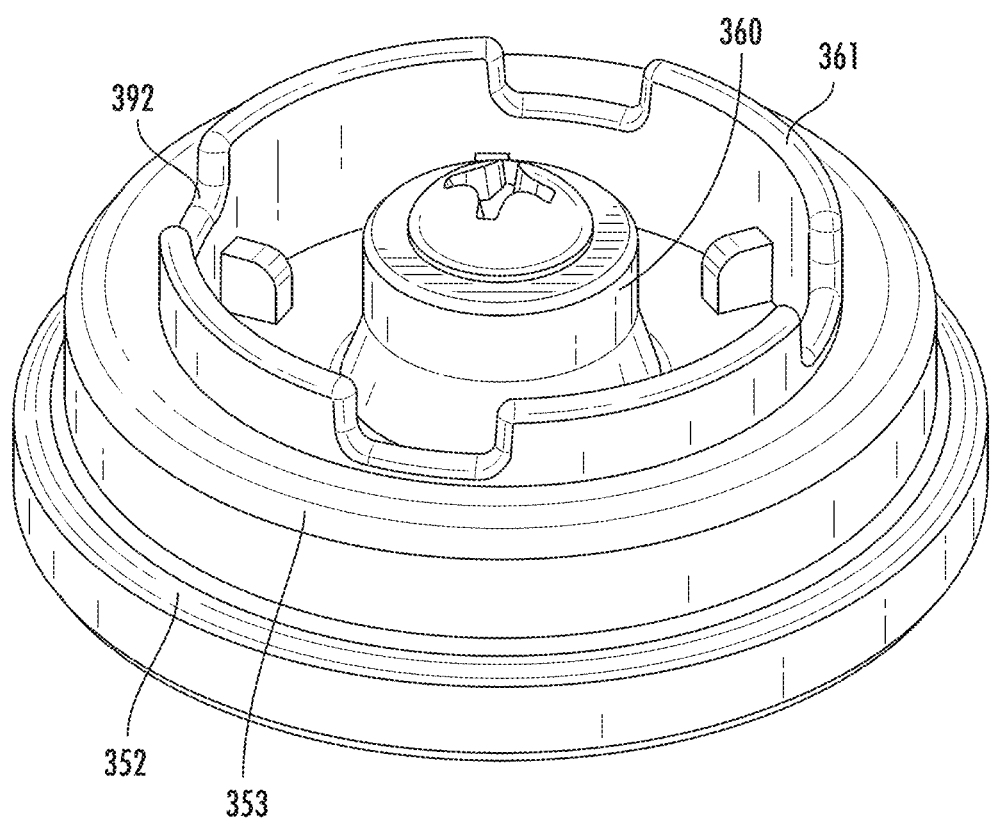
FIG. 27 is a perspective view of another embodiment of a secondary disc and a secondary diaphragm that may be used in connection with the flushometer system of FIGS. 1-24.

The secondary disc assembly 351 includes a secondary disc 360 connected to the secondary diaphragm 352 at a location positioned radially inwardly from the rolled portion 353 of the secondary diaphragm 352. As shown in FIG. 15, the inner portion of the secondary diaphragm 352 is connected to the underside of the secondary disc 360. The secondary disc 360 further includes a spacer wall 361 that extends upward from the disc 360 and defines an uppermost surface of the secondary disc assembly 351. The spacer wall 361 in FIGS. 2-9 and 15-17 is an annular wall of uniform height, although the spacer wall 361 may be configured differently in other embodiments, including as wall having a varying height (e.g., a serrated or similar contour) or a plurality of walls forming an annular shape. FIG. 27 illustrates another embodiment of a secondary disc 360 that may be used in connection with any embodiments described herein and is dimensioned for use interchangeably with the secondary disc 360 in the embodiment of FIGS. 1-24, as shown in FIGS. 4A-4E. In the embodiment of FIG. 27, the spacer wall 361 has a serrated contour having varying heights around the periphery of the secondary disc 360, created by a plurality of recesses 392 distributed around the top of the spacer wall 361. The disc 360 also includes a post or protrusion 367 extending upward from the top of the disc 360 within the periphery of the spacer wall 361. In this configuration, a portion of the secondary diaphragm 352 passes between the spacer wall 361 and the raised ring 355 of the secondary diaphragm seat 354. In another embodiment, the protrusion 367 may form the uppermost surface of the secondary disc assembly 351. The secondary disc 360 assists in shaping, protecting, and structurally reinforcing the secondary diaphragm 352 during operation of the diaphragm assembly 310.

The secondary diaphragm cover 358 and the secondary diaphragm seat 354 define a secondary chamber 362 in which the secondary disc 360 and the secondary diaphragm 352 are disposed. In the embodiment of FIGS. 2-9 and 15-17, the secondary diaphragm cover 358 is threaded onto the secondary diaphragm seat 354, and the secondary diaphragm cover 358 has an opening 364 in the top wall thereof to permit venting of the secondary chamber 362. The secondary disc 360 and the secondary diaphragm 352 are configured such that the secondary disc 360 is moveable vertically within the secondary chamber 362. In the embodiment of FIGS. 2-9 and 15-17, the secondary disc assembly 351, including the secondary disc 360, is moveable vertically and linearly between a first or lowered position (see FIG. 4A), where the secondary disc 360 and the secondary diaphragm 352 are proximate to the secondary diaphragm seat 354 and are spaced from the underside of the secondary diaphragm cover 358, and a second or raised position (see FIG. 5), where the secondary disc 360 and the secondary diaphragm 352 are raised above the secondary seat 354 and a portion of the secondary disc assembly 351 (e.g., the spacer wall 361) contacts the underside of the secondary cover 358. In one embodiment, the height of the spacer wall 361 defines the range of movement of the secondary disc 360. When the secondary disc assembly 351 is in the first or lowered position, the secondary diaphragm 352 contacts the chamber wall 373, thereby sealing the inner chamber portion 371 of the lower chamber 370 from the outer chamber portion 372 thereof and thereby sealing against fluid flow from the primary chamber 332 into the secondary chamber 362. Fluid communication between the inner and outer chamber portions 371, 372 is achieved when the secondary disc 360 is raised toward the second or raised position.

Figure 5:
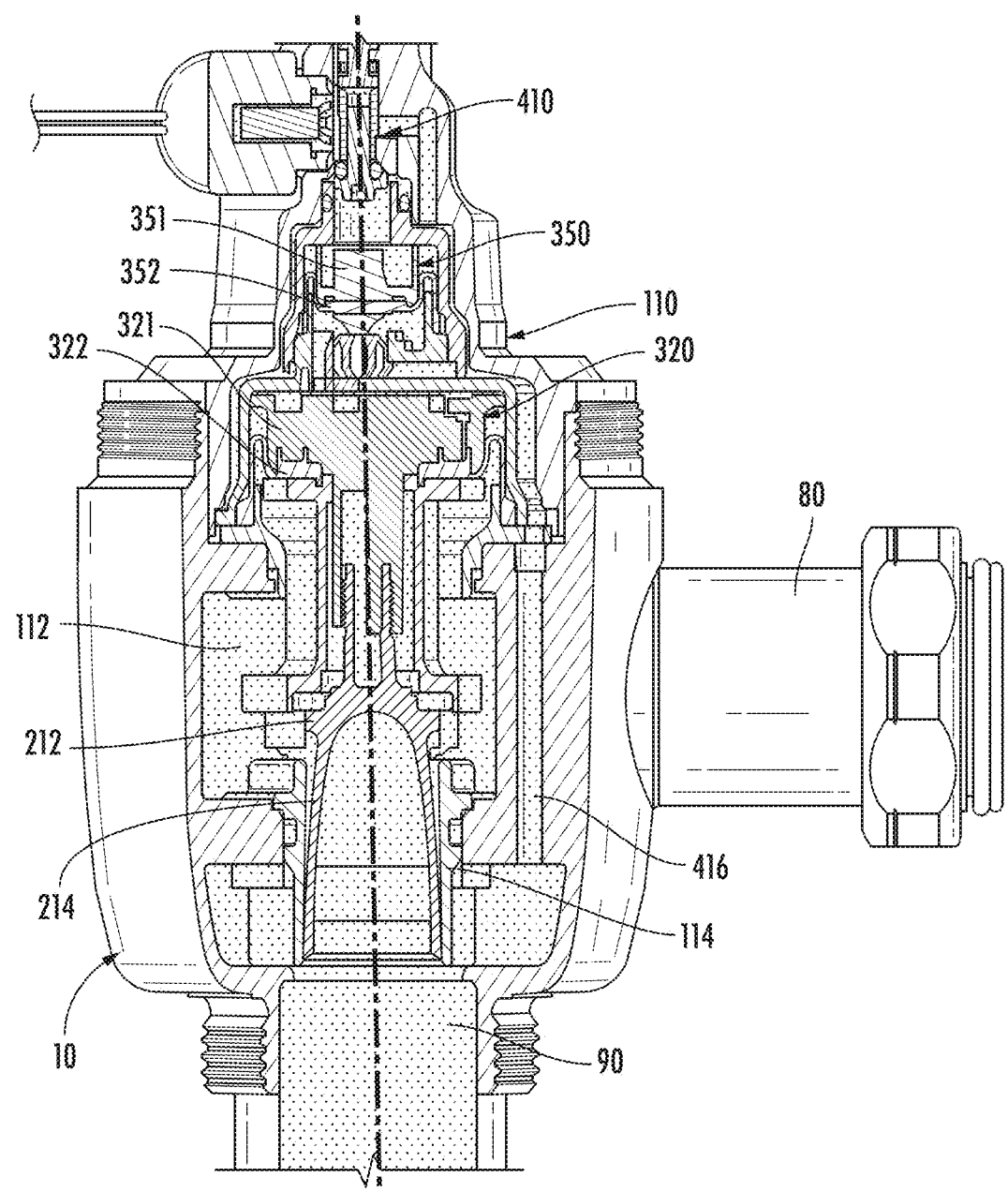
FIG. 5 is a cross-section view of a portion of the flushometer system of FIG. 1, with the valve assembly in an open position, the primary diaphragm assembly in a raised position, and the secondary diaphragm assembly in a raised position.
Figure 6:
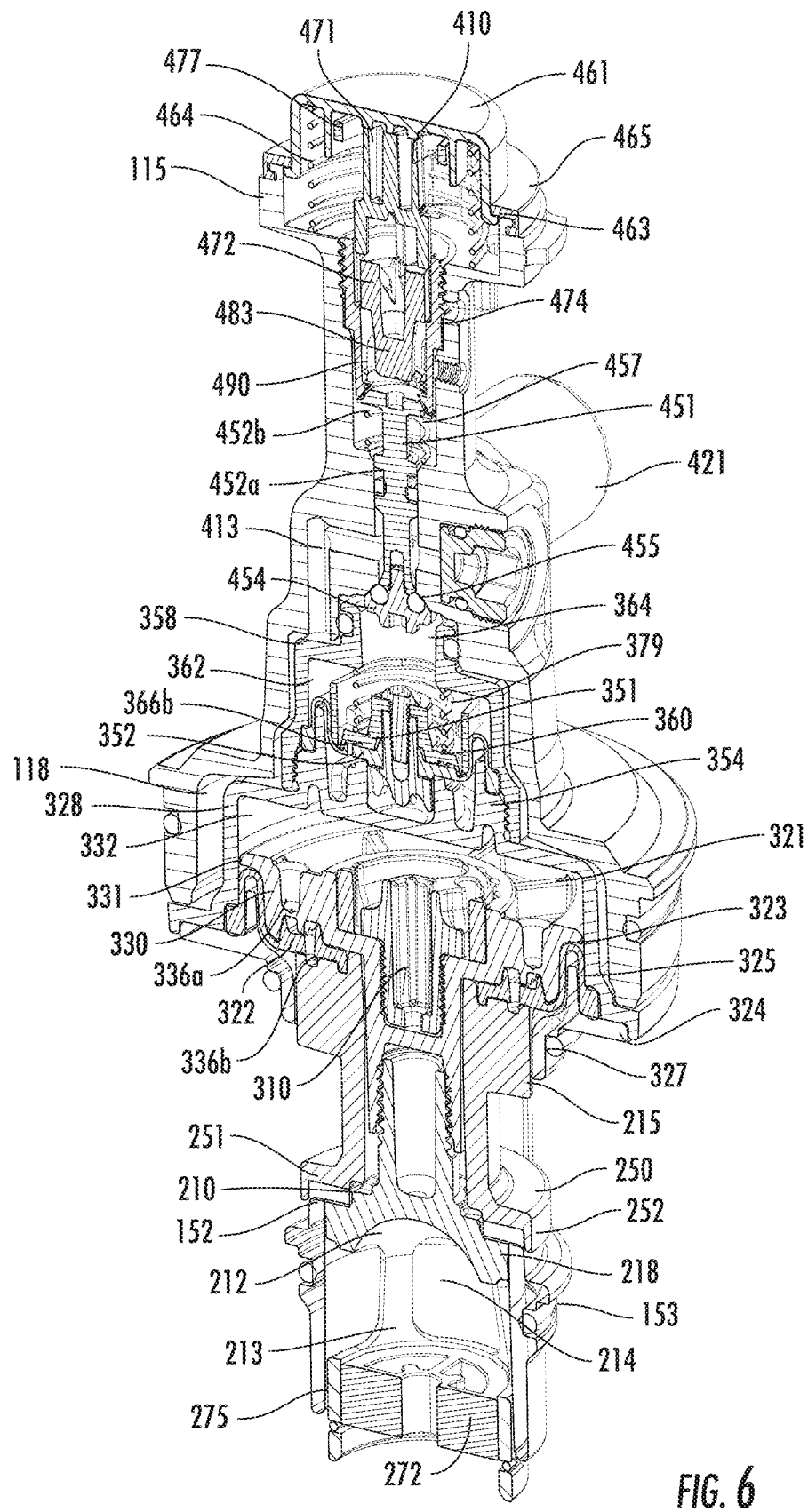
FIG. 6 is a perspective cross-section view of a portion of the flushometer system of FIG. 1.
Figure 7:
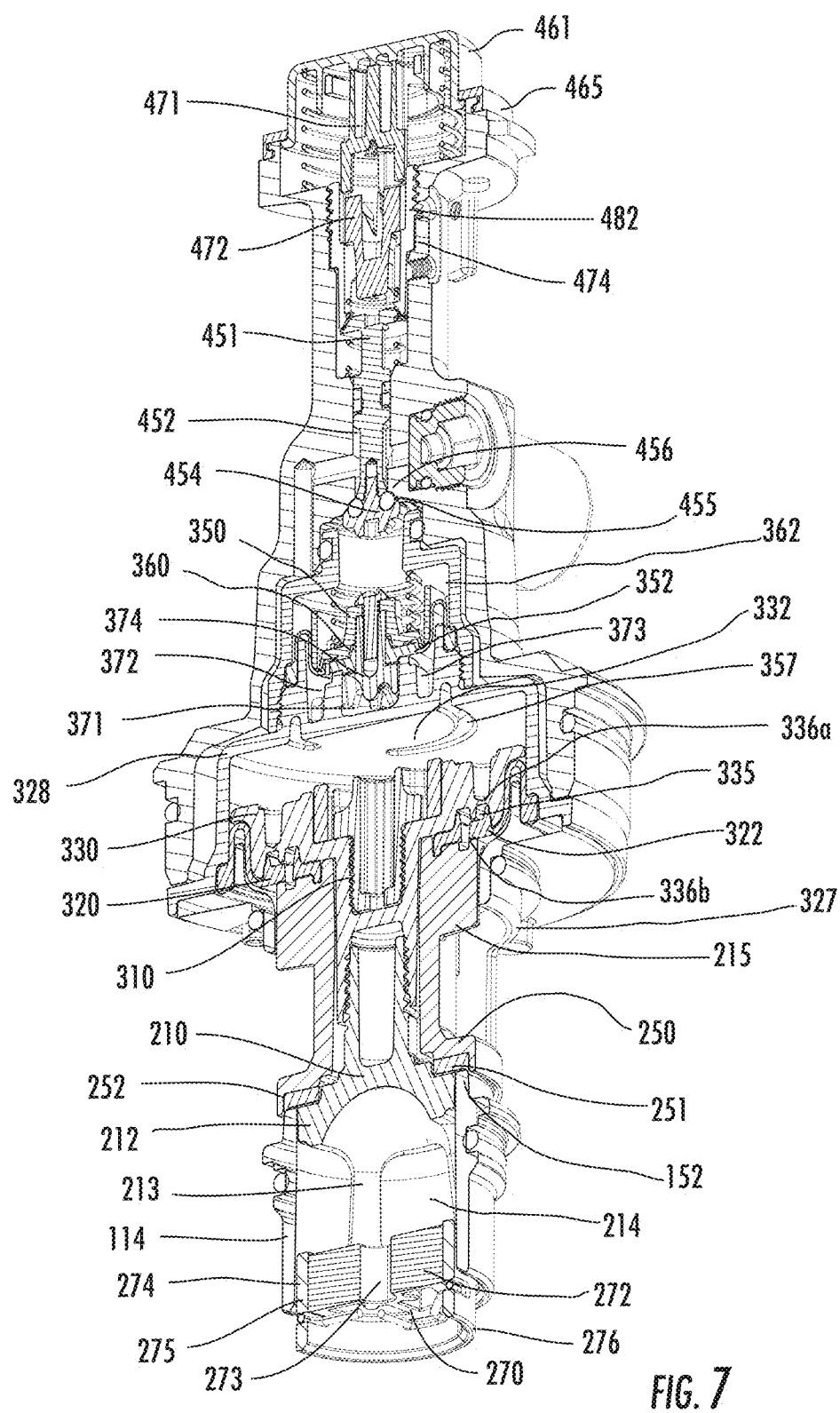
FIG. 7 is a bottom perspective cross-section view of a portion of the flushometer system of FIG. 1.
Figure 8:
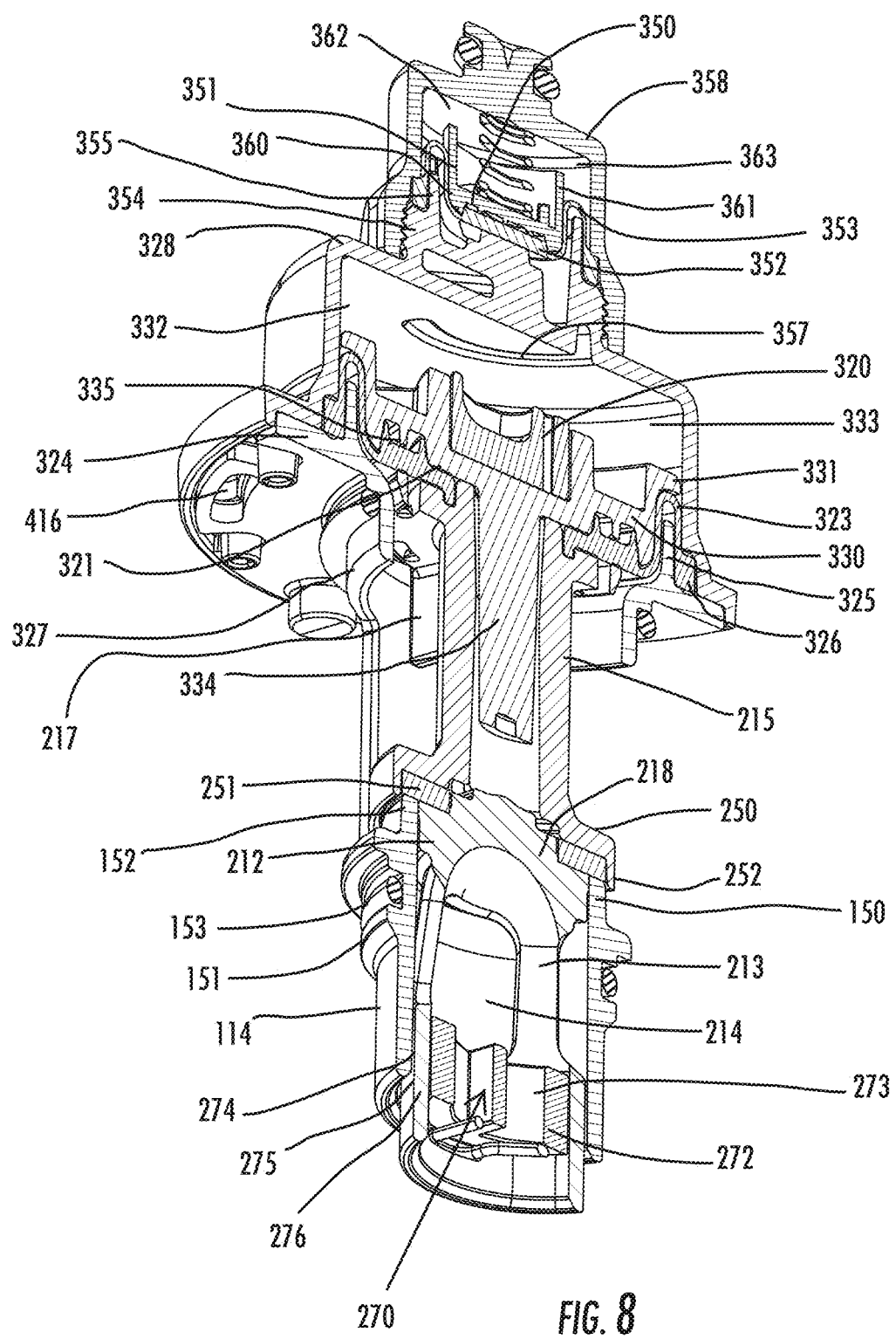
FIG. 8 is a bottom perspective cross-section view of a portion of the flushometer system of FIG. 1.
Figure 9:
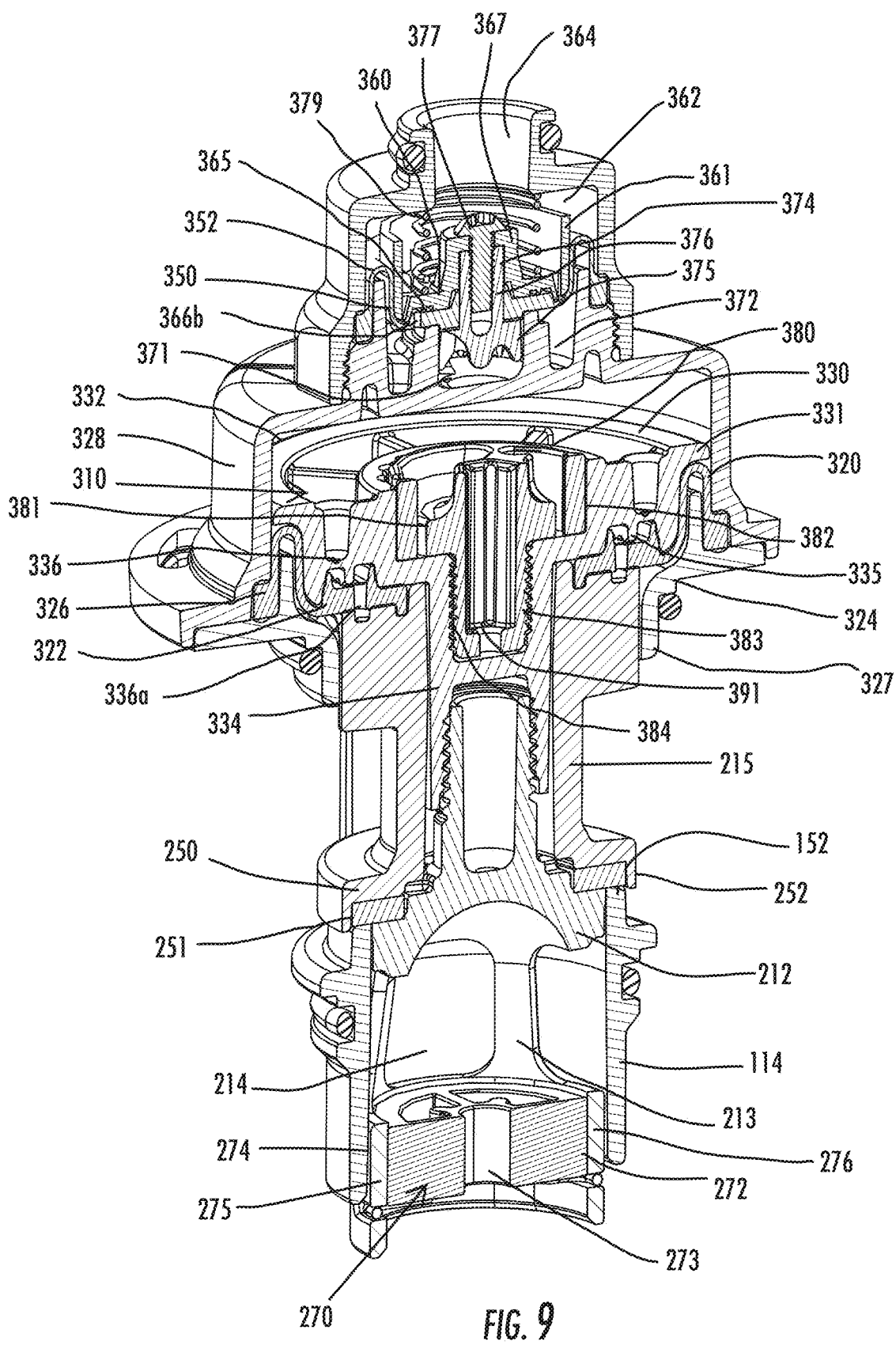
FIG. 9 is a perspective cross-section view of a portion of the flushometer system of FIG. 1.
Figure 10:
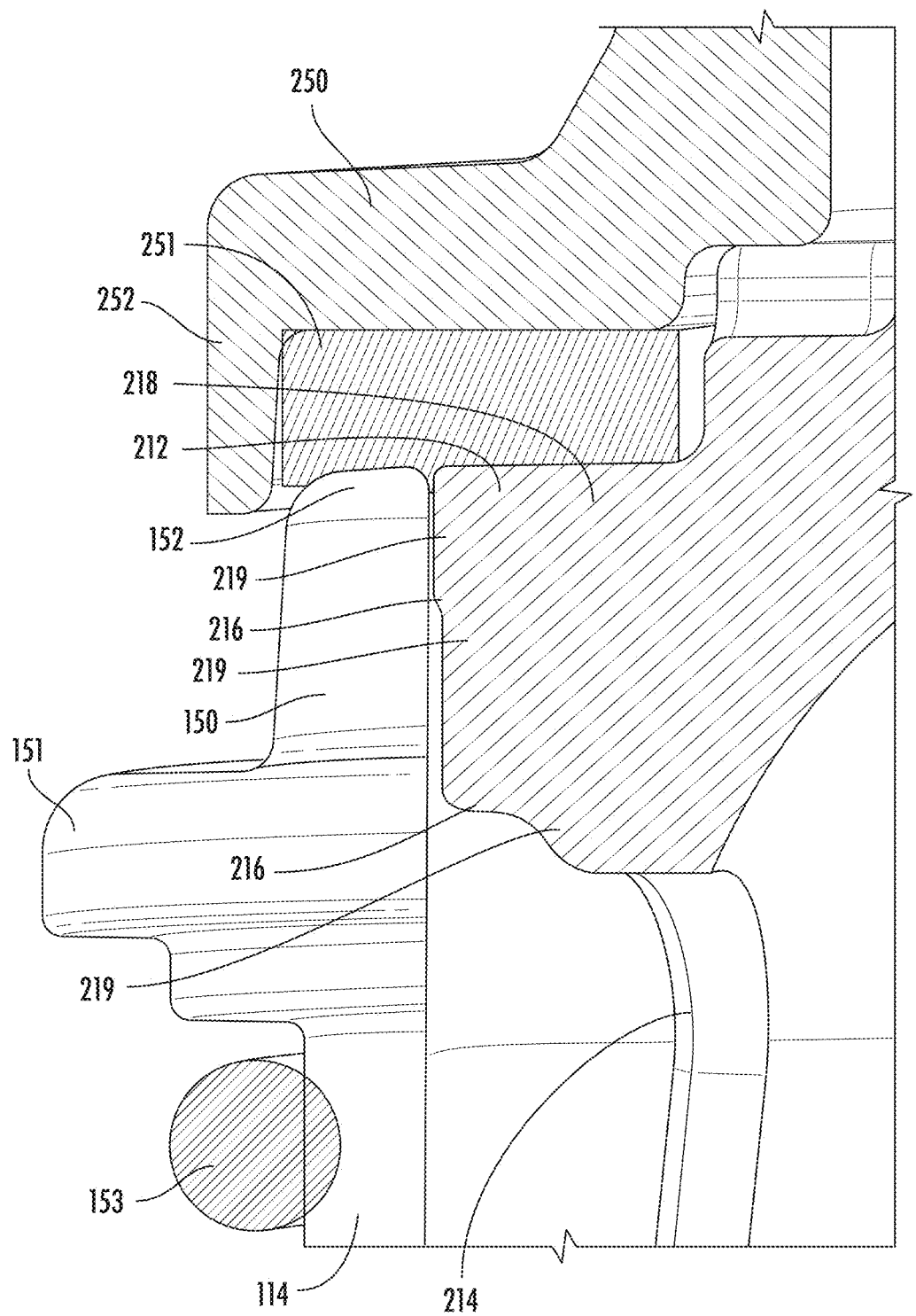
FIG. 10 is a magnified cross-section view of a portion of the flushometer system of FIG. 1.

The secondary diaphragm assembly 350 also includes a flow regulator or snubber 374 configured to regulate flow of fluid between the inner and outer chamber portions 371, 372 of the lower chamber 370 and thereby control venting of the primary chamber 332. The flow regulator 374 in FIGS. 2-9 and 15-17 includes a base 375 with an outer diameter or width that is substantially the same as the inner diameter or width of the inner chamber portion 371, so the base 375 fits closely within the inner chamber portion 371. The flow regulator 374 is connected to the secondary disc 360 and is configured to move in unison with the secondary disc 360. In the embodiment of FIGS. 2-9 and 15-17, the flow regulator 374 includes a stem 376 that extends into the protrusion 367 of the secondary disc 360 and is connected to the protrusion 367 by a fastener 377. The base 375 of the flow regulator 374 has a plurality of passages or slots 378 that have widths that decrease from the bottom or free end of the base 375 toward the top or the stem 376 of the flow regulator 374. When the disc 360 is raised from the secondary diaphragm seat 354, fluid flow from the outer chamber portion 372 to the inner chamber portion 371 passes through the passages 378 of the flow regulator 374. As seen in FIG. 5, when the secondary disc 360 is in the raised position, a portion of the base 375 of the flow regulator 374 is still received within the inner chamber portion 371, such that fluid flow to the inner chamber portion 371 passes through the passages 378. As described elsewhere herein, this tapered width configuration of the passages 378 of the flow regulator 374 reduces the total area of each passage 378, and of all passages 378 combined, in a more gradual manner as the base 375 moves further downward into the inner chamber portion 371. The flow of fluid from the outer chamber portion 372 to the inner chamber portion 371 therefore also decreases in a more gradual manner as the flow regulator 374 moves further into the inner chamber portion 371. As similarly described herein, this gradual reduction in flow rate assists in avoiding shock to the plumbing system.

Movement of the secondary disc assembly 351 between the first and second positions may be accomplished by controlling the pressure in the secondary chamber 362, such that venting the space 363 between the secondary disc 360 and the underside of the secondary diaphragm cover 358 results in the secondary disc 360 being forced upward by greater fluid pressure in the lower chamber 370, e.g., acting on the underside of the secondary diaphragm 352. Pressure in the secondary chamber 362 is controlled by controlling the available volume for fluid in the secondary chamber 362, i.e., via activation of the automatic activation assembly 420 or the manual activation assembly 450, as described above with respect to the primary chamber 332. The secondary disc assembly 351 may also include a spring 379 engaged with the secondary disc 360 and the underside of the secondary diaphragm cover 358 that is biased to encourage movement of the secondary disc 360 to the first position. This assists the secondary diaphragm 352 in returning to the first position in systems with low fluid pressure. The embodiment of FIGS. 2-9 and 15-17 has such a spring 379 in the form of a coil spring that encircles the protrusion 367 and is received between the protrusion 367 and the spacer wall 361. After at least partial evacuation of the space 363, the secondary chamber 362 begins to refill with fluid at a controlled rate by controlled passage of the fluid through the secondary diaphragm 352 and the secondary disc 360. The secondary disc 360 includes one or more bypasses 366a that allow fluid to pass from the outer chamber portion 372 of the lower chamber 370 through the bypass(es) 366a and into the secondary chamber 362. The secondary diaphragm 352 also includes one or more bypasses 366b in communication with the bypass(es) 366a of the secondary disc 360 such that water can flow through the secondary disc 360 and the secondary diaphragm 352. Each bypass 366a,b has a controlled size to control the flow rate and may include a filter as well. In the embodiment of FIGS. 2-9 and 15-17, the secondary disc 360 has a filter 365 in the form of a serrated ring that extends between the bypass(es) 366b through the secondary diaphragm 352 and the bypass(es) 366a through the secondary disc 360. The filter 365 prevents particles larger than the gaps in the serrated ring from flowing into and clogging bypass(es) 366a,b. This controlled flow rate through the secondary disc 360 permits the secondary chamber 362 to be filled slowly, which returns the secondary disc 360 to the first position at a controlled rate.

The passage of fluid through the passages 378 in the flow regulator 374 controls the fluid flow rate from the outer chamber portion 372 to the inner chamber portion 371 in a gradual manner, and also contributes to controlling the fluid flow rate through the secondary disc 360. Fluid flow into and through the lower chamber 370 enters the lower chamber 370 through openings 357 from the primary chamber 332 of the primary diaphragm assembly 320 to the outer chamber portion 372 of the lower chamber 370. As a result, movement of the secondary diaphragm assembly 351 to the second position achieves venting of the primary chamber 332 and movement of the primary disc assembly 321 to the second position. The flow rate from the outer chamber portion 372 to the inner chamber portion 371 affects the venting rate of the primary chamber 332 and thereby also controls the speed of movement of the primary disc assembly 321 to the second position and movement of the valve assembly 210 to the open position. Upon activation of the automatic activation assembly 420 or the manual activation assembly 450, venting of the secondary chamber 362, and raising of the secondary diaphragm 352, the primary chamber 332 is vented quickly. The design of the secondary diaphragm assembly 350 permits a high flow rate of fluid out of the primary chamber 332 to be achieved in a rapid manner, achieving this quick venting of the primary chamber 332. Fluid can exit the inner chamber portion 371 through a tunnel 390 (see FIG. 15) that extends from the inner chamber portion 371 out of the secondary diaphragm assembly 350 to a spillway 416 within the pressure vessel 110 that permits vented fluid to flow to the outlet 90. Once the secondary disc 360 returns to the first position (FIG. 4A) and the secondary chamber 362 is not vented, the secondary diaphragm assembly 350 returns to an equilibrium state, with equalized pressure on both the top and bottom sides of the secondary disc 360. As similarly described above with respect to the primary diaphragm assembly 320, the secondary disc 360 may return to the first position before complete equalization of pressure, due to differences in area on the top and bottom sides of the secondary disc 360 creating force equalization before pressure equalization.

The activation assembly 410 is configured to actuate the diaphragm assembly 310 by selectively venting the secondary chamber 362 to move the secondary disc 360 and the secondary diaphragm 352 to the second position, which then vents the primary chamber 332, moving the disc 330 and the primary diaphragm 322 to the second position and moves the valve assembly 210 to the open position to initiate the flow of water through the outlet 90. The activation assembly 410 may include at least one of an automatic activation assembly 420 and a manual activation assembly 450, each of which is capable of venting the secondary chamber 362 to actuate the diaphragm assembly 310 and the valve assembly 210. The flushometer system 10 in FIGS. 1-24 includes an automatic activation assembly 420 and a manual activation assembly 450 that vent the secondary chamber 362 through different venting pathways 412, 414 that converge to a common venting pathway 413. In the embodiment of FIGS. 1-24, the automatic activation assembly 420 and the manual activation assembly 450 are configured to evacuate substantially the same volume of water from the secondary chamber 362, although the manual activation assembly 450 may evacuate the volume of water slightly more rapidly than the automatic activation assembly 420. In another embodiment, the automatic activation assembly 420 may evacuate a greater volume of water from the secondary chamber 362 than the manual activation assembly 450.

The automatic activation assembly 420 in FIGS. 1-7, 17, and 23-24 uses a solenoid assembly 421 that is electrically powered and activated by an electronic switch (not shown), which may be part of a circuit board that includes sensors and other components, although other automatic activation mechanisms may be used. The solenoid assembly 421 also includes a body 424 and a moveable solenoid plunger 422 (shown schematically in FIG. 17) that obstructs a passage 423 that partially defines a first venting pathway 412 in communication with the opening 364 to the secondary chamber 362. The passage 423 is in communication with the secondary chamber 362 through one or more passages (not shown) that extend through the pressure vessel 110 from the area of the diaphragm cavity 118 above the opening 364 to the solenoid assembly 421 at the area indicated by 426 in FIG. 17. One or more additional passages (not shown) may extend through the body 424 of the solenoid assembly 421 to permit passage of water from the area 426 to the passage 423. The solenoid assembly 421 is moveable between a closed position, where the solenoid assembly 421 (e.g., the plunger) seals the passage 423 from the area 426 and the first venting pathway 412, and an open position, where the solenoid assembly 421 is moved (e.g., by retracting the plunger 422) to permit fluid to exit the secondary chamber 362 through the passage 423 and into the first venting pathway 412. The first venting pathway 412 exits into the spillway 416 within the pressure vessel 110 that permits vented fluid to flow to the outlet 90, and in the embodiment of FIGS. 1-7, 17, and 23-24, a common venting pathway 413 extending through the pressure vessel 110 connects the first venting pathway 412 to the spillway 416. A seal 369 is positioned around the opening 364 to seal the opening from spillway 416 when neither the automatic activation assembly 420 nor manual activation assembly 450 is operating to vent the secondary chamber 362. The solenoid assembly 421 includes plurality of additional seals 419 are positioned around the first venting pathway 412 to retain the fluid within the desired pathway.

The solenoid assembly 421 includes a solenoid (not shown) configured to move the solenoid plunger 422, e.g., moving the plunger 422 to the open position when the solenoid assembly 421 is activated and permitting the plunger 422 to return to the closed position when the solenoid assembly 421 is deactivated. It is understood that the solenoid assembly 421 may include a spring or other biasing means (not shown) configured to bias the plunger to the closed position, such that the plunger requires force input from the solenoid to be moved to the open position. When the solenoid assembly 421 returns to the closed position, venting of the secondary chamber 362 ceases, and the secondary chamber 362 begins refilling as described herein.

The electronic switch includes a sensor (not shown), such as an occupancy sensor, that is configured for sensing the presence or absence of a person using the fixture, and the electronic switch activates the solenoid assembly 421 based on input from the sensor. It is understood that the flushometer system 10 may include a computer controller (not shown) in electronic communication with the electronic switch for determining when to activate and deactivate the solenoid assembly 421 to commence and control the flushing operation. In one embodiment, the computer controller may be configured to sense activation of the manual activation assembly 450 and also initiate a timed activation of the solenoid assembly 421 to achieve more consistent and repeatable performance than the manual activation assembly 450 alone. The solenoid assembly 421 in FIGS. 1-7, 17, and 23-24 is inserted within a threaded opening 425 in the pressure vessel 110 and is connected within the threaded opening 425 by a threading connection.

The manual activation assembly 450 includes a plunger 451 that is moveable to selectively vent the secondary chamber 362 and an actuator assembly 460 that is configured for moving the plunger 451 when manipulated by a user. In the embodiment of FIGS. 1-7 and 17-24, the manual activation assembly 450 is entirely mechanically operated, without any electronically controlled or activated components. The plunger 451 in FIGS. 1-7 and 17-24 is moveable linearly within a central passage 452 extending through the top piece 115 of the pressure vessel 110 from the top of the pressure vessel 110 to the opening 364 to the secondary chamber 362. The central passage 452 includes a first section 452a in fluid communication with the diaphragm cavity 118 and the opening 364 and a second section 452b that is separated from the first section 452a by a dynamic seal assembly 458 and does not encounter water during normal use. The dynamic seal assembly 458 may, in one embodiment, include two dynamic seals separated by a backup ring. In the configuration of FIGS. 1-7 and 17-24, the first section 452a of the central passage 452 is in communication with the second venting pathway 414 and at least partially defines the second venting pathway 414 for venting the secondary chamber 362. The plunger 451 is moveable between a closed position (see FIG. 24), where the plunger 451 closes the second venting pathway 414, and an open position (see FIG. 23) where the plunger 451 is moved to allow passage of fluid out of the secondary chamber 362 through the opening 364 and the second venting pathway 414. In the embodiment of FIGS. 1-7 and 17-24, the plunger 451 includes an elongated plunger body 453 with an enlarged head 454 having an annular seal 455 disposed on the head 454. The head 454 has a larger width/diameter than the aperture 456 where the first section 452a of the central passage 452 intersects the diaphragm cavity 118, and the head 454 and the seal 455 are configured to engage an inner surface of the pressure vessel 110 around the aperture 456 to seal the central passage 452 when the plunger 451 is in the closed position. The plunger 451 sealing the aperture 456 thereby seals the second venting passage 414 in the closed position. The seal 455 and the head 454 no longer obstruct the central passage 452 when the plunger 451 is moved vertically downward to the open position, thereby opening the second venting passaged 414 and permitting fluid to flow from the secondary chamber 362 through the aperture 456 and into the central passage 452. The second venting pathway 414 is therefore defined at least partially by the opening 364, the diaphragm cavity 118, the aperture 456, and the first section 452a of the central passage 452. The first section 452a of the central passage 452 intersects with the common venting pathway 413, such that water vented from the secondary chamber 362 through the second venting pathway 414 enters the spillway 416 through the common venting pathway 413. Additionally, the first venting pathway 412 in FIG. 17 passes through the first section 452a of the central passage 452, such that the first and second venting pathways 412, 414 intersect each other in the first section of the central passage 452. In one embodiment, the manual activation assembly 450 includes a spring or other biasing means 457 that biases the plunger 451 toward the closed position (i.e., upward). This biasing automatically returns the plunger 451 to the closed position when the plunger 451 is not forced to the open position by the actuator assembly 460 and also exerts a sealing force on the seal 455 to assist in resisting flow through the aperture 456. This biasing also retains the plunger 451 in the closed position during events of pressure loss (e.g., a pipe break or system maintenance) and assists with operation of the thruster assembly 470 as discussed herein.

The actuator assembly 460 includes an actuator 461 configured to be manipulated by a user and a retractable thruster assembly 470 that engages the actuator 461 and the plunger 451 and is configured to move the plunger 451 when the actuator 461 is actuated by the user. The actuator 461 in FIGS. 1-7 and 17-24 is in the form of a circular button that is received in an aperture 462 on the top of the outside cover 111. The actuator 461 in this embodiment is biased to extend out of the aperture 462 by a spring 464 or other biasing means, and the actuator 461 has a lip 463 extending outward to retain the actuator 461 within the aperture 462. In this configuration, the actuator 461 can be depressed into the aperture 462 by a user exerting force on the actuator 461. The flushometer system 10 also includes a sealing gasket 465 located between the top piece 115 of the pressure vessel 110 and the outside cover 111, the lip 463 engages an underside of the sealing gasket 465. The thruster assembly 470 in FIGS. 1-7 and 17-24 engages the actuator 461 and the plunger 451 such that depressing the actuator 461 forces the thruster assembly 470 downward, and the thruster assembly 470 forces the plunger 451 downward to the open position. The thruster assembly 470 in FIGS. 1-7 and 17-24 is automatically retractable so that the plunger 451 can return to the closed position even if the actuator 461 is continuously depressed. In one embodiment, the thruster assembly 470 has a first member or translating member 471 that is moveable vertically by translation and a second member or rotating member 472 that is moveable vertically by translation and is also rotatable relative to the first member 471. Movement of the members 471, 472 of the thruster assembly 470 by translation occurs along an axis, and movement along the axis is referred to herein as "axial" movement in an "axial direction." The axis in FIGS. 1-7 and 17-24 is vertical, but this orientation may be different in other embodiments. Rotation of the second member 472 occurs about the axis of movement in FIGS. 1-7 and 17-24.

The first member 471 in FIGS. 1-7 and 17-24 is biased upward by a spring or other biasing means 494 (FIG. 21B) and is received within a guide sleeve 474 that rotationally fixes the first member 471. The guide sleeve 474 is connected to the top piece 115 of the pressure vessel 110 by threading into the top of the second section 452b of the central passage 452. The guide sleeve 474 defines a passage 482 with one or more linear slots 475 extending radially outward from the passage 482 along the direction of movement of the first member 471 (i.e., vertically in FIGS. 1-7 and 17-24). The guide sleeve 474 also has abutment members 494 extending into the passage 482, with each abutment member having an abutment surface 495 that extends axially within the passage 482 and inclined tabs 491, 496 that are angled with respect to the abutment surface 495. In this configuration the first member 471 has one or more fins 476 extending outward that are received in the slot(s) 475 to rotationally fix the first member 471 with respect to the guide sleeve 474. The thruster assembly 470 in one embodiment may include slots 475 and fins 476 arranged in one or more opposing pairs. In the embodiment of FIGS. 1-7 and 17-24, the guide sleeve 474 has four slots 475 positioned at 90° orientations relative to each other, and the first member 471 has four fins 476 positioned at 90° orientations relative to each other. The first member 471 also has an enlarged head 477 configured to be received within and engage the actuator 461, and the head 477 is also engaged by the biasing means (not shown). The engaging structure between the first member 471 and the second member 472 includes a pair of engaging arms 478 extending downward on opposite sides of the first member 471, with spaces 479 between the engaging arms 478. Each of the engaging arms 478 has an inclined engaging surface 480 at the distal end thereof (which may be referred to as first engaging surfaces 480), configured to engage the second member 472 and to exert both a vertical force and a rotational force or torque on the second member 472. Each engaging surface 480 has a leading edge 480A and a trailing edge 480B, such that the trailing edge 480B is more proximate to the head 477 than the leading edge 480A. In this configuration, when the first member 471 moves along the axial direction upon depressing of the actuator 461, the leading edge 480A leads the trailing edge 480B in the direction of movement. The first member 471 also has additional arms or obstructing arms 481 extending downward on opposite sides of the first member 471 and offset 90° with respect to the engaging arms 478, such that four spaces 479 are arranged between the engaging arms 478 and the adjacent obstructing arms 481. The fins 476 are arranged on the engaging arms 478 and the obstructing arms 481 in the embodiment of FIGS. 1-7 and 17-24. In another embodiment, the first member 471 may include only the engaging arms 478, and the obstructing arms 481 may be absent or may be configured as additional engaging arms 478.

The second member 472 includes an abutting member 483 that engages the plunger 451 to push the plunger 451 downward to the open position and a plurality of engaging members 484 extending upward from the abutting member 483 for engaging the first member 471. The engaging members 484 each have an engaging surface 485 at the distal end thereof (which may be referred to herein as a second engaging surface 485), and the engaging surfaces 485 are inclined similarly to the engaging surfaces 480 on the engaging arms 478 of the first member 471, such that the engaging surfaces 480, 485 engage each other in a complementary manner in surface to surface contact. It is understood that the engaging surfaces 480, 485 may have some curvature and/or may be angled with respect to the X, Y, and Z axes (with respect to a Y axis defined along the direction of axial movement of the first and second members 471, 472. In particular, the engaging surfaces 480, 485 may be angled with respect to the Y axis or axial direction. Each engaging surface 485 has a leading edge 485A and a trailing edge 485B, such that the trailing edge 485B is more proximate to the abutting member 483 than the leading edge 485A. The engaging members 484 of the second member 472 in FIGS. 1-7 and 17-24 are positioned in two opposing pairs and are distributed at 90° intervals around the periphery of the second member 472. The engaging members 484 in this configuration are separated by notches 486 that are defined by a plurality of notch surfaces 487, 488, 489. Each notch 486 includes a step surface 487 that extends substantially vertically downward and axially (i.e., parallel to the direction of linear movement of the second member 472) from the trailing edge 485B of the engaging surface 485 to an inclined surface 488. The inclined surface 488 extends from the base of the step surface 487 in both an axial direction (i.e., downward in FIGS. 1-7 and 17-24) and a lateral and/or circumferential direction to the base of the adjacent engaging member 484. It is understood that the inclined surface 488 may include multiple surfaces with multiple inclined orientations in one embodiment. A side surface 489 of the engaging member 484 extends axially (i.e., downward in FIGS. 1-7 and 17-24) from the leading edge 485A of the engaging surface 485 to the inclined surface 488. The first member 471 engages the second member 472 and exerts force on the second member 472 that causes rotation of the second member 472 about the axis of linear movement in a direction such that the trailing edge 485B of each engaging surface 485 trails the leading edge 485A. The configuration of the notches 486, including the use of the step surfaces 487 in particular, permits the thruster assembly 470 to achieve a longer vertical stroke length without using a larger diameter piece or a greater degree of pitch on angled components (which could potentially lead to binding and malfunction). The thruster assembly 470 also includes a spring 490 or other biasing means that biases the second member 472 axially upward, i.e., toward the actuator 461 and away from the plunger 451.

Figure 19A:
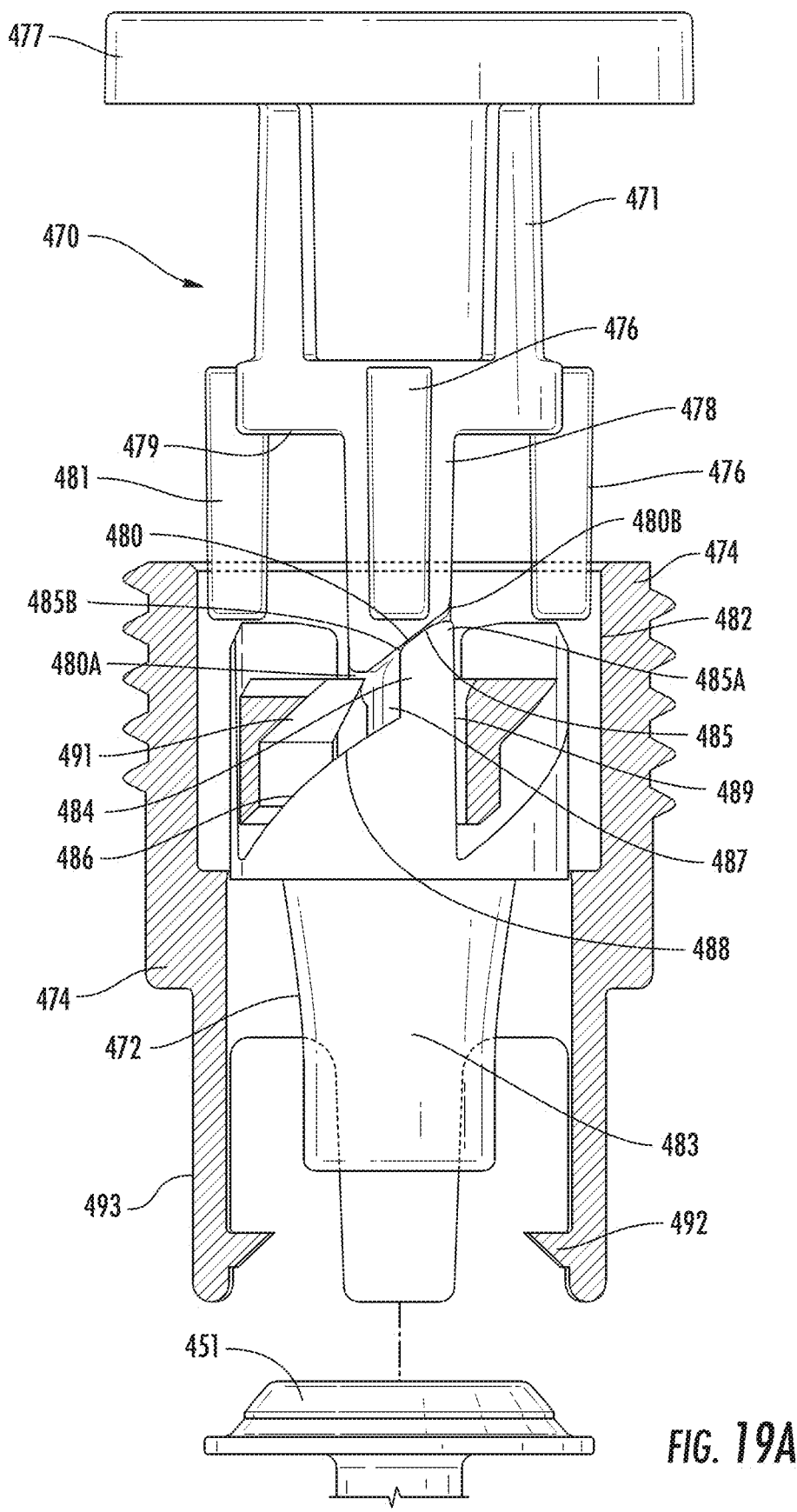
FIGS. 19A-D are side views consecutively illustrating operation of the thruster assembly of FIG. 18.
Figure 19B:
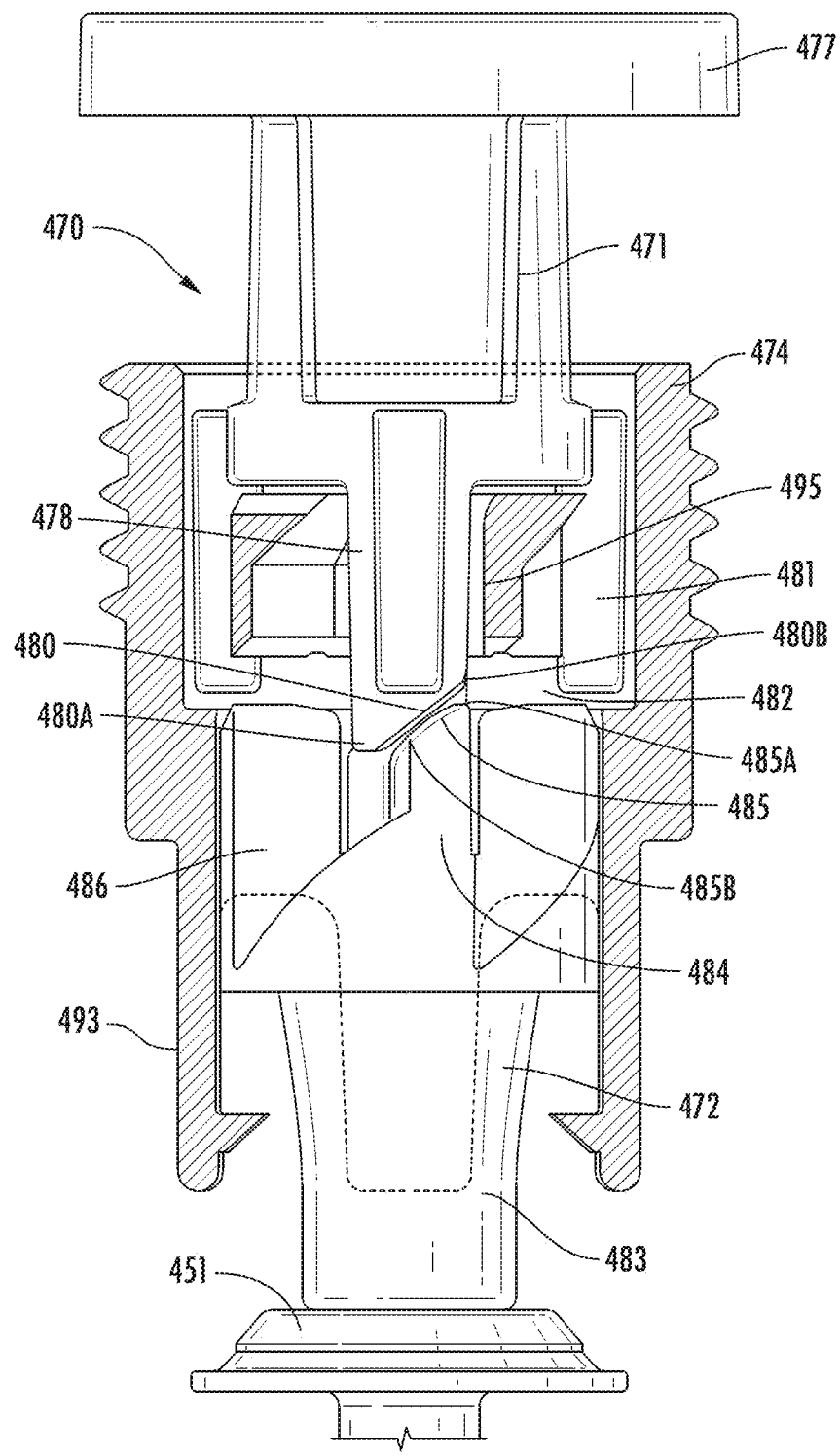
Figure 19C:
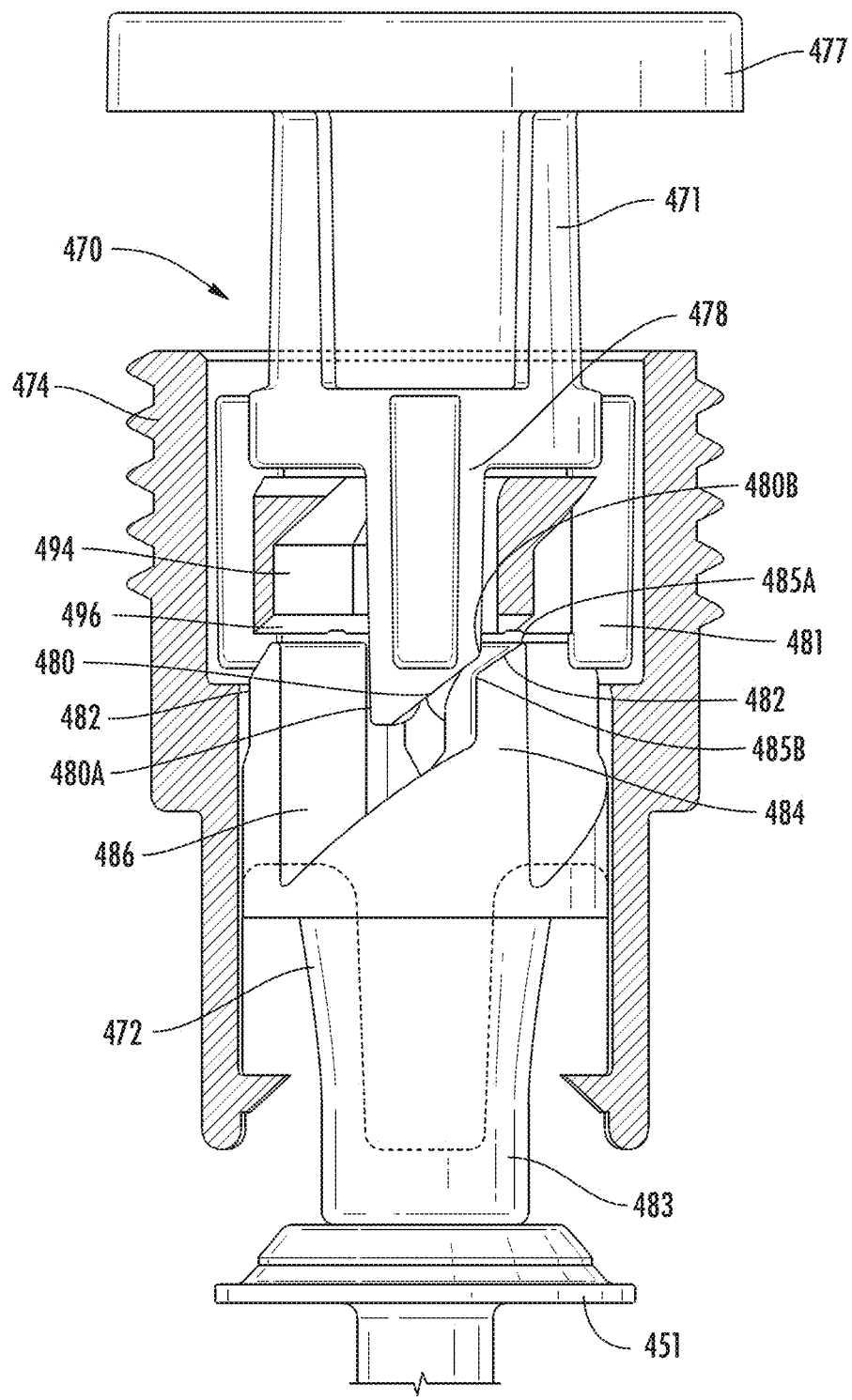

FIGS. 19A-D illustrate the engagement between the first and second members 471, 472 throughout a single stroke to move the plunger 451 and manually activate the diaphragm assembly 310. FIG. 19A illustrates the resting or first positions of the first and second members 471, 472, with both the first and second members 471, 472 in the upwardmost positions in their axial travel path due to the biasing force of the spring 490 and the spring (not shown) engaging the head 477 of the first member 471. In this position, the engaging surfaces 480 of the engaging arms 478 of the first member 471 are close to, but not yet engaging, two of the engaging surfaces 485 of the engaging members 484 of the second member 472. The abutting member 483 is spaced from the plunger 451 in this position. In FIG. 19B, the actuator 461 has been depressed fully to move the first and second members 471, 472 axially downward to a second position, such that the abutting member 483 engages the plunger 451 and exerts force on the plunger 451 to move the plunger 451 axially to the open position. In this position, the engaging surfaces 480 of the engaging arms 478 of the first member 471 engage two of the engaging surfaces 485 of the engaging members 484 of the second member 472. The second member 472 may have experienced a slight degree of rotation in FIG. 19B relative to the resting position, due to the torque exerted on the second member 472 by engagement between the inclined engaging surfaces 480, 485. However, such rotation is not significant, and the movement of the second member 472 from the first position (FIG. 19A) to the second position (FIG. 19B) is considered to be axial only. In this position, the abutment surfaces 495 of the guide sleeve 474 engage the side surfaces 489 of the second member 472 to prevent premature rotation of the second member 472, such that the plunger 451 can be fully depressed before the second member 472 moves sufficiently to return the plunger 451 to the closed position. This is shown most clearly in FIG. 21B, and it is understood that certain components (e.g., the plunger 451) are not shown in FIG. 21B for clarity purposes. After the side surfaces 489 of the second member 472 move sufficiently downward to clear the abutment surfaces 495 of the guide sleeve 474, the second member 472 is free to rotate with respect to the first member 471 and the guide sleeve 474. This is shown in FIG. 19C, where the second member 472 has experienced a significant degree of rotation from the resting position, and the second member 472 has begun to move upward as the second member 472 rotates due to the upward axial forces exerted by the spring 490. As the second member 472 rotates and moves upwards, and the spring biasing the plunger 451 toward the closed position causes the plunger 451 to begin to move upward. As seen in FIG. 19C, the rotation of the second member 472 causes the leading edges 485A of the second engaging surfaces 485 to pass the trailing edges 480B of the first engaging surfaces 480.

Figure 19D:
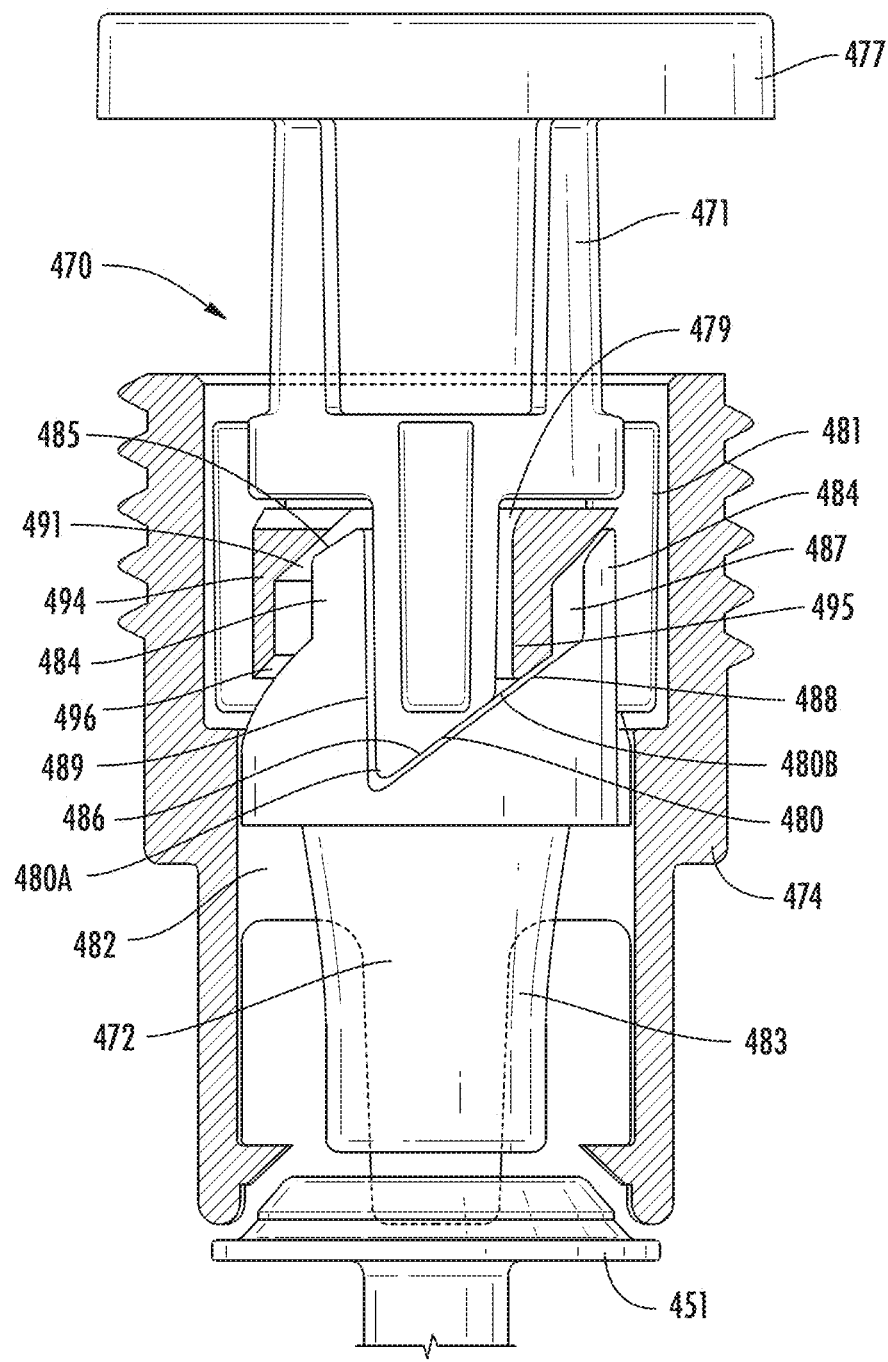
Figure 20:
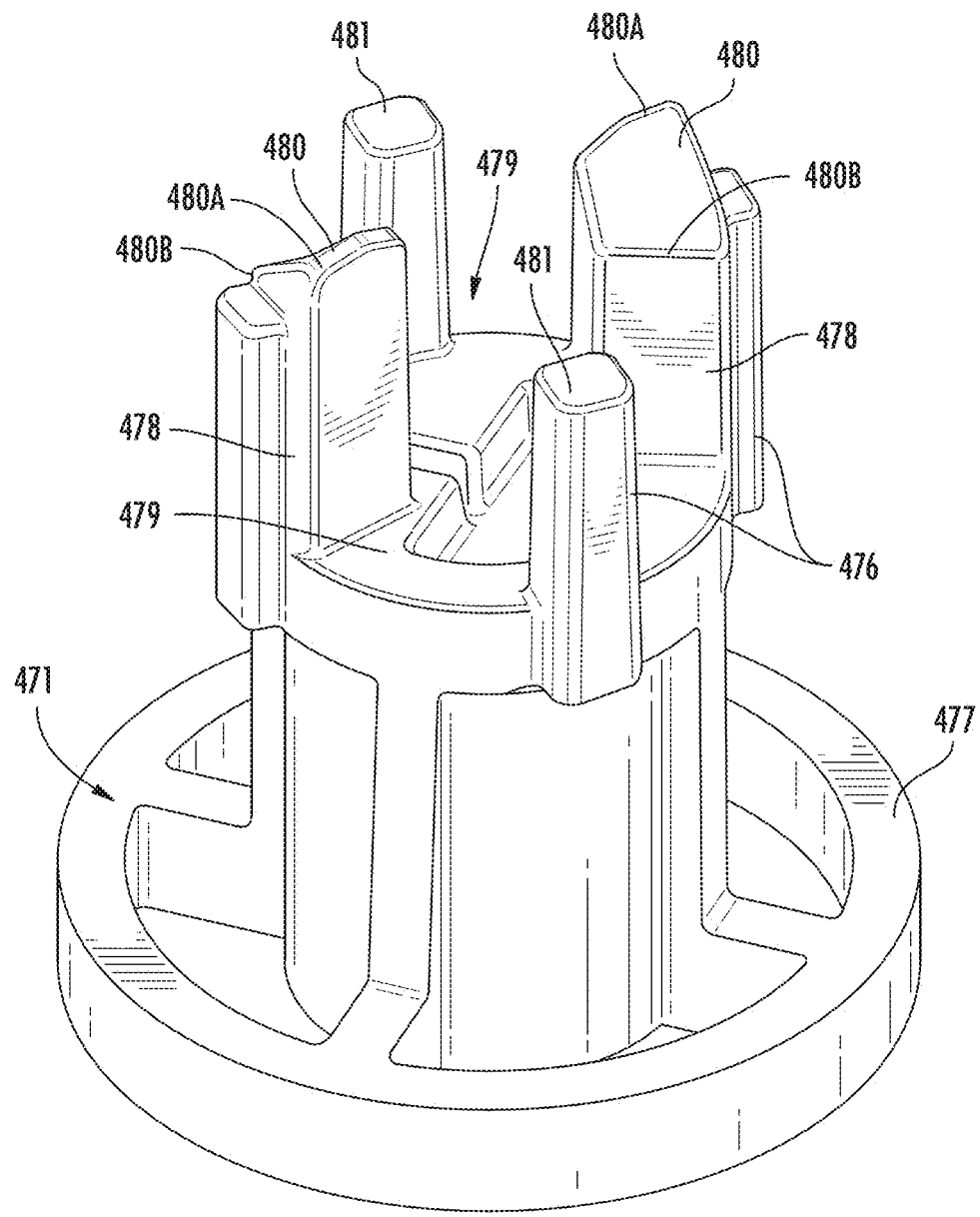
FIG. 20 is an inverted perspective view of a first member of the thruster assembly of FIG. 18.
Figure 21A:
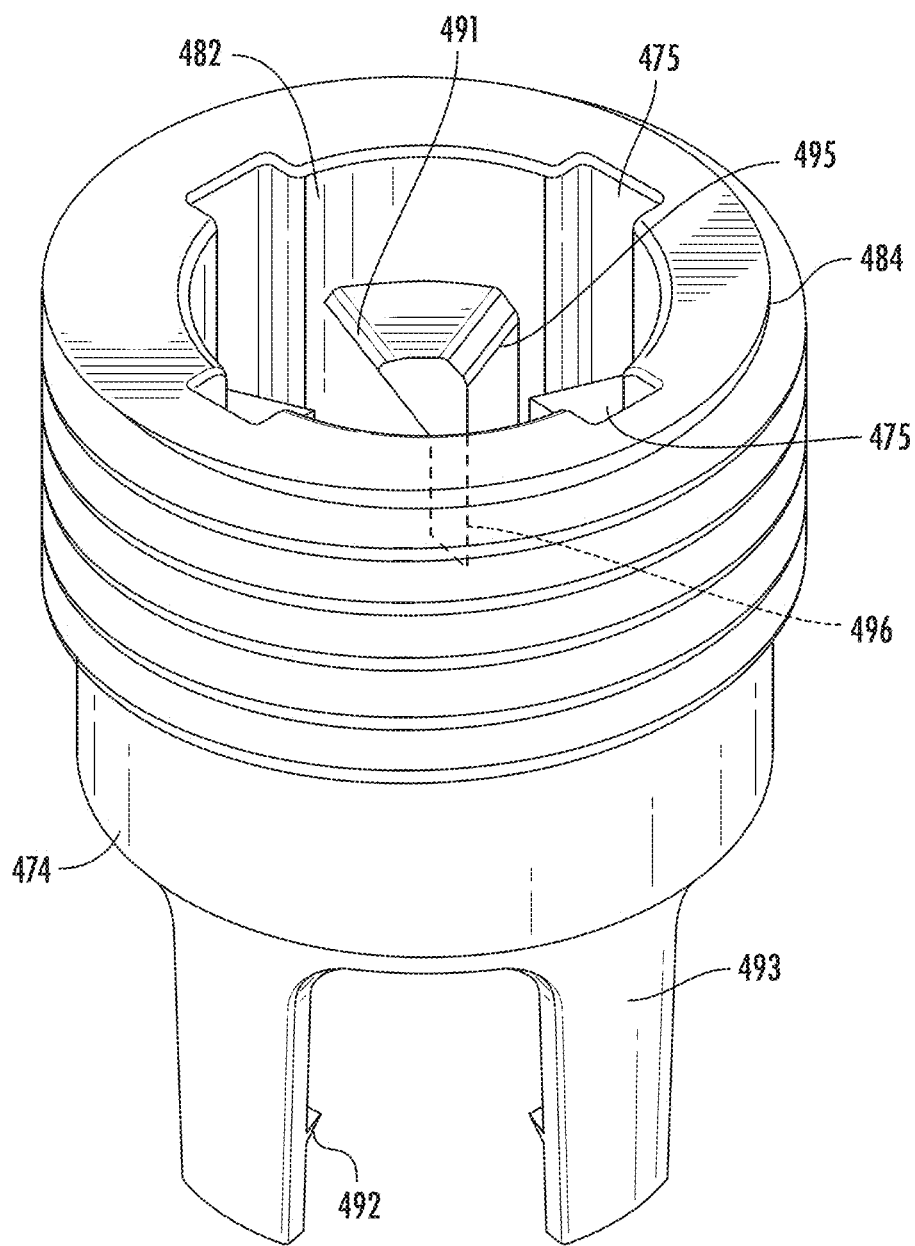
FIG. 21A is a perspective view of a guide sleeve of the thruster assembly of FIG. 18.
Figure 21B:
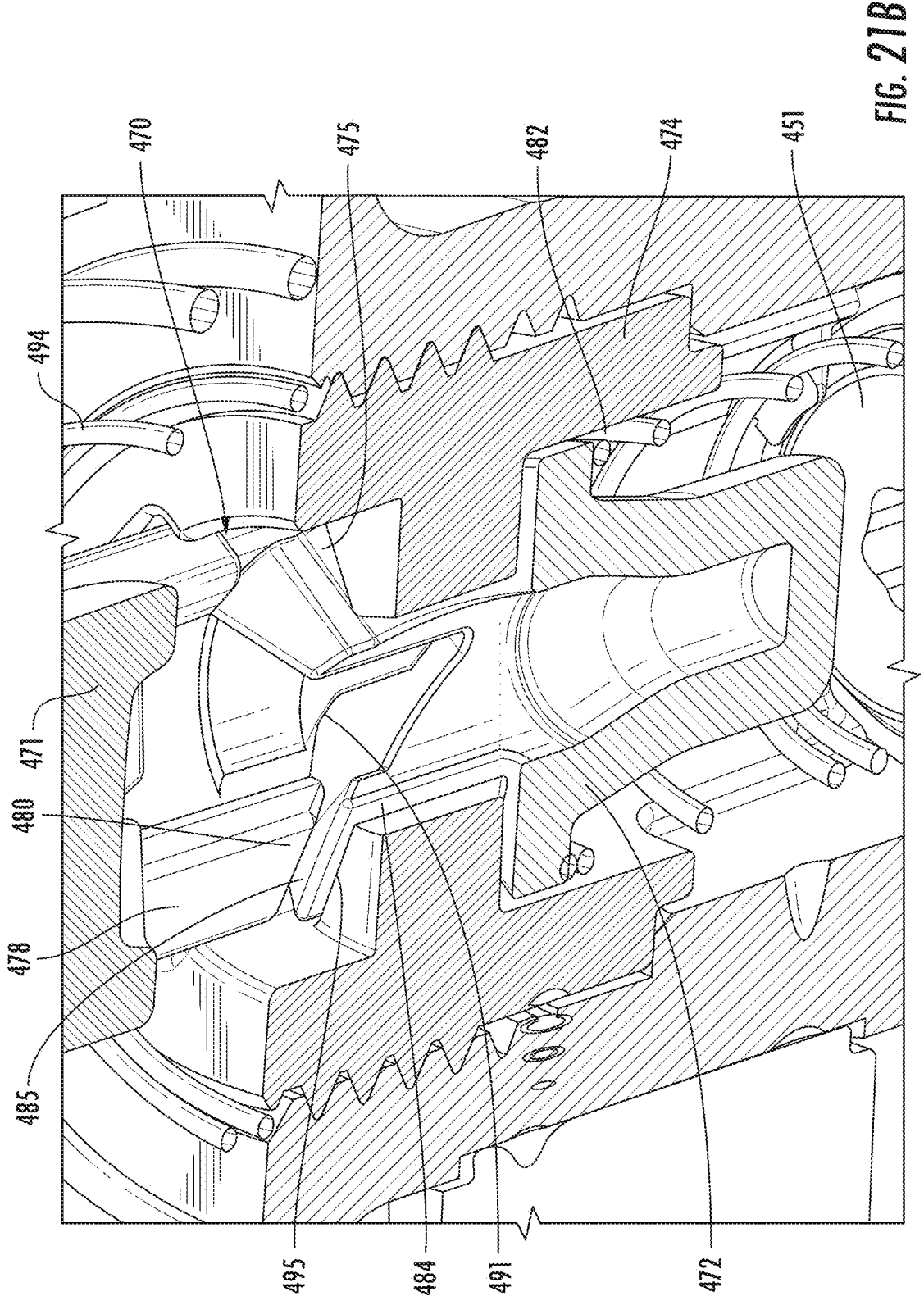
FIG. 21B is a cross-section view of a portion of the manual activation assembly of the flushometer system of FIG. 1, including the thruster assembly of FIG. 18.
Figure 22:
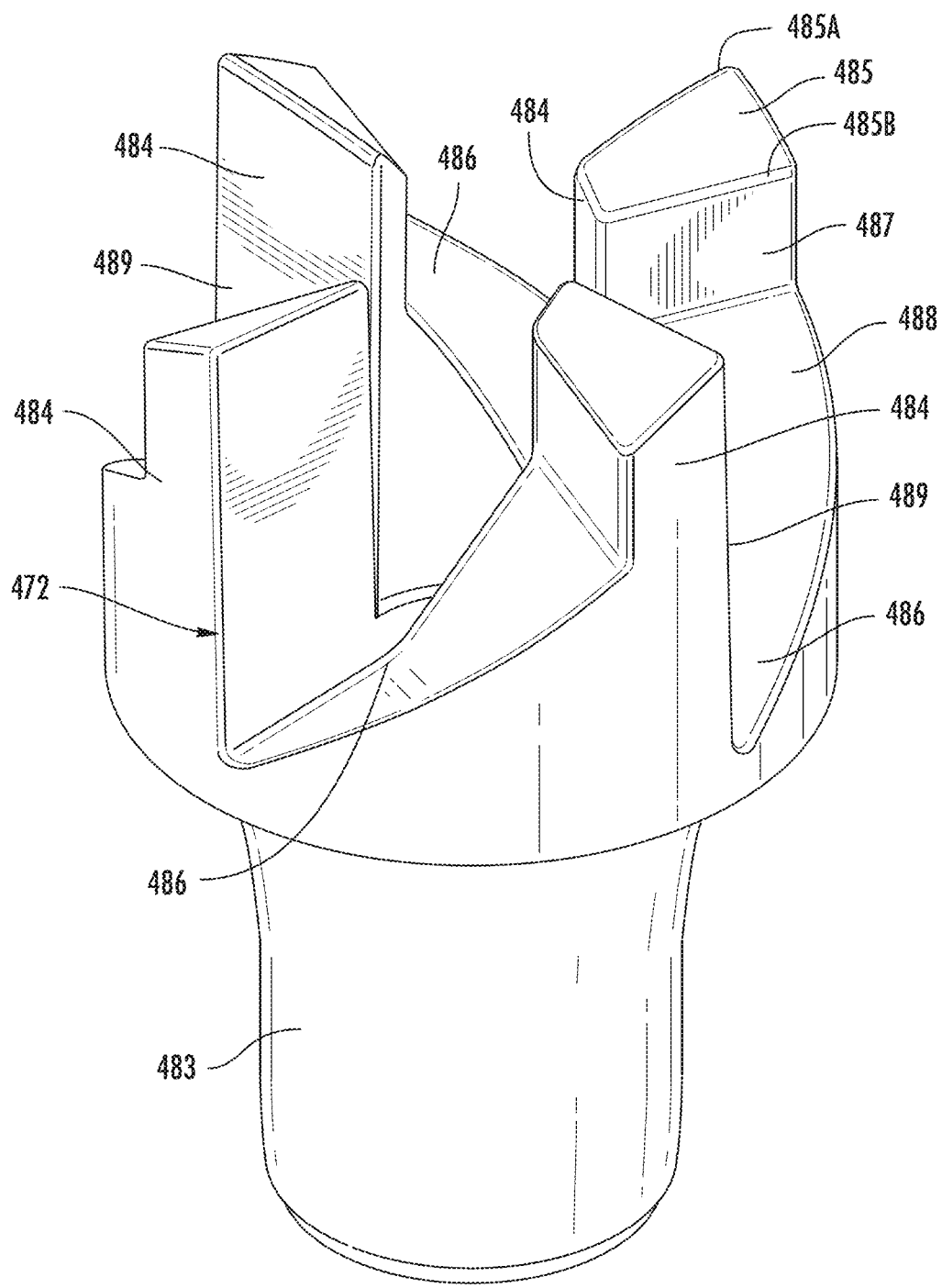
FIG. 22 is a perspective view of a second member of the thruster assembly of FIG. 18.
Figure 23:
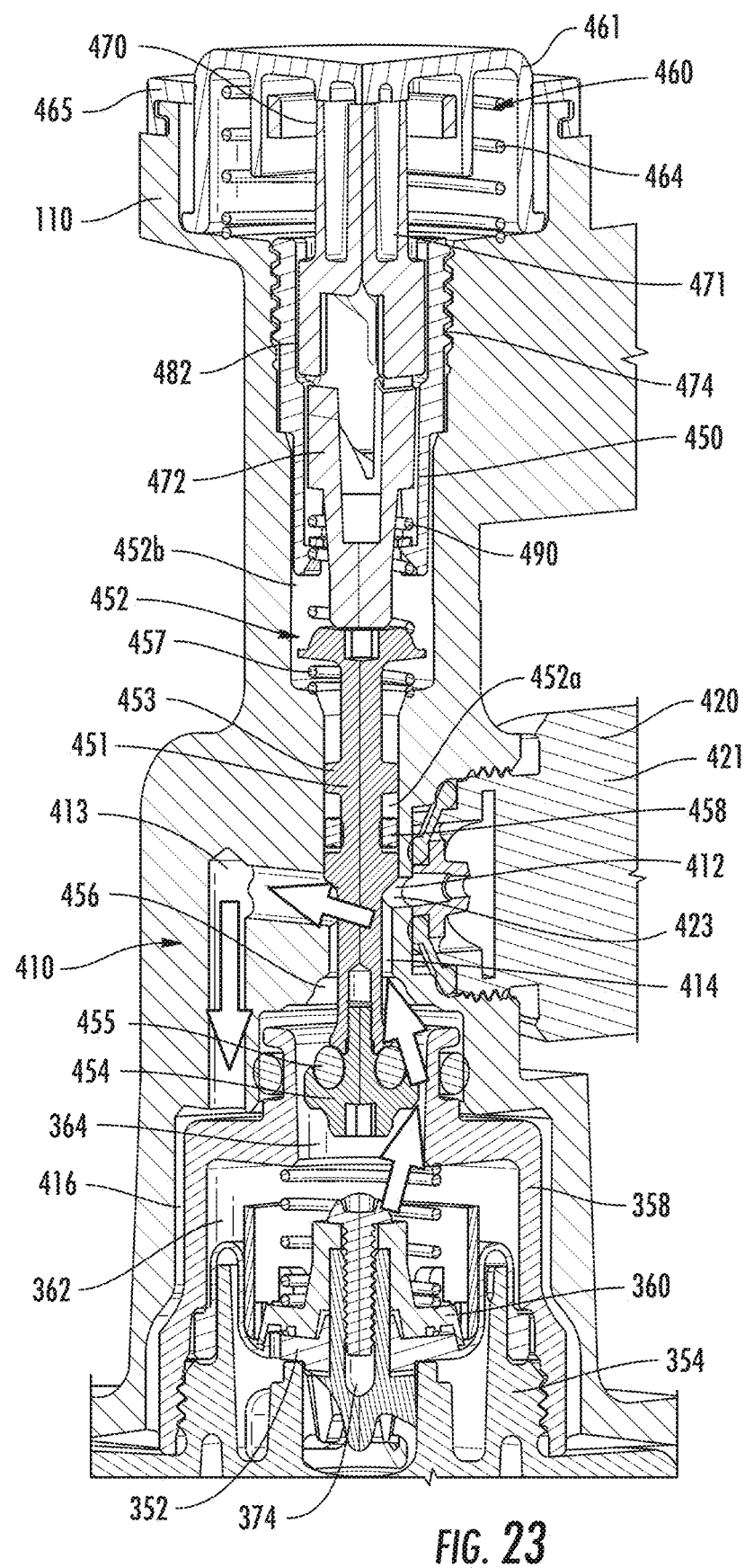
FIG. 23 is a cross-section view of a portion of the flushometer system of FIG. 1, with arrows showing movement of the manual activation assembly and a second venting flow path of fluid from the diaphragm assembly.
Figure 24:
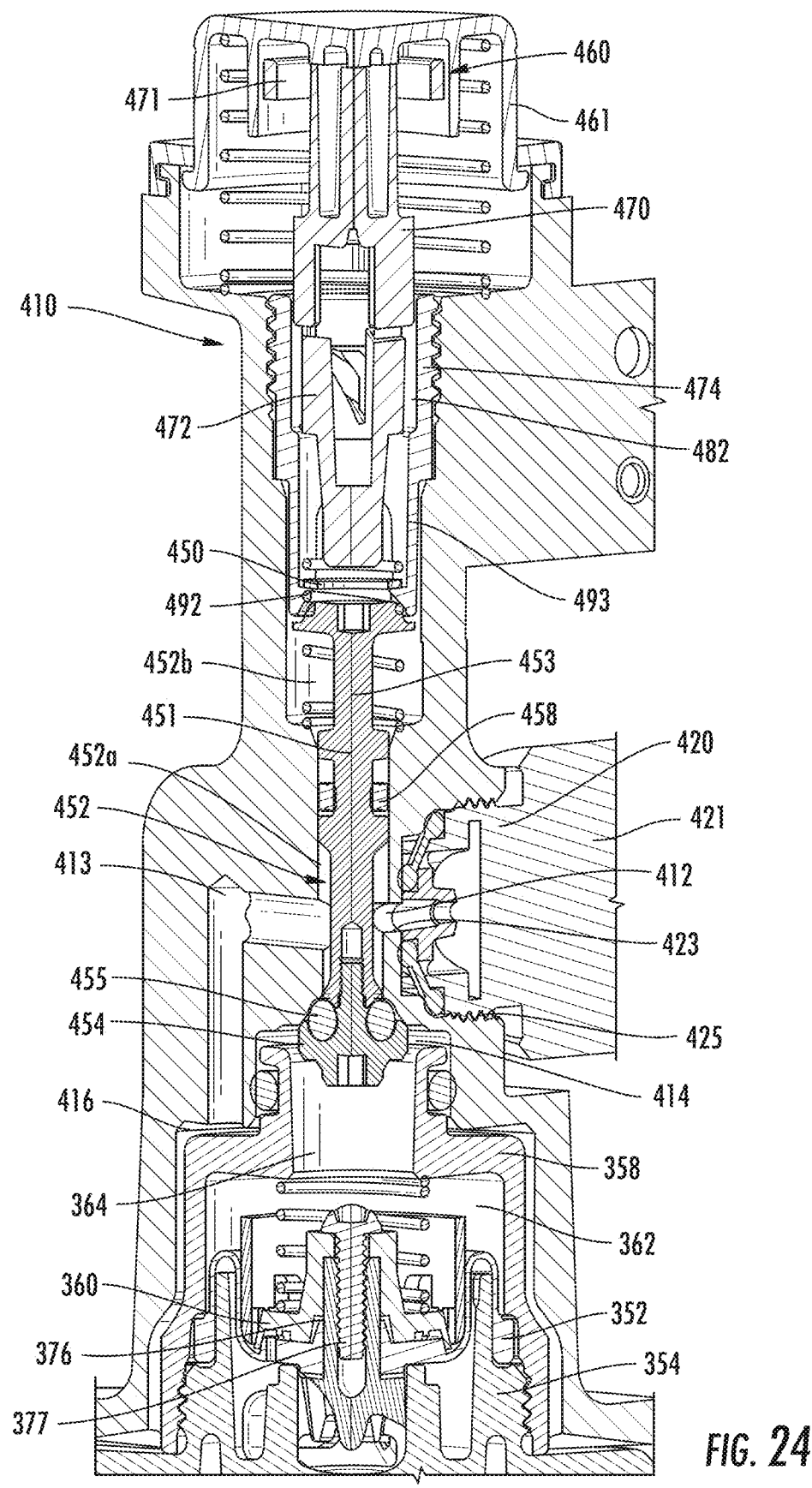
FIG. 24 is a cross section view of the portion of the flushometer system shown in FIG. 23, with the manual and automatic activation assemblies in closed positions.

In FIG. 19D, the trailing edges 485B of the second engaging surfaces 485 have cleared the trailing edges 480B of the first engaging surfaces 480, and the upward biasing forces of the spring 490 causes the second member 472 to move upward to a third position, such that the notches 486 pass onto the engaging arms 478, and the engaging arms 478 engage the inclined surfaces 488 in the notches 486. The engagement between the inclined surfaces 488 and the first engaging surfaces 480 creates further rotation and allows upward axial movement of the second member 472 until the engaging arms 478 of the first member 471 abut the side surfaces 489 of the engaging members 484. In the position of FIG. 19D, the first member 471 and the actuator 461 are both in their lowermost positions, while the second member 472 has moved axially upward a sufficient distance to permit the plunger 451 to return completely to the closed position. As a result, after the plunger 451 is moved to the open position, it will return to the closed position normally regardless of how long the actuator 461 is depressed by the user, ensuring more consistent functioning of the flushometer 10. This, in turn, prevents inadvertent or intentional holding open of the manual activation assembly 450 to create continuous flushing of the flushometer system 10, which may have consequences such as excessive water usage or even flooding. FIG. 19D may therefore be regarded as an intermediate position in the functioning of the thruster assembly 470 that is maintained until the actuator 461 is released, while the diaphragm assembly 310 and the other components of the flushometer system 10 continue to function normally. When the actuator 461 is released, the actuator 461 and the first member 471 move back to the upward positions. The second member 472 is also biased upwardly and moves further upward. During this upward movement of the second member 472, the inclined surfaces 488 engage the lower inclined tabs 496 within the passage 482 of the guide sleeve 474, thereby causing further rotation of the second member 472. When the leading edge 485A of the second engaging surface 485 clears the lower inclined tabs 496 rotationally and vertically, the second member 472 rotates back to a position relative to the first member 471 similar to that shown in FIG. 19A. It is understood that after completion of one cycle, the second member 472 will be in the same axial position as the first position at the beginning of the cycle (FIG. 19A), but will be in a different rotational position from the first position. This position may be considered to be a fourth position of the second member 472. The manual activation procedure can then be repeated. The functioning of the thruster mechanism 470 in FIGS. 1-7 and 17-20 is configured such that depressing the actuator 461 to move the plunger 451 uses only linear translation forces, thereby avoiding wasted or lost energy in overcoming resistance forces, e.g., springs 457, 490 and fluid pressure on the plunger 451. Additionally, the return of the thruster assembly 470 to the pre-activation position shown in FIG. 19A makes use of such resistance forces to aid in creating a combination of translational and rotational motion.

The guide sleeve 474 includes features to guide the movement of the first and second members 471, 472 and the interaction with the plunger 451. As discussed herein, the guide sleeve 474 includes slots 475 that receive fins 476 of the first member 471 in order to rotationally lock the first member 471, such that the first member 471 moves only axially. The slots 475 terminate at a point along the length of the sleeve passage 482, and the termination points of the slots 475 limit the potential range of axial movement of the first member 471. The guide sleeve 474 also has a lip 492 at the bottom of the guide sleeve 474 (distal from the actuator 461), and the lip 492 in FIGS. 1-7 and 17-24 is defined as multiple lips 492 on a plurality of legs 493 depending from the bottom of the guide sleeve 474. The top side of the lip 492 engages the spring 490 and defines a limit to the maximum range of axial movement of the second member 472. The lip 492 also retains the second member 472 and spring 490. However, the thruster assembly 470 is configured such that the second member 472 will move back upward before engaging the lip 492, to avoid damage to the thruster assembly 470. The underside of the lip 492 is designed to create a gap from the top of the plunger 451 to allow the maximum range of upward motion of the plunger 451 so that the second venting pathway 414 can be sealed. However, the engagement between either the seal 455 or the head 454 and the pressure vessel 110 around the aperture 456 stops movement of the plunger 451 before the plunger 451 can engage the lip 492.

FIGS. 25-26 illustrate another embodiment of a valve assembly 210 that is moveable vertically within a passage 117 of a valve sleeve 114, and which may be usable in connection with a valve sleeve 114 as shown in FIGS. 1-24. The valve assembly 210 in FIGS. 25-26 includes many features and components in common with the valve assembly 210 in FIGS. 1-24, and such common features and components are referred to herein using similar reference numbers. Additionally, such common features and components may not be described again in detail with respect to the valve assembly 210 in FIGS. 25-26 for the sake of brevity. In the embodiment of FIGS. 25-26, the valve assembly 210 includes a main valve body 212 having a generally cylindrical outer wall defining a central passage 213 that is in communication with the valve sleeve 114 and the outlet 90, and one or more openings 214 that permit the passage of fluid into the passage 213 and through the main valve body 212. The valve assembly 210 in FIGS. 25-26 also includes a valve seat portion 250 with a valve seat seal 251 for engaging and sealing the valve assembly 210 against the main valve seat assembly 150, as described herein with respect to FIGS. 1-24. The main valve body 212 in FIGS. 25-26 also has one or more outer diameter changes 216 (or other width changes) near the top 218 of the main valve body 212, formed by stepped surfaces 219 that increase the width of the main valve body 212 toward the top 218 of the main valve body 212, as also described herein with respect to FIGS. 1-24. The main valve body 212 in FIGS. 25-26 has a single stepped surface 219 forming a single diameter change 216, in contrast to the embodiment of FIGS. 1-24, where multiple stepped surfaces 219 form multiple diameter changes 216.

The valve assembly 210 in FIGS. 25-26 includes a flow control assembly 270 that includes multiple variable flow regulators 272 each positioned within one of the openings 214. This configuration is different structurally from the flow control assembly 270 in FIGS. 1-24, and both of the flow control assemblies 270 in FIGS. 1-24 and 25-26 create a variable flow path that passes through the passage 213 of the main valve body 212. The flow control assembly 270 in FIGS. 25-26 also includes a fixed flow path defined between the main valve body 212 and the inner surface of the valve sleeve 114. The main valve body 212 in FIGS. 25-26 includes a fixed flow regulator 275 in the form of two spaced flanges 277 that extend outward from the main valve body 212 below the openings 214. The space between the flanges 277 in this embodiment may be used to hold a seal, if it is desired to eliminate the fixed flow path. The flow control assembly 270 in FIGS. 25-26 therefore achieves a combination of fixed and variable flow through the outlet 90, similar to the flow control assembly 270 in FIGS. 1-24 described herein.

Various embodiments of flushometers have been described herein, which include various components and features. In other embodiments, the flushometer may be provided with any combination of such components and features. It is also understood that in other embodiments, the various devices, components, and features of the flushometer described herein may be constructed with similar structural and functional elements having different configurations, including different ornamental appearances.

The embodiments of flushometers described herein provide benefits and advantages over existing flushometers. The use of the dual diaphragm assemblies results in venting of the primary chamber in a less rapid manner as compared to venting of chambers of this type in existing flushometers using manual flush valves, which places less demand on the plumbing system and reduces shocks to the system such as hammer. Simultaneously, the use of the dual diaphragm assemblies allow more rapid venting of the primary chamber as compared to existing flushometers using electronic (e.g., solenoid-activated) flush valves, which achieves more accurate and consistent operation. The dual diaphragm assemblies and the activation assemblies reduce variability in flush volume and flush profile as a result of differing fluid pressures in the plumbing system. The configuration of the valve assembly and the diaphragm assembly also provide consistent flow rates and refill volume across a wide variety of fluid pressures and bowl configurations and reduces shocks to the system such as hammer. The location of the valve body provides a direct flow path from the inlet to the valve body, which also assists in maintaining consistent flush volume and profile across a wide variety of fluid pressures. The overall flushometer system as described herein can be used over a wide range of fluid pressures, such as 20-125 psi, and potentially higher or lower pressures. The use of rolling diaphragms provides several benefits, including significantly reducing the effect of material properties, such as modulus or other deformation properties, on diaphragm performance, as well as permitting a long stroke length to be achieved. The location of the variable flow regulator on the valve body provides a position that facilitates repair and/or replacement. The use of the engaging surfaces and biasing means in the retractable thruster assembly allow for full axial actuation that automatically resets at the end of actuation. The symmetry of the geometries in the thruster assembly allow for equal motion of the first and second members in every use. Further, the use of multiple/split engaging surfaces on some of the members allow the active portion of actuation to be longer than the normal function of the surface pitch at the given diameter would allow if the surfaces were not split. Still other advantages are recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Terms such as "top," "bottom," "front," "side," "rear," "proximal," "distal," and the like, as used herein, are intended for illustrative purposes only and do not limit the embodiments in any way. When used in description of a method or process, the term "providing" (or variations thereof) as used herein means generally making an article available for further actions, and does not imply that the entity "providing" the article manufactured, assembled, or otherwise produced the article. Nothing in this specification should be construed as requiring a specific three dimensional orientation of structures in order to fall within the scope of this invention, unless explicitly specified by the claims. The term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A flushometer system comprising:
   a pressure vessel comprising a valve inlet chamber configured to receive fluid from a plumbing system and an outlet configured to discharge the fluid to a plumbing fixture, with a flow path defined between the valve inlet chamber and the outlet;
   a valve assembly disposed within the pressure vessel and comprising a valve body configured to be moveable to selectively open and close the flow path between the valve inlet chamber and the outlet;
   a primary diaphragm assembly disposed within the pressure vessel and comprising a primary chamber in fluid communication with the valve inlet chamber, a primary disc moveable within the primary chamber and operably connected to the valve body such that the valve body is moveable with the primary disc, and a primary diaphragm having an outer edge fixed with respect to the pressure vessel and a center portion engaging the primary disc and moveable with the primary disc, wherein the primary disc and the primary diaphragm are moveable between a lowered position, where the valve body is configured to close the flow path between the valve inlet chamber and the outlet, and a raised position, where the valve body is configured to open the flow path between the valve inlet chamber and the outlet;
   a secondary diaphragm assembly disposed within the pressure vessel and comprising a secondary chamber in fluid communication with the primary chamber, a secondary disc moveable within the secondary chamber, and a secondary diaphragm engaged with the secondary disc and having a portion moveable with the secondary disc, wherein the secondary disc and the secondary diaphragm are moveable between a first position, where the secondary diaphragm is configured to seal against fluid flow from the primary chamber into the secondary chamber, and a second position, where fluid can flow from the primary chamber into the secondary chamber to vent the primary chamber;

an activation assembly comprising at least one of a plunger and a solenoid assembly configured to be activated to selectively vent the secondary chamber to move the secondary disc and the secondary diaphragm from the first position to the second position, wherein movement of the secondary disc and the secondary diaphragm to the second position is configured to vent the primary chamber to move the primary disc and the primary diaphragm from the lowered position to the raised position.

2. The flushometer system of claim 1, wherein the activation assembly comprises a manual activation mechanism comprising a manual actuator configured for operably engaging the plunger to move the plunger to vent the secondary chamber.

3. The flushometer system of claim 1, wherein the activation assembly comprises an automatic activation mechanism comprising an electronic switch configured for activating the solenoid assembly to vent the secondary chamber.

4. The flushometer system of claim 1, wherein the primary diaphragm is a rolling diaphragm fixedly engaged at the outer edge thereof, with a rolled portion located radially inward from the outer edge to permit the center portion of the primary diaphragm to be moveable with the primary disc.

5. The flushometer system of claim 4, wherein the primary disc comprises a lip extending radially outward around a periphery of the primary disc and extending over the rolled portion of the primary diaphragm.

6. The flushometer system of claim 4, wherein the secondary diaphragm is a rolling diaphragm fixedly engaged at an outer edge thereof, with a rolled portion located radially inward from the outer edge to permit the portion of the secondary diaphragm to be moveable with the secondary disc.

7. The flushometer system of claim 1, wherein the primary diaphragm assembly further comprises a primary diaphragm cover configured to define the primary chamber, and the secondary diaphragm assembly further comprises a secondary diaphragm cover configured to define the secondary chamber, wherein the secondary diaphragm cover is connected to a top of the primary diaphragm cover, and the primary diaphragm cover has an opening in the top placing the secondary chamber in communication with the primary chamber.

8. The flushometer system of claim 7, wherein the primary diaphragm assembly further comprises a primary diaphragm seat where the primary diaphragm is seated in the lowered position, and the primary diaphragm cover is fixed to the primary diaphragm seat and extends upward from the primary diaphragm seat and over the primary chamber.

9. The flushometer system of claim 1, further comprising a valve sleeve connected to the pressure vessel proximate the outlet and mounted within the flow path, the valve sleeve defining a passage receiving the valve body such that the valve body is moveable within the passage, and wherein the valve assembly is configured for engaging the valve sleeve to close the flow path.

10. The flushometer system of claim 9, wherein the valve assembly further comprises a valve seat seal connected to the valve body and the valve sleeve has a valve seat, and wherein the valve seat seal is configured to engage the valve seat to close the flow path and to disengage from the valve seat to open the flow path.

11. The flushometer system of claim 1, wherein the primary diaphragm assembly further comprises a stem extending downward from the primary disc, and wherein the stem is fixedly connected to the valve body such that the valve body is moveable with the primary disc.

12. The flushometer system of claim 1, wherein the primary disc has a first bypass configured to allow controlled passage of the fluid through the primary disc and the primary diaphragm to refill the primary chamber after venting, and the secondary disc has a second bypass configured to allow controlled passage of the fluid through the secondary disc and the secondary diaphragm to refill the secondary chamber after venting.

13. The flushometer system of claim 1, wherein the primary diaphragm assembly further comprises a stroke adjuster connected to the primary disc and having a height that is adjustable relative to the primary disc, such that adjustment of the height of the stroke adjuster relative to the primary disc is configured to define a total vertical movement range of the primary disc.

14. The flushometer system of claim 1, wherein the primary diaphragm assembly further comprises a primary diaphragm cover configured to define the primary chamber, and the secondary diaphragm assembly is located above the primary diaphragm cover, and wherein the primary diaphragm cover has an opening in a top thereof placing the secondary chamber in communication with the primary chamber.

15. The flushometer system of claim 1, wherein the primary diaphragm assembly further comprises a primary diaphragm cover configured to define the primary chamber, and the secondary diaphragm assembly further comprises a secondary diaphragm cover configured to define the secondary chamber, wherein the primary diaphragm cover has a connection portion extending upwardly from a top of the primary diaphragm cover, and the secondary diaphragm cover is connected to the connection portion, and wherein the primary diaphragm cover has an opening in the top placing the secondary chamber in communication with the primary chamber.

16. The flushometer system of claim 15, wherein the secondary diaphragm assembly further comprises a secondary diaphragm seat connected to the top of the primary diaphragm cover and extending upward from the top of the primary diaphragm cover, and the connection portion is part of the secondary diaphragm seat.

17. The flushometer system of claim 15, wherein the connection portion is threaded, and the secondary diaphragm cover is connected to the top of the primary diaphragm cover by threading onto the connection portion, such that the connection portion extends into the secondary diaphragm cover.

18. The flushometer system of claim 1, wherein the primary diaphragm assembly further comprises a primary diaphragm cover having a primary top wall and a primary side wall extending downward around a periphery of the primary top wall to define the primary chamber, and the secondary diaphragm assembly further comprises a secondary diaphragm cover having a secondary top wall and a secondary side wall extending downward around a periphery of the secondary top wall to define the secondary chamber, and wherein the secondary diaphragm cover is connected to the primary top wall of the primary diaphragm cover, and the primary diaphragm cover has an opening in a top thereof placing the secondary chamber in communication with the primary chamber.

19. The flushometer system of claim 1, wherein the primary diaphragm assembly further comprises a primary diaphragm cover configured to define the primary chamber and a primary diaphragm seat where the primary diaphragm is seated in the lowered position, and wherein the outer edge of the primary diaphragm is fixed between the primary diaphragm cover and the primary diaphragm seat.

20. A flushometer system comprising:
a pressure vessel comprising a valve inlet chamber configured to receive fluid from a plumbing system and an outlet configured to discharge the fluid to a plumbing fixture, with a flow path defined between the valve inlet chamber and the outlet;
a valve assembly disposed within the pressure vessel and configured to selectively open and close the flow path between the valve inlet chamber and the outlet;
a primary diaphragm assembly disposed within the pressure vessel and comprising a primary disc configured to be moveable to actuate the valve assembly to selectively open and close the flow path between the valve inlet chamber and the outlet and a primary diaphragm having an outer edge fixed with respect to the pressure vessel and a center portion engaging the primary disc and moveable with the primary disc;
a secondary diaphragm assembly disposed within the pressure vessel and comprising a secondary diaphragm and a secondary disc, the secondary diaphragm assembly configured to actuate the primary diaphragm assembly by venting fluid pressure on one side of the primary diaphragm; and
an activation assembly configured to actuate the secondary diaphragm assembly by venting fluid pressure on one side of the secondary diaphragm,
wherein the primary diaphragm assembly further comprises a primary diaphragm cover configured to define a primary chamber in which the primary diaphragm is moveable, and the secondary diaphragm assembly further comprises a secondary diaphragm cover configured to define a secondary chamber in which the secondary diaphragm is moveable, wherein the secondary diaphragm cover is connected to a top of the primary diaphragm cover, and the primary diaphragm cover has an opening in the top placing the secondary chamber in communication with the primary chamber.

21. The flushometer system of claim 20, wherein the activation assembly includes a manual activation mechanism comprising a manually-actuatable plunger configured for venting the fluid pressure on the one side of the secondary diaphragm and an automatic activation mechanism comprising a solenoid assembly configured for automatically venting the fluid pressure on the one side of the secondary diaphragm.

22. The flushometer system of claim 20, further comprising an inlet tail connected to the pressure vessel and in communication with the valve inlet chamber, wherein a variable flow regulator is disposed in the inlet tail.

23. The flushometer system of claim 20, wherein the valve assembly further comprises a valve body configured to be moveable to selectively open and close the flow path between the valve inlet chamber and the outlet, wherein the valve body defines a central passage, and wherein a variable flow regulator is disposed within the central passage of the valve body.

24. The flushometer system of claim 20, wherein the primary diaphragm is a rolling diaphragm fixedly engaged at an outer edge thereof, with a rolled portion located radially inward from the outer edge to permit the center portion of the primary diaphragm to be moveable with the primary disc.

25. The flushometer system of claim 24, wherein the primary disc comprises a lip extending radially outward around a periphery of the primary disc and extending over the rolled portion of the primary diaphragm.

26. The flushometer system of claim 24, wherein the secondary diaphragm is a rolling diaphragm fixedly engaged at an outer edge thereof, with a rolled portion located radially inward from the outer edge to permit the secondary diaphragm to be moveable with the secondary disc.

27. A flushometer system comprising:
a pressure vessel comprising a valve inlet chamber configured to receive fluid from a plumbing system and an outlet configured to discharge the fluid to a plumbing fixture, with a flow path defined between the valve inlet chamber and the outlet;
a valve assembly disposed within the pressure vessel and comprising a valve body configured to be moveable to selectively open and close the flow path between the valve inlet chamber and the outlet;
a primary diaphragm assembly disposed within the pressure vessel and comprising a primary chamber in fluid communication with the valve inlet chamber, a primary diaphragm cover configured to define the primary chamber, a primary disc moveable within the primary chamber to actuate the valve assembly to selectively open and close the flow path between the valve inlet chamber and the outlet, and a primary diaphragm having an outer edge fixed with respect to the pressure vessel and a center portion engaging the primary disc and moveable with the primary disc;
a secondary diaphragm assembly disposed within the pressure vessel and comprising a secondary chamber in fluid communication with the primary chamber, and the secondary diaphragm assembly further comprises a secondary diaphragm cover configured to define the secondary chamber, a secondary disc moveable within the secondary chamber to actuate the primary diaphragm assembly by venting fluid pressure on one side of the primary diaphragm, and a secondary diaphragm engaged with the secondary disc, wherein the secondary diaphragm cover is connected to a top of the primary diaphragm cover, and the primary diaphragm cover has an opening in the top placing the secondary chamber in communication with the primary chamber; and
an activation assembly configured to actuate the secondary diaphragm assembly by venting fluid pressure on one side of the secondary diaphragm.

28. The flushometer system of claim 27, wherein the activation assembly comprises a manual activation mechanism comprising a manual actuator configured for operably engaging a plunger to move the plunger to vent the secondary chamber.

29. The flushometer system of claim 27, wherein the activation assembly comprises an automatic activation mechanism comprising an electronic switch configured for activating a solenoid assembly to vent the secondary chamber.

30. The flushometer system of claim 27, wherein the primary diaphragm is a rolling diaphragm fixedly engaged at an outer edge thereof, with a rolled portion located radially inward from the outer edge to permit the center portion of the primary diaphragm to be moveable with the primary disc.

* * * * *